US007991155B2

(12) United States Patent
Fujioka et al.

(10) Patent No.: US 7,991,155 B2
(45) Date of Patent: Aug. 2, 2011

(54) BACKUP MANAGEMENT DEVICE, BACKUP MANAGEMENT METHOD, COMPUTER PROGRAM, RECORDING MEDIUM, INTEGRATED CIRCUIT, AND BACKUP SYSTEM

(75) Inventors: Soichiro Fujioka, Osaka (JP); Shunji Harada, Osaka (JP); Yoshikatsu Ito, Osaka (JP); Yuko Tsusaka, Osaka (JP); Motoji Ohmori, Osaka (JP); Toshihisa Nakano, Osaka (JP)

(73) Assignee: Panasonic Corporation, Osaka (JP)

( * ) Notice: Subject to any disclaimer, the term of this patent is extended or adjusted under 35 U.S.C. 154(b) by 1014 days.

(21) Appl. No.: 11/795,958

(22) PCT Filed: Jan. 30, 2006

(86) PCT No.: PCT/JP2006/301485
§ 371 (c)(1),
(2), (4) Date: Jul. 25, 2007

(87) PCT Pub. No.: WO2006/080510
PCT Pub. Date: Aug. 3, 2006

(65) Prior Publication Data
US 2008/0310628 A1 Dec. 18, 2008

(30) Foreign Application Priority Data
Jan. 31, 2005 (JP) .................................. 2005-024301

(51) Int. Cl.
*H04N 7/167* (2011.01)
(52) U.S. Cl. .......... 380/201; 380/227; 380/44; 380/281; 713/189; 705/57; 705/58; 705/59; 360/60; 369/84; 369/85

(58) Field of Classification Search .................. 380/201, 380/277, 44, 281; 713/189; 705/59; 360/60; 369/84, 85
See application file for complete search history.

(56) References Cited

U.S. PATENT DOCUMENTS

| | | | |
|---|---|---|---|
| 6,701,249 B1 * | 3/2004 | Casino | 701/208 |
| 2002/0019814 A1 * | 2/2002 | Ganesan | 705/59 |
| 2002/0141579 A1 * | 10/2002 | Murase et al. | 380/201 |
| 2003/0007640 A1 * | 1/2003 | Harada et al. | 380/270 |
| 2003/0009681 A1 * | 1/2003 | Harada et al. | 713/193 |
| 2003/0074569 A1 * | 4/2003 | Yamauchi et al. | 713/189 |
| 2003/0099460 A1 * | 5/2003 | Imada et al. | 386/52 |

(Continued)

FOREIGN PATENT DOCUMENTS
JP 2000-298974 10/2000
(Continued)

*Primary Examiner* — Zachary A Davis
*Assistant Examiner* — April Y Shan
(74) *Attorney, Agent, or Firm* — Wenderoth, Lind & Ponack, L.L.P.

(57) ABSTRACT

To provide a backup management device that deletes a content so as to be restorable in the future while protecting a copyright of the content, in a case where there exists a backup of the content. In an HD recorder, a first information storage unit stores a content, a second information storage unit stores a backup of the content, a secure storage unit stores a hash value of the content. If receiving an instruction to delete the content so as to be restorable, a control unit deletes the content from the first information storage unit. When the content is played back, an encryption processing unit applies a calculation to the content to generate detection information, and the control unit compares the hash value with the detection information to judge whether the content has been tampered.

12 Claims, 39 Drawing Sheets

U.S. PATENT DOCUMENTS

2005/0137983 A1 * 6/2005 Bells .............................. 705/51
2008/0250082 A1 * 10/2008 Dive-Reclus ................ 707/204

FOREIGN PATENT DOCUMENTS

| | | | |
|---|---|---|---|
| JP | 2002-297452 | | 10/2002 |
| JP | EP1261185 | * | 11/2002 |
| JP | 2003-30458 | | 1/2003 |
| JP | 2003-224557 | | 8/2003 |
| JP | 2003-337754 | | 11/2003 |
| JP | 2004-13763 | | 1/2004 |
| JP | 2004-13763 A | * | 1/2004 |
| WO | 2004/046899 | | 6/2004 |

* cited by examiner

FIG.5

| CONTENT ID 191 | TITLE 192 | RECORDING DATE AND TIME 193 | HASH VALUE 194 | CONTENT INFORMATION 180 TYPE 195 | COMPRESSION FORMAT 196 | BACKUP FLAG 197 | PRIORITY LEVEL 198 |
|---|---|---|---|---|---|---|---|
| A001 | Content 1a | 04.10.10.17:00 | 01a | BROADCAST PROGRAM | MPEG2 | 1 | 2 |
| A002 | Content 2a | 04.12.12.09:35 | 02a | PHOTOGRAPH | JPEG | 0 | 1 |
| A003 | Content 3a | 04.12.14.22:00 | 03a | BROADCAST PROGRAM | MPEG2 | 1 | 1 |
| A004 | Content 4a | 04.12.15.09:35 | 04a | PHOTOGRAPH | JPEG | 1 | 1 |
| A005 | Content 5a | 04.12.16.22:00 | 05a | BROADCAST PROGRAM | MPEG2 | 0 | 1 |

FIG.28

BACKUP INFORMATION (521)

| CONTENT ID (561) | TITLE (562) | RECORDING DATE AND TIME (563) | BACKUP SOURCE DEVICE IDENTIFIER (564) | HASH VALUE (565) |
|---|---|---|---|---|
| A001 | Content1a | 04.10.10.17:00 | ID_A | 01c |
| A003 | Content3a | 04.12.14.22:00 | ID_A | 02c |
| B005 | Content5b | 04.12.15.07:35 | ID_B | 05c |
| A004 | Content4a | 04.12.15.09:35 | ID_A | 03c |
| ... | ... | ... | ... | ... |

BACKUP INFORMATION 601

| CONTENT ID 561 | TITLE 562 | RECORDING DATE AND TIME 563 | BACKUP SOURCE DEVICE IDENTIFIER 564 |
|---|---|---|---|
| A001 | Content1a | 04.10.10.17:00 | ID_A |
| A003 | Content3a | 04.12.14.22:00 | ID_A |
| B005 | Content5b | 04.12.15.07:35 | ID_B |
| A004 | Content4a | 04.12.15.09:35 | ID_A |
| ... | ... | ... | ... |

602
603
604
605

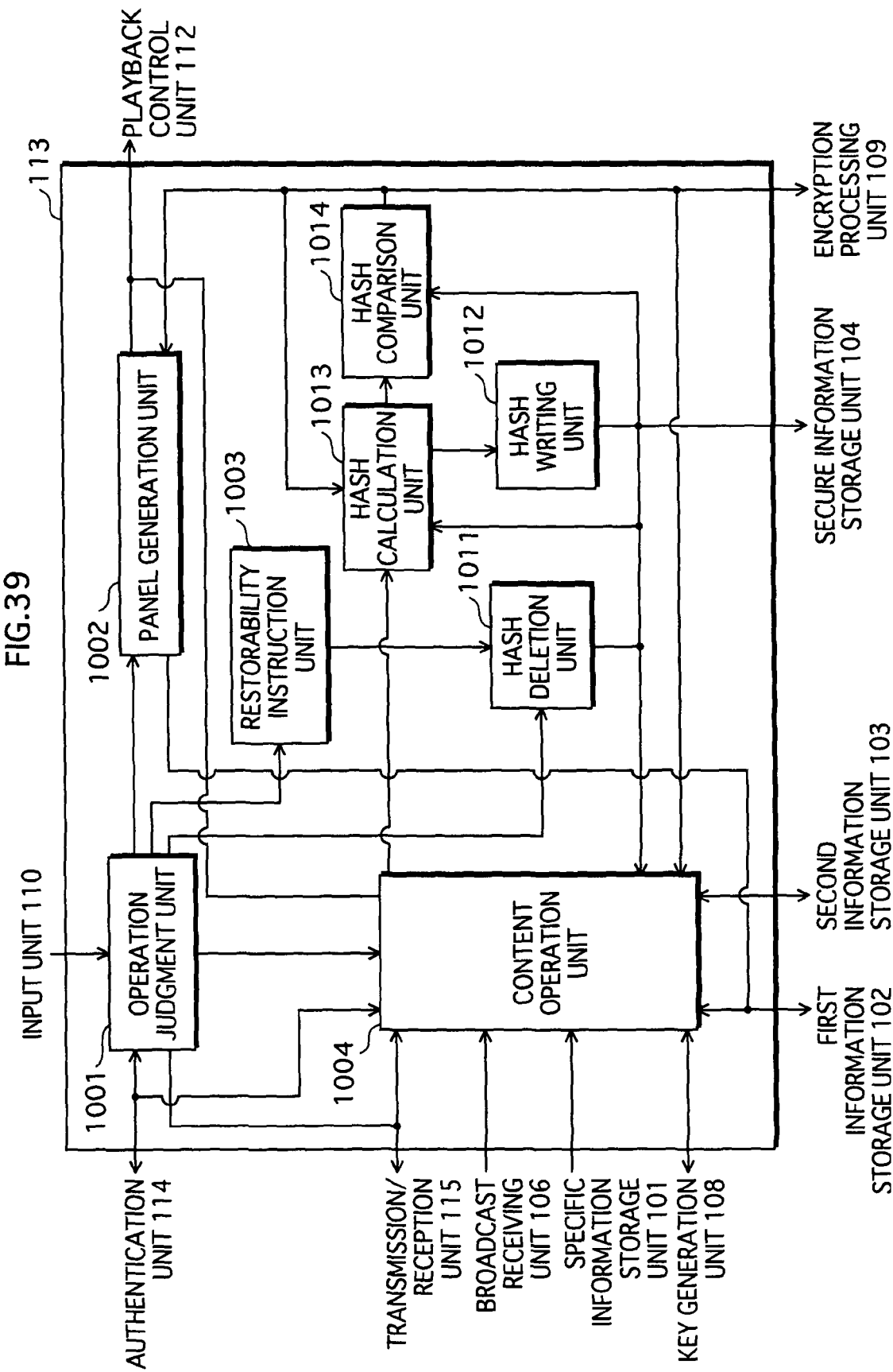

BACKUP MANAGEMENT DEVICE, BACKUP MANAGEMENT METHOD, COMPUTER PROGRAM, RECORDING MEDIUM, INTEGRATED CIRCUIT, AND BACKUP SYSTEM

TECHNICAL FIELD

The present invention relates to an art for backing up digital contents while protecting copyrights thereof.

BACKGROUND ART

Recently, digital broadcasting for broadcasting digital contents has been started. Digital contents hardly suffer degradation due to use. Therefore, in order to protect copyrights of the digital contents, each of the digital contents has CCI (Copy Control Information) attached thereto showing whether copying of the digital content is permitted and the number of permitted copies.

However, when a hard disk recorder (hereinafter "HD recorder") stores, in an HDD (Hard Disk Drive), a content having CCI attached thereto showing that copying of the content is not permitted, even if the HD recorder protects a copyright of the content based on the CCI, a malicious use might be performed. For example, when the HD recorder is powered off, a malicious user removes the HDD and connects the HDD to a personal computer and the like to copy the content stored in the HDD. As one example of conventional arts for preventing such a malicious copying, the following art is known. In advance, a content stored in an HDD is assigned to a one-way function to calculate illegitimacy detection information, and the calculated illegitimacy detection information is stored in the HDD. When the HD recorder is powered on, a content stored in the HDD is assigned to the one-way function to generate verification information. The generated verification information and the stored illegitimacy detection information are compared with each other to detect a malicious use of the content.

Here, although the HDD is convenient, a failure occurrence rate thereof increases depending on a usage frequency since the HDD reads and writes information by performing a rotational operation or a seek operation. If the HDD fails, the content completely disappears since there exists no copy of the content. In order to prevent such a data disappearance due to the HDD failure, it is effective to back up the content to other recording medium or recoding device.

After a content recorded in the HD recorder is backed up to the recording device, if the content needs to be deleted because of an insufficient recording capacity of the HDD relating to the HD recorder, the backup that is a copy of the content needs to be deleted from the recording device for protecting a copyright of the content while deleting the content from the HD recorder. This is for avoiding that the backup remains for use despite the content has been deleted in terms of copyright protection.

SUMMARY OF THE INVENTION

Problems the Invention is Going to Solve

However, there is a demand for later restoration of the content that even if the recording capacity of the HD recorder needs to be made temporarily and therefore the content needs to be deleted from the HD recorder since the content has a great need.

The present invention aims to provide a backup management device, a backup management method, a computer program, a recording medium, and a backup system, which each realize, in a case where a backup of a content exists, deletion of the content such that the deleted content can be restored later while protecting a copyright thereof.

Means to Solve the Problems

In order to solve the above problem, the present invention provides a backup management device comprising: a first storage unit that stores a content; a secure storage unit that stores playback right information showing a right to play back the content; a second storage unit that stores a backup of the content; an acquisition unit operable to acquire an instruction to delete the content so as to be restorable; and a deletion unit operable, if the instruction is acquired, to delete the content without deleting the playback right information.

EFFECT OF THE INVENTION

According to this structure, even if the one of the contents is deleted from the first storage unit, the backup management device according to the present invention does not delete the corresponding backup. Therefore, the one of the contents that has been deleted can be restored later. Furthermore, the backup management device holds the corresponding piece of the playback right information generated using the one of the contents before being deleted. Accordingly, after restoration of the one of the contents, whether use of the restored one of the contents is illegitimate is judged, and therefore a copyright of the one of the contents is protected.

Also, the playback right information may be used for judging whether the backup is permitted to be played back.

According to this structure, after restoration of the one of the contents, whether the restored one of the contents is permitted to be played back can be judged using the corresponding piece of the playback right information.

Here, pieces of the playback right information correspond to the contents respectively, each indicate to have a right to play back the corresponding content, and include information for identifying the content such as an identifier for identifying the content and a hash value of the content.

For example, if a playback device including the backup management device and so on that plays back contents holds pieces of the playback right information, the playback device plays back one of the contents corresponding to a piece of the playback right information. If the playback device does not hold the piece of the playback right information, the playback device does not playback the corresponding one of the contents.

Also, the playback right information may be a hash value generated by applying a calculation using a one-way function to at least part of the content, and if a value generated by applying the calculation to at least part of a content stored in the first storage unit matches the hash value, the content stored in the first storage unit may be permitted to be played back.

According to this structure, after restoration of the one of the contents, whether part of any one of the contents relating to a hash value matches part of the restored one of the contents is judged using the hash value, and therefore whether the restored one of the contents is permitted to be played back can be judged.

Also, the content may include: an encryption key; and an encrypted work generated by encrypting a digital work using the encryption key, the playback right information may be a hash value generated by applying the calculation to the encryption key, and if a value generated by applying the calculation to an encryption key included in a content stored in the first storage unit matches the hash value, the content stored in the first storage unit may be permitted to be played back.

According to this structure, after restoration of the one of the contents, whether an encryption key relating to a hash value matches the encryption key included in the restored one of the contents is judged using the hash value, and therefore whether the restored one of the contents is permitted to be played back can be judged.

Also, the content may include: an encrypted work generated by encrypting a digital work using an encryption key; and an encrypted key generated by encrypting the encryption key using a specific key that is specific to the backup management device, the playback right information may be a hash value generated by applying the calculation to the encrypted key, and if a value generated by applying the calculation to an encrypted key included in a content stored in the first storage unit matches the hash value, the content stored in the first storage unit may be permitted to be played back.

According to this structure, after restoration of the one of the contents, whether an encrypted key relating to a hash value matches the encrypted key included in the restored one of the contents is judged using the hash value, and therefore whether the restored one of the contents is permitted to be played back can be judged.

Also, the content may include: an encrypted work generated by encrypting a digital work using an encryption key; and an encrypted key generated by encrypting the encryption key using a specific key that is specific to the backup management device, the playback right information may be a hash value generated by applying the calculation to at least part of the encrypted work, and if a value generated by applying the calculation to at least part of an encrypted work included in a content stored in the first storage unit matches the hash value, the content stored in the first storage unit may be permitted to be played back.

According to this structure, after restoration of the one of the contents, whether an encrypted work relating to a hash value matches the encrypted work included in the restored one of the contents is judged using the hash value, and therefore whether the restored content is permitted to be played back can be judged.

Also, the content may include: an encrypted work generated by encrypting a digital work using an encryption key; and an encrypted key generated by encrypting the encryption key using a specific key that is specific to the backup management device, the playback right information may be a hash value generated by applying the calculation to a combination of at least part of the encrypted work and the encrypted key, and if a value generated by applying the calculation to a combination of at least part of an encrypted work and an encrypted key included in a content stored in the first storage unit matches the hash value, the content stored in the first storage unit may be permitted to be played back.

According to this structure, after restoration of the one of the contents, whether a combination of an encrypted work and an encrypted key relating to a hash value matches the combination of the encrypted work and the encrypted key included in the restored one of the contents is judged using the hash value, and therefore whether the restored one of the contents is permitted to be played back can be judged.

Also, the playback right information may be a hash value generated by applying a calculation using a one-way function to the content, and if a value generated by applying the calculation to a content stored in the first storage unit matches the hash value, the content stored in the first storage unit may be permitted to be played back.

According to this structure, after restoration of the one of the contents, whether a content relating to a hash value matches the restored one of the contents is judged using the hash value, and therefore whether the restored one of the contents is permitted to be played back can be judged.

Also, the acquisition unit may further acquire a restoration instruction to restore the content, and the backup management device may further comprise a restoration unit operable, if the restoration instruction is acquired, to read the backup from the second storage unit, and write the read backup to the first storage unit.

According to this structure, the backup management device can restore of the one of the contents using the corresponding backup, and use the restored one of the contents.

Also, the acquisition unit may further acquire a deletion instruction to delete the content, and the backup management device may further comprise a complete deletion unit operable, if the deletion instruction is acquired, to delete the backup from the second storage unit, and delete the playback right information from the secure storage unit.

According to this structure, the backup management device can completely delete the one of the contents, and therefore the one of the contents can be protected from being played back.

Also, the acquisition unit may further acquire a move instruction to move the content to another device, and the backup management device may further comprise: a transmission unit operable, if the move instruction is acquired, to read the backup from the second storage unit, and transmit the read backup to the another device; and a complete deletion unit operable to delete the backup from the second storage unit, and delete the playback right information from the secure storage unit.

According to this structure, the backup management device can move the one of the contents that has been deleted so as to be restorable to another device, while protecting a copyright thereof.

A backup management method according to the present invention is a backup management method for use in a backup management device, the backup management device comprising: a first storage unit that stores a content; a secure storage unit that stores playback right information showing a right to play back the content; a second storage unit that stores a backup of the content; the backup management method comprising the steps of: acquiring an instruction to delete the content so as to be restorable; and deleting, if the instruction is acquired, the content without deleting the playback right information.

A computer program according to the present invention is a computer program for use in a backup management device, the backup management device comprising: a first storage unit that stores a content; a secure storage unit that stores playback right information showing a right to play back the content; a second storage unit that stores a backup of the content; the computer program causing a computer to perform the steps of: acquiring an instruction to delete the content so as to be restorable; and deleting, if the instruction is acquired, the content without deleting the playback right information.

Also, a recording medium according to the present invention is a computer readable recording medium that records the computer program.

Also, an integrated circuit according to the present invention is an integrated circuit for use in a backup management device, the backup management device comprising: a first storage unit that stores a content; a secure storage unit that stores playback right information showing a right to play back the content; a second storage unit that stores a backup of the content; the integrated circuit comprising the steps of: acquiring an instruction to delete the content so as to be restorable; and deleting, if the instruction is acquired, the content without deleting the playback right information.

According to this structure, if the content is deleted from the first storage unit, the backup is not deleted. Therefore, the deleted content can be restored later. Furthermore, the backup management device holds the playback right information generated using the content before being deleted. Therefore, after restoration of the content, whether use of the restored content is illegitimate is judged, and therefore a copyright of the content can be protected.

A backup system according to the present invention is a backup system comprising a recording/playback device that stores and plays back a content and a backup device that manages a backup of the content, wherein the backup device stores the backup, the recording/playback device comprises: a storage unit that stores the content; a secure storage unit that stores playback right information showing a right to play back the content; an acquisition unit operable to acquire an instruction to delete the content so as to be restorable; and a deletion unit operable, if the instruction is acquired, to delete the content without deleting the playback right information, nor instructing the backup system to delete the backup.

According to this structure, if the content is deleted from the first storage unit, the backup stored in the backup device is not deleted. Therefore, the deleted content can be restored later. Furthermore, the backup management device holds the playback right information generated using the content before being deleted. Therefore, after restoration of the content from the backup device, whether use of the restored content is illegitimate is judged, and therefore a copyright of the content can be protected.

Also, the content and the backup may respectively include: an encrypted work generated by encrypting a digital work using an encryption key; and an encrypted key generated by encrypting the encryption key using a specific key that is specific to the recording/playback device, the backup system may further comprise a request device, the request device may include: a request key storage unit that stores a request key that is specific to the request device; a transfer request transmission unit operable to transmit a transfer request of the backup to the recording/playback device; an encryption key receiving unit operable to securely receive the encryption key, as a response to the transfer request, from the recording/playback device; and a key transmission unit operable, if the encryption key is received, to read the request key, encrypt the encryption key using the read request key to generate a re-encrypted key, and transmit the generated re-encrypted key to the backup device, the recording/playback device may further include: a specific key storage unit that stores the specific key; a transfer request receiving unit operable to receive the transfer request from the request device; an encrypted key request unit operable, if the transfer request is received, to transmit a transmission request of the encrypted key included in the backup to the backup device; an encrypted key receiving unit operable to receive the encrypted key, as a response to the transmission request, from the backup device; an encryption key transmission unit operable, if the encrypted key is received, to read the specific key, decrypt the received encrypted key using the specific key to generate an encryption key, and transmit the generated encryption key to the request device; and a playback right information deletion unit operable to delete the playback right information from the secure storage unit, and the backup device may include: an encrypted key request receiving unit operable to receive the transmission request; and an encrypted key transmission unit operable, if the transmission request is received, to transmit the encrypted key included in the backup to the recording/playback device.

According to this structure, a transfer of a proprietary right of the backup stored in the backup device is realized by performing decryption of the encrypted key and re-encryption of the decrypted encryption key, without decrypting the encrypted work. This can reduce the processing load of the system due to the transfer of the proprietary right compared with conventional arts.

Here, in order to securely receive information such as the encryption key that needs to be secret, a method is used in accordance with a specification for realizing highly confidential communication, such as DTCP (Digital Transmission Content Protection), as an example.

Also, the backup may include: an encrypted work generated by encrypting a digital work using an encryption key; and an encrypted key generated by encrypting the encryption key using a specific key that is specific to the recording/playback device, the backup system may further comprise a request device, the request device may store a secret key for decrypting an encryption key encrypted using a public key, and transmit a transfer request of the backup to the recording/playback device, the recording/playback device may further include: a transfer request receiving unit operable to receive the transfer request from the request device; an encrypted key request unit operable, if the transfer request is received, to transmit a transmission request of the encrypted key included in the backup to the backup device; an encrypted key receiving unit operable to receive the encrypted key, as a response to the transmission request, from the backup device; a re-encrypted key generation unit that stores beforehand the specific key and the public key, and operable to decrypt the received encrypted key using the specific key to generate the encryption key, and encrypt the generated encryption key using the public key to generate a re-encrypted key; a transmission unit operable to transmit, to the backup device, a rewriting request including the generated re-encrypted key and for instructing to rewrite the encrypted key included in the backup to the generated re-encrypted key; and a deletion unit operable to delete the playback right information from the secure storage unit, and the backup device may include: an encrypted key request receiving unit operable to receive the transmission request; an encrypted key transmission unit operable, if the transmission request is received, to transmit the encrypted key included in the backup to the recording/playback device; a rewriting request receiving unit operable to receive the rewriting request; and a rewriting unit operable to rewrite the encrypted key included in the backup to the re-encrypted key included in the received rewriting request.

According to this structure, a transfer of a proprietary right of the backup stored in the backup device is realized by performing decryption of the encrypted key by the backup device and re-encryption of the decrypted encryption key, without decrypting the encrypted work. This can reduce the processing load of the system due to the transfer of the proprietary right compared with conventional arts.

A backup management device according to the present invention is a backup management device that manages a backup of a content, comprising a specific key storage unit that stores a specific key for each device; a secure storage unit that stores playback right information showing a right to play back the content; a transfer request receiving unit operable to receive a transfer request of the backup from a request device that stores a first decryption key for decrypting a cyphertext encrypted using a first encryption key; an encrypted key acquisition unit operable, from a backup device that stores an encrypted key and the backup that has been encrypted, to acquire the encrypted key, the encrypted key being encrypted so as to be decrypted into a second decryption key for decrypting the encrypted backup using the specific key; a re-encrypted key generation unit operable to generate a re-encrypted key by decrypting the acquired encrypted key using the specific key to generate the second decryption key, and encrypting the generated second decryption key using the first encryption key; an instruction unit operable to transmit the re-encrypted key to the backup device to instruct the backup device to rewrite the encrypted key stored therein to the re-encrypted key; and a deletion unit operable to delete the playback right information from the secure storage unit.

According to this structure, a transfer of a proprietary right of the backup stored in the backup device is realized by performing decryption of the encrypted key and re-encryption of the decrypted encryption key, without decrypting the encrypted backup. This can reduce the processing load of the system due to the transfer of the proprietary right compared with conventional arts.

BRIEF DESCRIPTION OF THE DRAWINGS

FIG. 5 is a schematic diagram showing data stored in a secure storage unit;

FIG. 28 shows an example of a backup management table stored in a secure information storage unit;

FIG. 38 shows one example of a simplified backup management table; and

FIG. 39 is a block diagram showing a detailed structure of a control unit.

DESCRIPTION OF CHARACTERS

Figure 1:
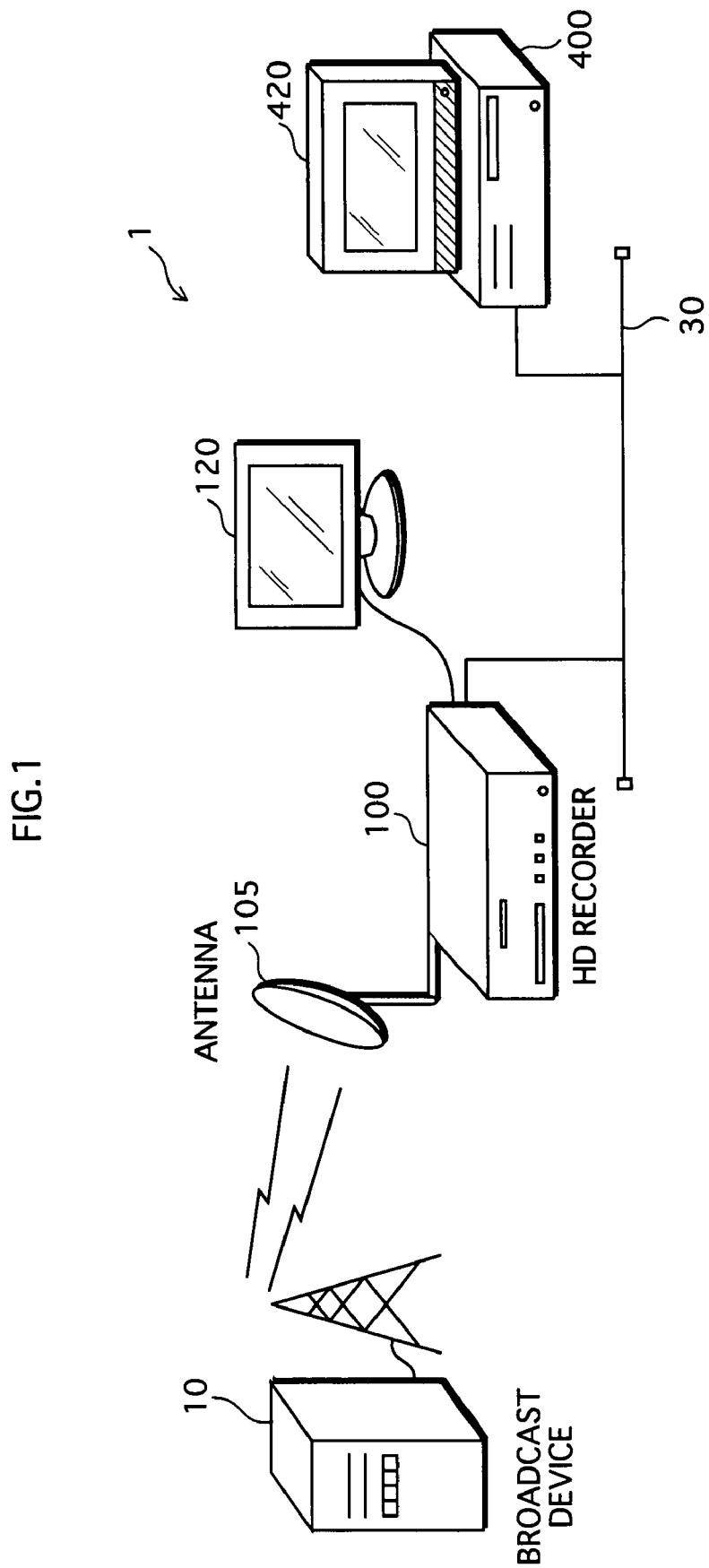
FIG. 1 is a schematic diagram showing a structure of a backup system according to a first embodiment of the present invention.

1: backup system
2: backup system
10: broadcast device
30: home network
100: HD recorder
101: specific information storage unit
102: information storage unit
103: information storage unit
104: secure storage unit
105: antenna
106: broadcast receiving unit
107: decoding unit
108: key generation unit
109: encryption processing unit
110: input unit
111: input/output unit
112: playback control unit
113: control unit 114: authentication unit
115: transmission/reception unit
120: monitor
400: HD recorder
500: backup device
501: transmission/reception unit
502: authentication unit
503: power supply unit
504: specific information storage unit
507: control unit
509: encryption processing unit
510: content storage unit
511: secure information storage unit
512: input unit
513: display unit
516: device-specific key

DETAILED DESCRIPTION OF THE INVENTION

The following describes embodiments of the present invention with reference to example drawings.

First Embodiment

A backup system 1 of a first embodiment according to the present invention is described with reference to the drawings.
<Outline of Backup System 1>
The backup system 1 according to the present invention includes a hard disk recorder (hereinafter, HD recorder) 100 and an HD recorder 400 having the same internal structure as the HD recorder 100, as shown in FIG. 1. The HD recorder 100 and the HD recorder 400 are connected with each other via a home network 30 based on IEEE1394.

The HD recorder 100 acquires a content composed of a video and a sound by receiving a broadcast wave transmitted from a broadcast device 10, and stores the acquired content. Moreover, the HD recorder 100 is equipped with a DVD as an external recording medium, and can acquire contents from the external recording medium.

The HD recorder 100 includes two hard disks. One is a work hard disk having a small capacity for recording frequently used contents, and the other is a backup hard disk having a large capacity for recording infrequently used contents and copies of contents as backups of the contents.

Based on a user's operation, the HD recorder 100 backs up contents stored in the work hard disk to the backup hard disk, moves the contents to the HD recorder 400, and the like.

Here, the work hard disk included in the HD recorder 100 has a capacity smaller than the backup hard disk, and therefore easily reaches a maximum of the capacity due to accumulation of contents.

Figure 2:
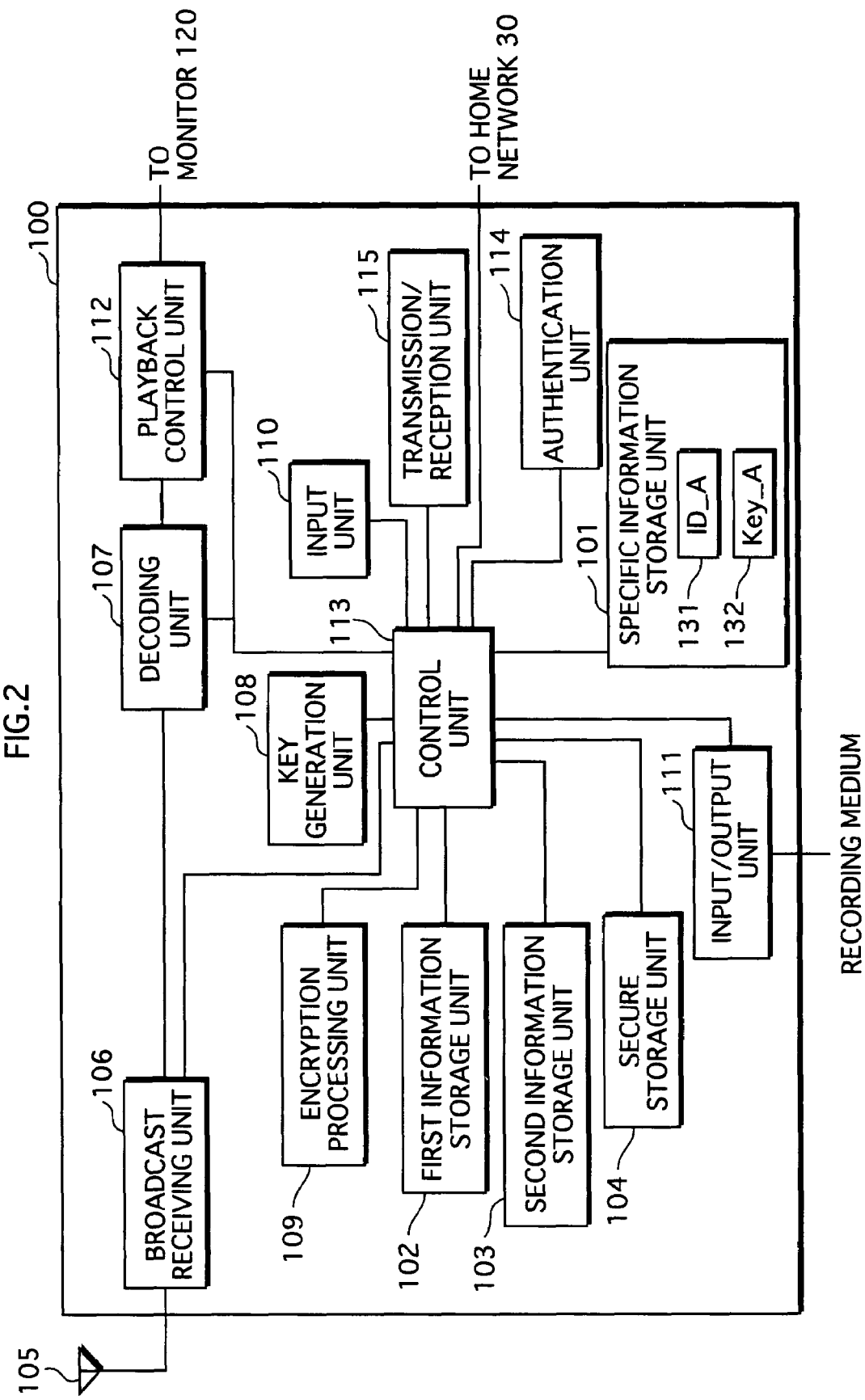
FIG. 2 is a block diagram showing a structure of an HD recorder according to the first embodiment of the present invention.

In the HD recorder 100, if the work hard disk reaches the maximum of the capacity, a content having a lower priority level is deleted so as to make the capacity. A content targeted for recording is accumulated, and then the deleted content is restored later. In this way, the HD recorder 100 aims to improve in convenience. However, in compensation for the improvement in convenience, there might occur a case where a plurality of copies of a content having a copy-incapable attribute attached thereto exist in different hard disks at a time. The HD recorder 100 also aims to protect a copyright of the content in such a case.
<HD Recorder 100 and HD Recorder 400>
The HD recorder 100 includes, as shown in FIG. 2, a specific information storage unit 101, a first information storage unit 102, a second information storage unit 103, a secure storage unit 104, an antenna 105, a broadcast receiving unit 106, a decoding unit 107, a key generation unit 108, an encryption processing unit 109, an input unit 110, an input/output unit 111, a playback control unit 112, a control unit 113, an authentication unit 114, and a transmission/reception unit 115.

The HD recorder 100 is specifically a computer system composed of a microprocessor, a RAM, and a ROM. A computer program is stored in the RAM and the ROM. Part of functions of the HD recorder 100 is achieved by the microprocessor operating in accordance with the computer program.

In addition, the structure and operations of the HD recorder 400 are the same as those of the HD recorder 100, and therefore descriptions thereof are omitted here.

The specific information storage unit 101 is composed of a ROM, and stores a device identifier 131 "ID_A" and a device-specific key 132 "Key_A". Moreover, the specific information storage unit 101 includes a protection mechanism, and is protected against accesses from an external device.

The device identifier 131 "ID_A" is identification information that indicates the HD recorder 100. The device-specific key 132 "Key_A" is key information specific to the HD recorder 100. The device identifier 131 "ID_A" and the device-specific key 132 "Key_A" are prestored in the specific information storage unit 101 before shipment of the HD recorder 100.

Moreover, a specific information storage unit 101 of the HD recorder 400 is composed of a ROM, and stores a device identifier 131 "ID_B" and a device-specific key 132 "Key_B". The device identifier 131 "ID_B" is identification information that indicates the HD recorder 400. The device-specific key 132 "Key_B" is key information specific to the HD recorder 400. The device identifier 131 "ID_B" and the device-specific key 132 "Key_B" are prestored in the specific information storage unit 101 before shipment of the HD recorder 400.

Figure 3:
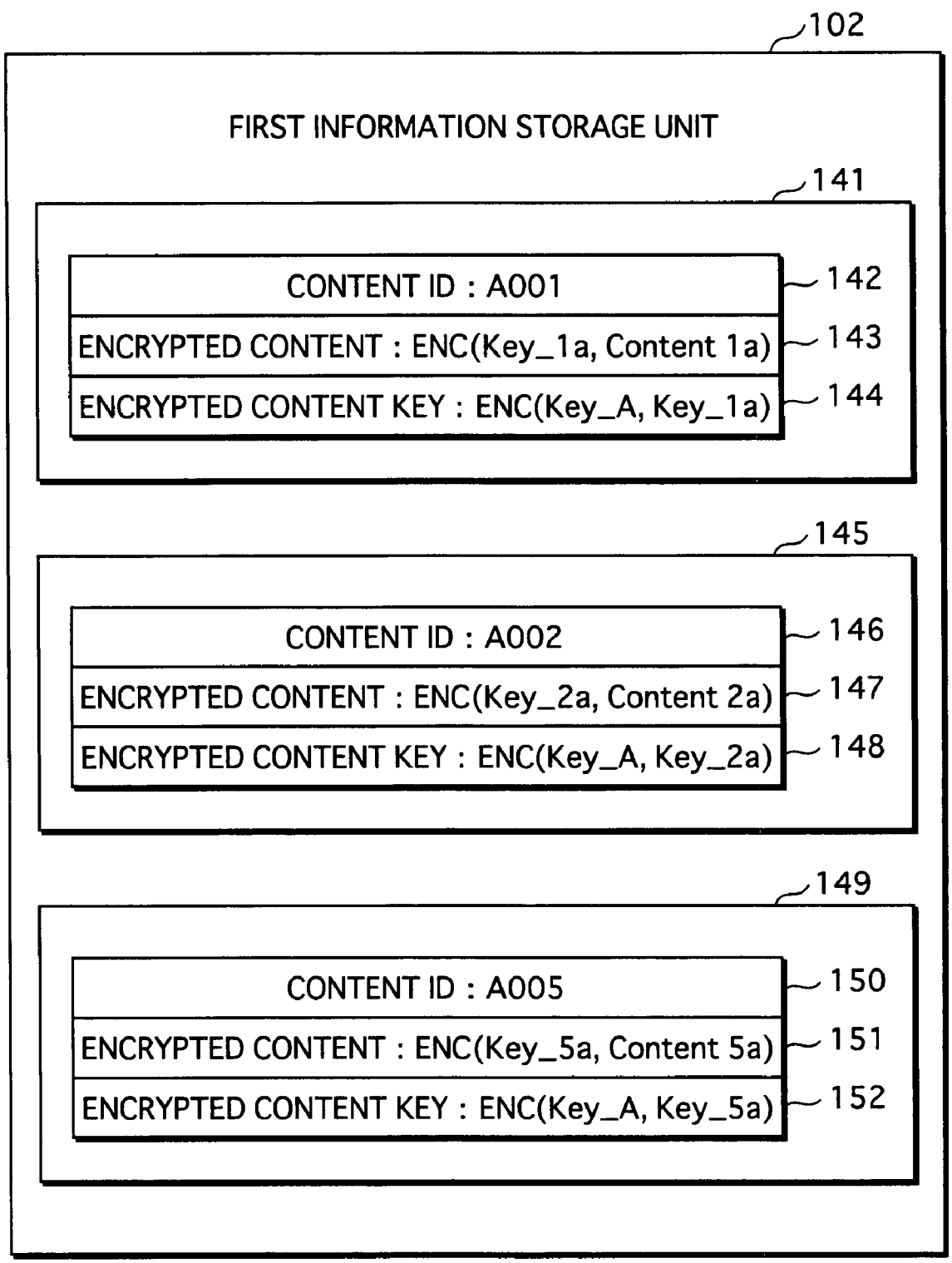
FIG. 3 is a schematic diagram showing data stored in a first information storage unit.

The first information storage unit 102 is a work hard disk composed of hard disk units, and stores content files 141, 145, 149, and so on, as one example as shown in FIG. 3. Each of the content files includes a content ID, an encrypted content, and an encrypted content key.

Here, the content ID is identification information that indicates the encrypted content. The encrypted content is a content encrypted using one of content keys that correspond one-to-one with contents. The encrypted content key is generated by applying an encryption algorithm E1 to the content key using the device-specific key 132 "Key_A" stored in the specific information storage unit 101. Here, the encryption algorithm E1 is the DES (Data Encryption Standard) encryption algorithm, for example.

The DES encryption algorithm is a well-known art, and therefore a description thereof is omitted here.

The content file 141 includes, for example, a content ID 142 "A001", an encrypted content 143 "ENC (Key_1a, Content1a)", and an encrypted content key 144 "ENC (Key_A, Key_1a)".

The content ID 142 "A001" is identification information that indicates the encrypted content 143. The encrypted content 143 is generated by applying the encryption algorithm E1 to a content "Content1a" that includes a video using a content key "Key_1a". The encrypted content key 144 "ENC (Key_A, Key_1a)" is generated by applying the encryption algorithm E1 to the content key "Key_1a" using the device-specific key 132 "Key_A" stored in the specific information storage unit 101. The content key "Key_1a" corresponds one-to-one with the content "Content1a".

In addition to these content files, the first information storage unit 102 stores various types of image data used for generating a menu screen, an initial-setting screen, and the like.

The second information storage unit 103 is a backup hard disk composed of hard disk units, and has a storage capacity larger than the first information storage unit 102. Also, the second information storage unit 103 is not frequently used, and therefore has a long life.

Figure 4:
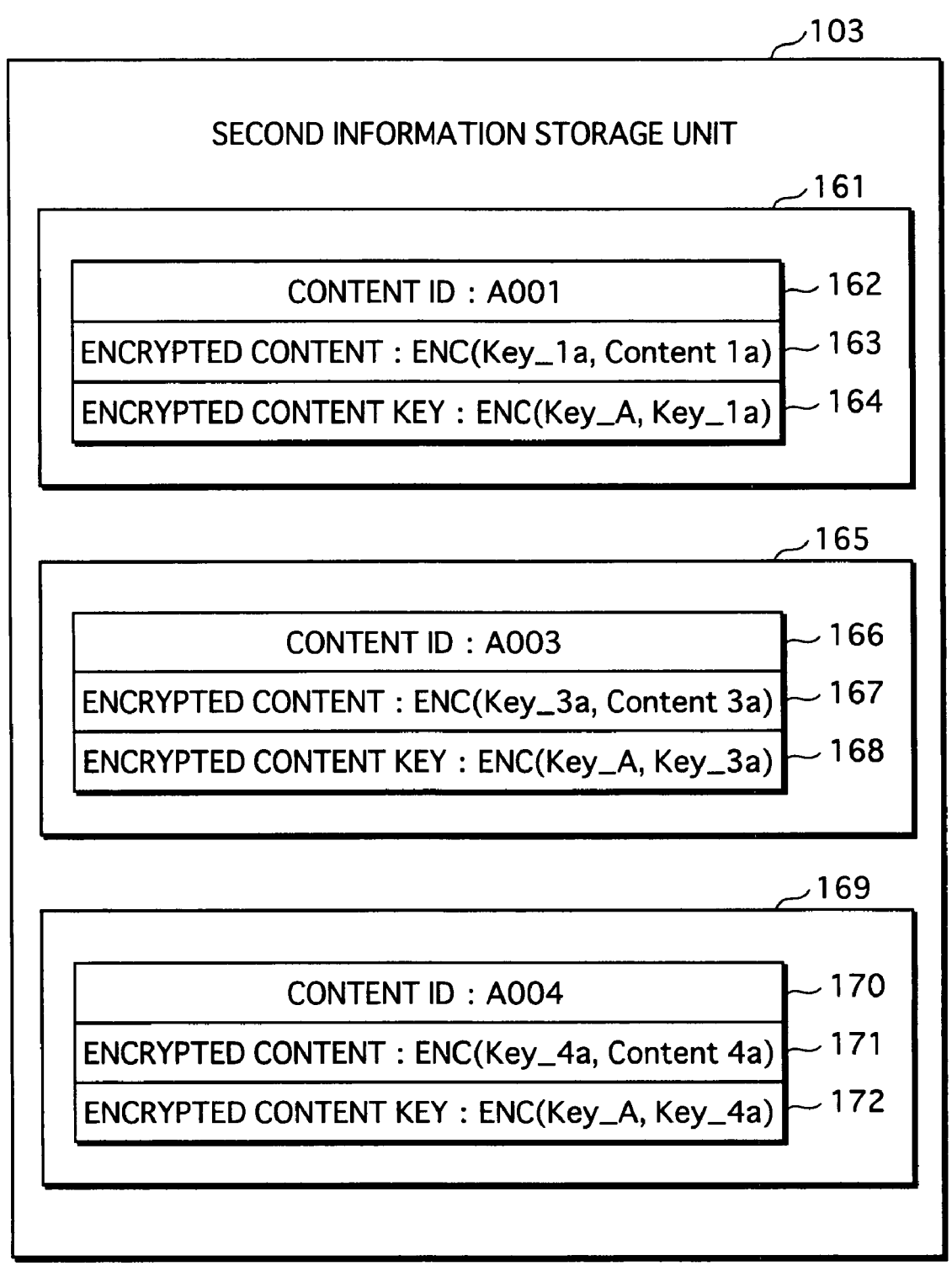
FIG. 4 is a schematic diagram showing data stored in a second information storage unit.

In the same way as the first information storage unit 102, the second information storage unit 103 stores content files 161, 165, 169, and so on, as one example as shown in FIG. 4.

Here, the content file 161 stored in the second information storage unit 103 is a backup of the content file 141 stored in the first information storage unit 102, and is equivalent to the content file 141.

With respect to the content file 165 including a content ID "A003", a content file equivalent to the content file 165 is not stored in the first information storage unit 102. In other words, only a backup of the content is stored in the second information storage unit 103. The same applies to the content file 169.

The secure storage unit 104 includes a flash memory, and is protected against accesses from an external device.

The secure storage unit 104 stores a content management table 180 shown in FIG. 5, for example. The content management table 180 includes a plurality of pieces of content information 181, 182, 183, 184, and 185, as shown in FIG. 5. Each piece of the content information is composed of a content ID, a title, a recording date and time, a hash value, a type, a compression format, a backup flag, and a priority level. Each piece of the content information corresponds with a content file including a content ID that is the same as the content ID included in the piece of the content information.

The content ID is identification information that indicates an encrypted content included in corresponding content files respectively stored in the first information storage unit 102 and the second information storage unit 103, and is the same as the content ID included in the corresponding content file.

The title is a name that shows a content, and is generated based on program information transmitted from a broadcasting station. The title can be rewritten by the user's operation. The recording date and time shows a date and a time when the content is acquired from the broadcasting station or the external recording medium. The type shows a type of the content such as a "broadcasting program" showing that the content is a content received from the broadcasting station, a "photograph" showing that the content is image data photographed by a digital camera, etc.

The compression format shows a name of a compression format used for compressing a video and a sound that constitute the content.

The hash value is generated by combining the encrypted content and an encrypted content key that are included in the corresponding content file and assigning the combination to a hash function. The hash function used here is the SHA-1 (Secure Hash Algorithm-1) for example.

The SHA-1 is a well-known art, and therefore a description thereof is omitted here.

The backup flag is a flag that shows whether a content file corresponding to content information including the backup flag has been backed up to the second information storage unit 103. The backup flag has either values of "1" or "0". The value of "1" shows that the content file has been backed up, and the value of "0" shows that the content file has not been backed up yet.

The priority level is information that shows a priority level of saving the content, and has either values of "1" or "2". If an available capacity of the first information storage unit 102 is insufficient for writing a new encrypted content to the first information storage unit 102, the control unit 113 backs up a content file corresponding to content information including a priority level having a value of "2" among the content files stored in the first information storage unit 102 to the second information storage unit 103. Then, the control unit 113 deletes the content file from the first information storage unit 102 to make the storage capacity of the first information storage unit 102. Even if the available capacity of the first information storage unit 102 becomes insufficient, the control unit 113 neither backs up a content file corresponding to content information having a priority level "1" nor deletes the content file from the first information storage unit 102. Although the priority level is automatically set to have a value of "1" when a content is acquired, the value can be changed by the user's operation.

Regarding the content information 181 for example, a content ID 191 "A001" is identification information that indicates the encrypted contents 143 and 163, and is the same as the content ID 142 "A001" and a content ID 162 "A001". A title 192 "Content1*a*" is a name of a content acquired from a broadcast wave. Moreover, a recording date and time 193 "04. 10. 10. 17:00" shows that the encrypted content 143 was generated by encrypting a content acquired at 17:00 on Oct. 10, 2004. A hash value 194 "01*a*" is generated by assigning the combination of the encrypted content 143 and the encrypted content key 144 "ENC (Key_A, Key_1*a*)" to the hash function. Moreover, the content file 161 equivalent to the content file 141 is stored in the second information storage unit 103, and therefore a backup flag 197 included in the content information 181 has a value of "1".

Here, the content information 181 corresponds with the two content files, which are the content file 141 stored in the first information storage unit 102 and the content file 161 stored in the second information storage unit 103. However, if the content file has not been backed up, the content information 181 corresponds with one content file stored in the first information storage unit 102.

The antenna 105 receives a broadcast wave transmitted from the broadcasting station.

The broadcast receiving unit 106 includes a tuner, a modulation/demodulation unit, an error correction unit, and a demultiplexing unit. Upon receiving an instruction to receive television broadcasts from the control unit 113, the broadcast receiving unit 106 demodulates a broadcast wave received by the antenna 105, corrects an error included in the broadcast wave, and demultiplexes the broadcast wave to generate a TS (transport stream), and outputs the generated TS to the decoding unit 107.

Moreover, the broadcast receiving unit 106 receives, from the control unit 113, a recording start instruction to start recording of a content being received and a recording stop instruction to stop the recording. Upon receiving the recording start instruction, the broadcast receiving unit 106 outputs the generated TS to the encryption processing unit 109 until the broadcast receiving unit 106 has received the recording stop instruction.

In the following description, as long as there is no special need, no mention is made regarding a TS that constitutes a content, and a simple word "content" is used.

In accordance with an instruction by the control unit 113, the decoding unit 107 expands a content acquired by the broadcast receiving unit 106 and a content generated by the encryption processing unit 109 (later described) in accordance with a compression format of each content, such as the MPEG (Moving Picture Experts Group) 2 and the JPEG (Joint Photographic Experts Group), to generate image data and sound data. Then, the decoding unit 107 outputs the generated image data and sound data to the playback control unit 112.

The MPEG2 and the JPEG are well-known arts, and therefore descriptions thereof are omitted here.

The key generation unit 108 receives an instruction to generate a content key from the control unit 113. Upon receiving the instruction to generate a content key, the key generation unit 108 generates a content key of 56 bit length using a pseudo-random number, and outputs the generated content key to the control unit 113.

The encryption processing unit 109 receives a plaintext and a key from the control unit 113, and is instructed by the control unit 113 to encrypt the plaintext. Also, the encryption processing unit 109 receives a ciphertext and a key from the control unit 113, and is instructed by the control unit 113 to decrypt the ciphertext.

Upon receiving the encryption instruction, the encryption processing unit 109 applies the encryption algorithm E1 to the received plaintext using the received key to generate a ciphertext, and outputs the generated ciphertext to the control unit 113.

Upon receiving the decryption instruction, the encryption processing unit 109 applies a decryption algorithm D1 to the received ciphertext using the received key to generate a decrypted text, and outputs the generated decrypted text to the control unit 113.

A pair of a plaintext and a key received by the encryption processing unit 109 is composed of a content and a content key, or a content key and the device-specific key 132 "Key_A", for example. Also, a pair of a ciphertext and a key received by the encryption processing unit 109 is composed of an encrypted content and a content key, or an encrypted content key and the device-specific key 132 "Key_A", for example.

The decryption algorithm D1 is an algorithm for decrypting ciphertexts generated by the encryption algorithm E1.

The input unit 110 includes various types of buttons such as a power button, a recording button, a menu button, and a selection button, and a receiving circuit of a remote controller.

The input unit 110 receives operations of the buttons and the remote controller performed by the user, and outputs operation instruction information that shows the received operations of the buttons and the remote controller to the control unit 113.

The input/output unit 111 reads and writes information from/into the DVD in accordance with an instruction by the control unit 113.

The playback control unit 112 includes an image signal processing unit and a sound signal processing unit. The playback control unit 112 receives image data and sound data from the decoding unit 107. The image signal processing unit generates an image signal including a vertical synchronizing signal and a horizontal synchronizing signal from the received image data, and outputs the generated image signal to a monitor 120. Moreover, in accordance with an instruction by the control unit 113, the image signal processing unit generates an image signal from various types of screen data, and outputs the generated image signal to the monitor 120.

The sound signal processing unit generates an analog sound signal from the received sound data, and outputs the generated analog sound signal to the monitor 120. Here, the monitor 120 is a TV receiver having a speaker and a display included therein, receives the image signal from the image signal processing unit, and displays an image based on the vertical synchronizing signal and the horizontal synchronizing signal. Moreover, the speaker receives the analog sound signal from the sound signal processing unit, converts the received analog sound signal into a sound, and outputs the sound.

The authentication unit 114 stores beforehand a secret key specific to the HD recorder 100 "SK_A", a public key certificate "Cert_A", a public key of a certification authority "PK_CA", and a CRL (Certificate Revocation List). The public key certificate "Cert_A" certifies legitimacy of a public key "PK_A" corresponding to the secret key "SK_A", and includes a certification identification number, the public key "PK_A", and signature data of the certification authority. The signature data of the certification authority is generated by applying a signature generation algorithm S to at least the public key "PK_A" using the secret key of the certification authority "SK_A". The signature generation algorithm S is the RSA (Rivest-Rivest-Shamir-Adleman) signature algorithm, for example.

The RSA signature algorithm is a well-known art, and therefore a description thereof is omitted here.

Instead of the RSA signature algorithm, the elliptic DSA (Digital Signature Algorithm) signature algorithm, the Elgamal signature algorithm over a finite field, etc. may be used.

Here, the certification authority is a fair independent organization, and issues a public key certificate to each device that constitutes the backup system 1 of the first embodiment.

The CRL includes a certification identification number of an invalidated public key certificate.

The public key of the certification authority "PK_CA" is a public key that forms a pair with the secret key of the certification authority "SK_CA".

Upon receiving an instruction by the control unit 113, the authentication unit 114 performs device authentication between the HD recorder 100 and the external device in accordance with the DTCP (Digital Transmission Content Protection). If the device authentication fails, the authentication unit 114 prohibits a communication between the control unit 113 and the external device. If the device authentication succeeds, the authentication unit 114 generates a session key that is shared between the control unit 113 and the external device, and outputs the generated session key to the control unit 113. Operations in the device authentication are described in detail later.

The transmission/reception unit 115 is connected with the home network 30, and transmits and receives information between the external device and each of the control unit 113 and the authentication unit 114. Here, the external device is the HD recorder 400.

The transmission/reception unit 115 periodically detects whether the transmission/reception unit 115 is connected to the home network 30. If the transmission/reception unit 115 gets connected to the home network 30, the transmission/reception unit 115 transmits a connection notification to the control unit 113.

The transmission/reception unit 115 receives a broadcast instruction from the control unit 113 as a response to the connection notification. In accordance with the broadcast instruction, the transmission/reception unit 115 performs broadcast transmission of information acquisition request including device identification information of the HD recorder 100 "ID_A" to the home network 30.

The transmission/reception unit 115 receives, from another device connected to the home network 30, an information acquisition response including device identification information of the another device as a response to the information acquisition request, and transmits the received information acquisition response to the control unit 113.

The control unit 113 controls the overall operations of the HD recorder 100.

The control unit 113 includes, as shown in FIG. 39, an operation judgment unit 1001, a panel generation unit 1002, a restorability instruction unit 1003, a content operation unit 1004, a hash deletion unit 1011, a hash writing unit 1012, a hash calculation unit 1013, and a hash comparison unit 1014.

The operation judgment unit 1001 receives various types of operation instruction information from the input unit 110, and transmits a motion instruction to other processing units included in the control unit 113 depending on a type of received operation instruction information. Moreover, the operation judgment unit 1001 manages input requests to the user and a hierarchical structure of the menu screen that displays various types of information. Depending on a type of received operation instruction information, the operation judgment unit 1001 judges which panel is to be displayed next, and instructs the panel generation unit 1002 to generate the panel to be displayed next.

For example, if receiving operation instruction information that shows that the recording button has been pressed, the operation judgment unit 1001 transmits a recording instruction to perform the later-described recording processing to the content operation unit 1004. If receiving operation instruction information that shows that the menu button has been pressed, the operation judgment unit 1001 instructs the panel generation unit 1002 to generate a menu screen.

Also, if receiving operation instruction information that shows selection of the other button, the operation judgment unit 1001 performs various processing depending on data included in the operation instruction information, such as reception of TV broadcasts by the broadcast receiving unit 106, reception of timer programming, display of program lists, and input/output of information to/from the external recording medium.

The panel generation unit 1002 receives various types of panel generation instructions from the operation judgment unit 1001. The panel generation unit 1002 generates a panel specified by a received panel generation instruction using image data stored in the first information storage unit 102, and outputs the generated panel to the playback control unit 112.

Figure 18A:
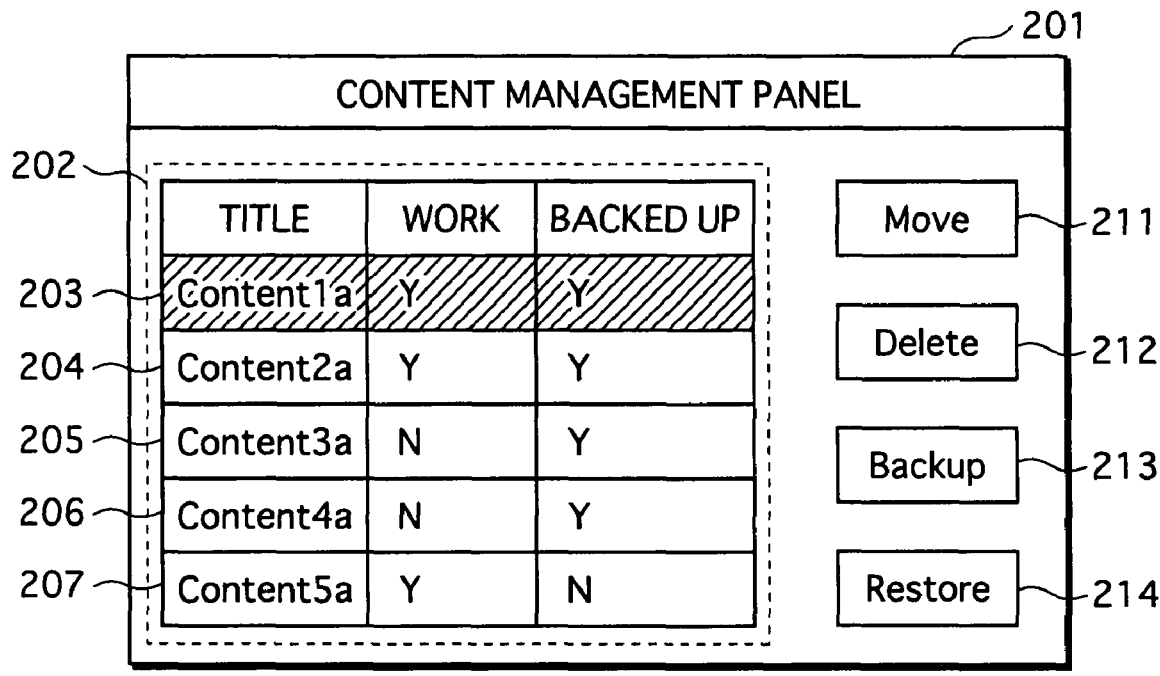
FIG. 18 shows an example of a content management panel and a move destination selection panel.

For example, if receiving a menu generation instruction from the operation judgment unit 1001, the panel generation unit 1002 generates a content management panel 201 shown in FIG. 18A based on the content management table 180 stored in the secure storage unit 104, and outputs the generated content management panel 201 to the playback control unit 112.

The content management panel 201 includes a content list panel 202, a Move button 211, a Delete button 212, a Backup button 213, and a Restore button 214. The content list panel 202 includes content panels 203 to 207. The content panels correspond one-to-one with pieces of the content information included in the content management table 180 stored in the secure storage unit 104.

Each of the content panels has items of a "title", a "work", and a "backed up". The item "title" indicates a "title" included in the corresponding content information, as it is. If a content file corresponding to the content information is stored in the first information storage unit 102, the item "work" shows "Yes". If the corresponding content file is not stored, the item "work" shows "No". If a backup flag included in the corresponding content information has a value of "1", the item "backed up," shows "Yes". If the backup flag has a value of "0", the item "backed up" shows "No".

For example, on the content panel 203 corresponding to the content information 181, the item "title" shows "Content1a", which is a title of the content information 181. The item "work" shows "Yes", which indicates that the content file 141 is stored in the first information storage unit 102. The item "backed up" shows "Yes", which indicates that a backup flag included in the content information 181 has a value of "1".

The panel generation unit 1002 generates content panels in accordance with the number of pieces of content information included in the content management table 180, and generates the content list panel 202 including the generated content panels.

The content list panel 202 is generated by combining pieces of image data held in the first information storage unit 102. The pieces of the image data include a bitmap representing a word "Yes" and a bitmap representing the Backup button 213 having a word "backed up" written thereon, for example.

The content operation unit 1004 receives instructions for operating contents from the operation judgment unit 1001, such as a move instruction, a deletion instruction, a backup instruction, and a restoration instruction. In accordance with a type of the received instruction, the content operation unit 1004 performs processing on the contents such as move processing, deletion processing, backup processing, and restoration processing.

The restorability instruction unit 1003 receives, from the operation judgment unit 1001, a restorability specification that shows whether to delete a content so as to be restorable or delete the content so as to be unrestorable, and performs control for deleting hash values.

The hash deletion unit 1011 deletes a specified hash value from the secure storage unit 104.

The hash writing unit 1012 writes a specified hash value into the secure storage unit 104.

The hash calculation unit 1013 generates a hash value.

The hash comparison unit 1014 compares two specified hash values with each other, and transmits a comparison result to the content operation unit 1004.

Next, main processing performed by the control unit 113 is described in the order of control of the recording processing, control of the playback processing, control of the move processing, control of the deletion processing, control of the backup processing, and control of the restoration processing.

(1) Control of Recording Processing

The recording processing is described using an example where the broadcast receiving unit 106 records a TV broadcast being received.

In order to start recording of a TV broadcast being received by the broadcast receiving unit 106, the user of the HD recorder 100 presses the recording button included in the remote controller. The input unit 110 detects the press of the recording button, and transmits operation instruction information that shows the press of the recording button to the operation judgment unit 1001.

Upon receiving the operation instruction information from the input unit 110, the operation judgment unit 1001 judges that the operation instruction information shows the press of the recording button, and transmits a recording instruction to the content operation unit 1004.

Upon receiving the recording instruction, the content operation unit 1004 generates a new content ID to be assigned to a content being recorded, and adds content information including the generated content ID to the content management table 180 stored in the secure storage unit 104. At this time, with respect to the added content information, the content operation unit 1004 writes a current time into the item "recording date and time", a "broadcast program" to the item "type", "MPEG2" to the item "compression format", a value of "0" to the item "backup flag", and a value of "1" to the item "priority level".

Next, the content operation unit 1004 transmits a content key generation instruction to the key generation unit 108, and receives a content key, as a response to the generation instruction, from the key generation unit 108. Upon receiving the content key, the content operation unit 1004 newly generates a content file in the first information storage unit 102.

Next, the content operation unit 1004 transmits a recording instruction to the broadcast receiving unit 106, and appropriately receives a content received from the broadcast receiving unit 106. The content operation unit 1004 outputs the content key received from the key generation unit 108 and the content received from the broadcast receiving unit 106 to the encryption processing unit 109, and instructs the encryption processing unit 109 to encrypt the content. Then, the content operation unit 1004 receives an encrypted content from the encryption processing unit 109.

The content operation unit 1004 writes the received encrypted content into the content file newly generated in the first information storage unit 102.

Note that the broadcast receiving unit 106 does not receive all parts of the content at a time. Therefore, the broadcast receiving unit 106 transmits a received part of the content to the content operation unit 1004. Each time a part of the content received from the broadcast receiving unit 106 reaches a predetermined length, the content operation unit 1004 outputs the part of the content to the encryption processing unit 109. The encryption processing unit 109 performs the encryption for each part of the content having the predetermined length.

Simultaneously with this writing, the content operation unit 1004 monitors whether the first information storage unit 102 has an available capacity. If the available capacity is insufficient, the content operation unit 1004 selects a piece of content information whose priority level has a value of "2" among pieces of content information included in the content management table 180, deletes a content file corresponding to the selected piece of the content information from the first information storage unit 102, and deletes the selected piece of the content information from the content management table 180.

If a piece whose propriety level having a value of "2" among pieces of the content information that constitute the content management table 180 does not exist, that is, if no content that may be deleted exists in the first information storage unit 102, the content operation unit 1004 notifies the user of a stop of the recording because of an insufficient available capacity by flashing a lamp (not illustrated), for example.

If the available capacity of the first information storage unit 102 is insufficient and therefore the content operation unit 1004 stops the recording, or if the content operation unit 1004 receives operation instruction information that shows that a stop button has been pressed from the input unit 110 via the operation judgment unit 1001, the content operation unit 1004 transmits a recording stop instruction to the broadcast receiving unit 106.

Next, the content operation unit 1004 reads the device-specific key 132 "Key_A" from the specific information storage unit 101, outputs the read device-specific key 132 "Key_A" and the content key to the encryption processing unit 109, and instructs the encryption processing unit 109 to encrypt the content key. The content operation unit 1004 receives an encrypted content key, as a response to the encryption instruction, from the encryption processing unit 109, writes the received encrypted content key and the generated content ID into the generated content file, and transmits a hash generation instruction including the content ID to the hash calculation unit 1013.

Next, upon receiving the hash generation instruction including the content ID, the hash calculation unit 1013 reads the encrypted content and the encrypted content key from the content file corresponding to the content ID. The hash calculation unit 1013 combines the read encrypted content and encrypted content key, assigns the combination to a hash function to generate a hash value of 160 bit length, and transmits the content ID and the hash value to the hash writing unit 1012.

The hash writing unit 1012 writes the received hash value into the content information including the content ID.

(2) Control of Playback Processing

In a state where the content management panel 201 shown in FIG. 18A is displayed on the monitor 120 and any one of the content panels 203 to 207 is selected, if receiving operation instruction information that shows that the playback button has been pressed from the input unit 110, the operation judgment unit 1001 reads a content ID included in content information corresponding to the selected content panel from the secure storage unit 104, and transmits a playback instruction including the read content ID to the content operation unit 1004.

The content operation unit 1004 detects, from the first information storage unit 102, a content file including a content ID that matches the content ID included in the playback instruction. The content operation unit 1004 reads an encrypted content and an encrypted content key from the detected content file, and transmits the content ID, the read encrypted content, and the read encrypted content key to the hash calculation unit 1013.

The hash calculation unit 1013 combines the received encrypted content and encrypted content key, assigns the combination to the hash function to calculate a hash value, and transmits the calculated hash value and the content ID to the hash comparison unit 1014.

The hash comparison unit 1014 reads the content information including the content ID from the secure storage unit 104, compares the hash value included in the read content information with the received hash value, and transmits a comparison result that shows whether they match each other to the content operation unit 1004.

The content operation unit 1004 receives the comparison result from the hash comparison unit 1014. If the comparison result shows that the values do not match each other, the content operation unit 1004 transmits a playback error notification to the operation judgment unit 1001.

Upon receiving the playback error notification, the operation judgment unit 1001 instructs the panel generation unit 1002 to generate a panel that displays an error screen that shows that the selected content cannot be played back.

The panel generation unit 1002 generates the panel that displays the error screen in accordance with the generation instruction received from the operation judgment unit 1001, and outputs the generated panel to the playback control unit 112. Moreover, the content operation unit 1004 stops the playback processing of the content.

If the comparison result received from the hash comparison unit 1014 shows that the values match each other, the content operation unit 1004 reads the device-specific key 132 "Key_A" from the specific information storage unit 101, outputs the read device-specific key 132 "Key_A" and the read encrypted content key to the encryption processing unit 109, and instructs the encryption processing unit 109 to decrypt the encrypted content key.

The content operation unit 1004 receives a content key, as a response to the decryption instruction, from the encryption processing unit 109. Upon receiving the content key, the content operation unit 1004 reads the encrypted content from the detected content file, outputs the read encrypted content and the received content key to the encryption processing unit 109, and instructs the encryption processing unit 109 to decrypt the encrypted content. The content operation unit 1004 receives a decrypted content, as a response to the decryption instruction, from the encryption processing unit 109, and outputs the received content to the decoding unit 107.

(3) Control of Move Processing

In a state where the content management panel 201 shown in FIG. 18A is displayed on the monitor 120 and any one of the content panels 203 to 207 is selected, if receiving operation instruction information that shows selection of the Move button 211 from the input unit 110, the operation judgment unit 1001 reads a content ID included in content information corresponding to the selected content panel from the secure storage unit 104, and transmits a Move instruction including the read content ID to the content operation unit 1004. Moreover, the operation judgment unit 1001 instructs the panel generation unit 1002 to generate the move destination selection panel 215 shown in FIG. 18 that shows a list of candidates for a move destination of a content. In accordance with the generation instruction, the panel generation unit 1002 generates the move destination selection panel 215, and outputs the generated move destination selection panel 215 to the playback control unit 112.

The move destination selection panel 215 includes move destination panels 216 and 217.

In order to generate the move destination selection panel 215, the operation judgment unit 1001 transmits the broadcast instruction to the transmission/reception unit 115, and receives, as a response to the broadcast instruction, an information acquisition response including device identification information of another device connected to the home network 30, from the transmission/reception unit 115. The operation judgment unit 1001 extracts pieces of device identification information included in the received information acquisition response, and instructs the panel generation unit 1002 to generate move destination panels corresponding one-to-one with the acquired pieces of the device identification information.

The panel generation unit 1002 generates a move destination panel for all devices whose response to the broadcast instruction have been received, combines all the move destination panels with each other to generate a move destination selection panel 215, and outputs the generated move destination selection panel 215 to the playback control unit 112.

Figure 18B:
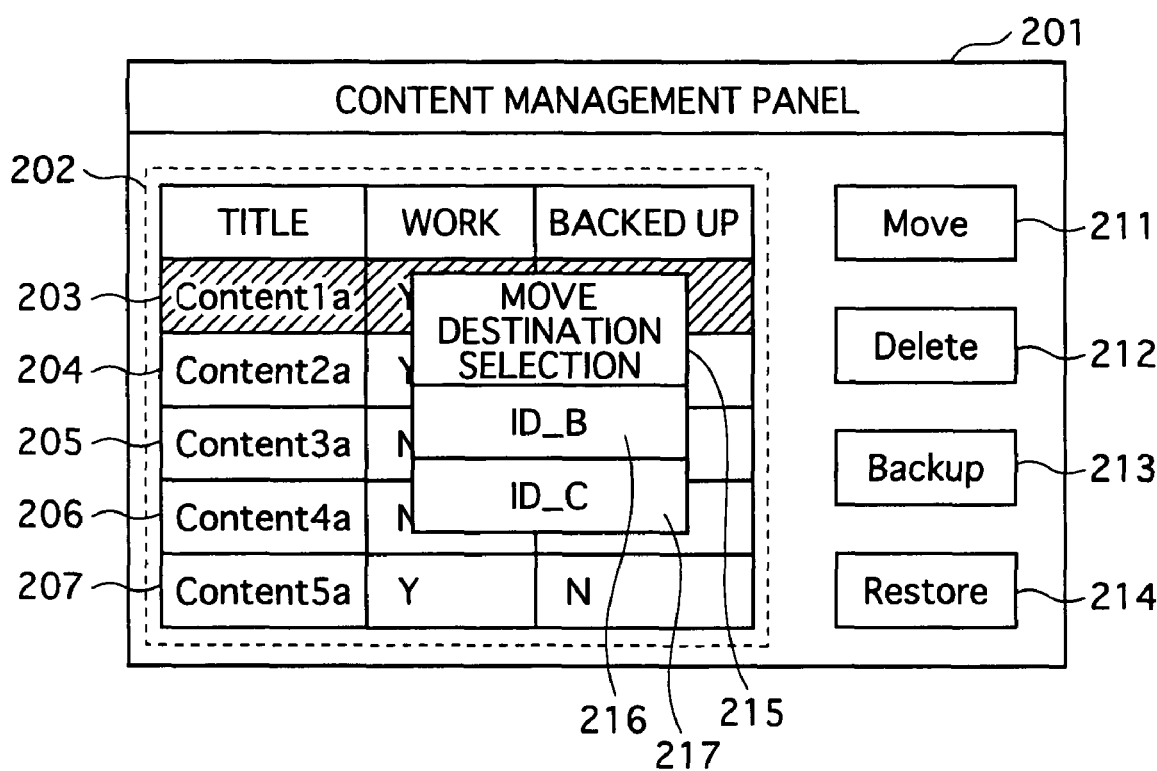

For example, the move destination selection panel 215 shown in FIG. 18B displays device identification information of a device connected to the home network 30. The move destination selection panel 215 includes the move destination panel 216 corresponding to a device having device identification information "ID_B", and the move destination panel 217 corresponding to a device having device identification information "ID_C".

Next, the operation judgment unit 1001 receives, from the input unit 110, operation instruction information that shows a move destination corresponding to a move destination panel selected by the user's operation. The operation judgment unit 1001 instructs the authentication unit 114 to perform authentication processing between the HD recorder 100 and the move destination device. The operation judgment unit 1001 receives an authentication result, as a response to the authentication instruction, from the authentication unit 114.

If the authentication result shows failure, the operation judgment unit 1001 transmits a move processing end instruction to the content operation unit 1004. Upon receiving the move processing stop instruction, the content operation unit 1004 ends the move processing.

If the authentication result shows success, the operation judgment unit 1001 transmits a move instruction including the content ID to the content operation unit 1004. Upon receiving the move instruction, the content operation unit 1004 reads content information corresponding to the content ID from the secure storage unit 104, and judges whether a backup flag included in the content information has a value of "1".

If the backup flag has a value of "0", the content operation unit 1004 detects a content file including the content ID included in the content information from the first information storage unit 102.

Moreover, if the backup flag has a value of "1", the content operation unit 1004 detects whether the second information storage unit 103 is connected. If the second information storage unit 103 is not connected, the content operation unit 1004 transmits an unconnection notification to the operation judgment unit 1001. Upon receiving the unconnection notification, the operation judgment unit 1001 instructs the panel generation unit 1002 to generate a connection request panel 221 shown in FIG. 19A that promotes connection of the second information storage unit 103.

In accordance with the generation instruction, the panel generation unit 1002 generates a connection request panel 221, and outputs the generated connection request panel 221 to the playback control unit 112.

The content operation unit 1004 continues monitoring whether the second information storage unit 103 is connected. If the second information storage unit 103 does not get connected, the content operation unit 1004 ends the move processing.

If the second information storage unit 103 gets connected, the content operation unit 1004 judges whether the content file including the content ID is stored in the first information storage unit 102 and the second information storage unit 103. If the content file is stored, the content operation unit 1004 deletes the content file from the second information storage unit 103.

Next, if the content file including the content ID has not been backed up, the content operation unit 1004 detects the content file from the first information storage unit 102. If the content file has been backed up, the content operation unit 1004 detects the content file from the second information storage unit 103.

The content operation unit 1004 reads an encrypted content and an encrypted content key from the detected content file, and transmits the read encrypted content and encrypted content key to the hash calculation unit 1013 together with the content ID. The hash calculation unit 1013 combines the encrypted content and the encrypted content key to calculate a hash value, and transmits the calculated hash value to the hash comparison unit 1014 together with the content ID.

The hash comparison unit 1014 reads the content information including the content ID from the secure storage unit 104, and compares a hash value included in the read content information with the received hash value. Then, the hash comparison unit 1014 a comparison result that shows whether these hash values match each other to the content operation unit 1004.

If the comparison result received from the hash comparison unit 1014 shows that the values do not match each other, the content operation unit 1004 transmits a move error notification to the operation judgment unit 1001.

Upon receiving the move error notification, the operation judgment unit 1001 instructs the panel generation unit 1002 to generate a panel that displays an error screen that shows that the selected content cannot be moved. The panel generation unit 1002 generates a panel that displays the error screen in accordance with the generation instruction, and outputs the generated panel to the playback control unit 112. The content operation unit 1604 stops the move processing of the content.

If the comparison result received from the hash comparison unit 1014 shows that the values match each other, the content operation unit 1004 reads the device-specific key 132 "Key_A" from the specific information storage unit 101, outputs the read device-specific key 132 "Key_A" and the read encrypted content key to the encryption processing unit 109, and instructs the encryption processing unit 109 to decrypt the encrypted content key.

The content operation unit 1004 receives a content key that has been decrypted, as a response to the decryption instruction, from the encryption processing unit 109. Upon receiving the content key, the content operation unit 1004 reads the encrypted content from the detected content file, outputs the read encrypted content and the received content key to the encryption processing unit 109, and instructs the encryption processing unit 109 to decrypt the encrypted content. Next, the content operation unit 1004 receives a content that has been decrypted from the encryption processing unit 109, and outputs the received content to the decoding unit 107.

The content operation unit 1004 instructs the transmission/reception unit 115 to transmit the content decoded by the decoding unit 107 to the move destination device.

The transmission/reception unit 115 receives the content from the decoding unit 107, and outputs the received content to the move destination device based on the DTCP.

The content operation unit 1004 deletes a content file corresponding to the output content, and furthermore instructs the hash deletion unit 1011 to delete the content information including the content ID. The hash deletion unit 1011 deletes the content information.

(4) Control of Deletion Processing

In a state where the content management panel 201 shown in FIG. 18A is displayed on the monitor 120 and any one of the content panels 203 to 207 is selected, if receiving operation instruction information that shows selection of the Delete button 212 from the input unit 110, the operation judgment unit 1001 reads a content ID included in content information corresponding to the selected content panel from the secure storage unit 104, and transmits a deletion instruction including the read content ID to the content operation unit 1004.

Figure 20:
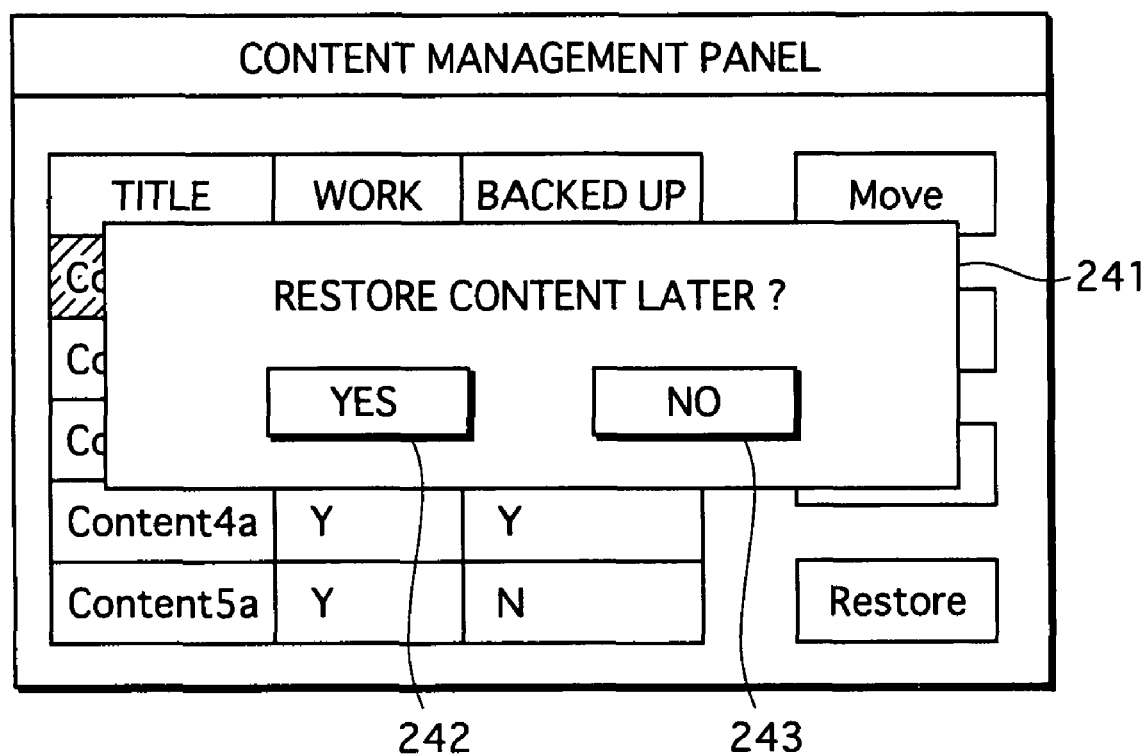
FIG. 20 shows an example of a content management panel and a restoration attribute selection panel.

Moreover, the content operation unit 1004 reads a backup flag included in the content information including the content ID. Moreover, the operation judgment unit 1001 instructs the panel generation unit 1002 to generate the restoration attribute selection panel 241 shown in FIG. 20.

The panel generation unit 1002 generates a restoration attribute selection panel 241 in accordance with the generation instruction, and outputs the generated restoration attribute selection panel 241 to the playback control unit 112. The operation judgment unit 1001 gets into a state to receive an input of selection of restoration attribute.

The restoration attribute selection panel 241 includes a button 242 that shows restoration is possible "restorable" and a button 243 that shows restoration is impossible "unrestorable". Either the button 242 or the button 243 is selected by the user's operation.

Under the state to receive an input, if receiving operation instruction information that shows selection of "restorable", the operation judgment unit 1001 transmits the operation instruction information to the content operation unit 1004. The content operation unit 1004 judges whether the read backup flag has a value of "1". If the backup flag has a value of "0", the content operation unit 1004 detects whether the second information storage unit 103 is connected. If not connected, the content operation unit 1004 transmits an unconnection notification to the operation judgment unit 1001.

Figure 19A:
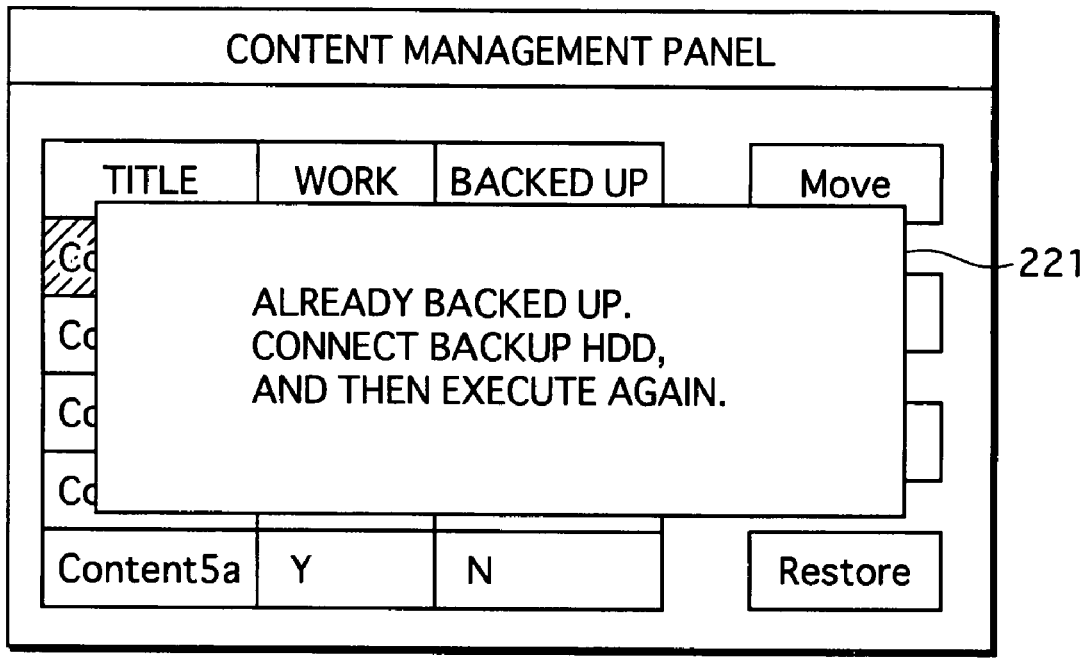
FIG. 19 shows an example of a content management panel, a connection request panel, and a backup deletion execution selection panel.

Upon receiving the unconnection notification, the operation judgment unit 1001 instructs the panel generation unit 1002 to generate the connection request panel 221 shown in FIG. 19A that promotes connection of the second information storage unit 103.

The panel generation unit 1002 generates a connection request panel 221 in accordance with the generation instruction, outputs the generated connection request panel 221 to the playback control unit 112, and instructs the playback control unit 112 to display the connection request panel 221.

The content operation unit 1004 monitors whether the second information storage unit 103 gets connected for a predetermined time period. If the second information storage unit 103 does not get connected, the content operation unit 1004 ends the deletion processing.

If the second information storage unit 103 gets connected, the content operation unit 1004 copies the content file corresponding to the content ID from the first information storage unit 102 to the second information storage unit 103, and rewrites the value of the backup flag of the content information corresponding to the read content ID to "1". Moreover, the content operation unit 1004 deletes the content file corresponding to the content ID from the first information storage unit 102.

On the other hand, under the state to receive an input, if receiving operation instruction information that shows selection of "unrestorable", the operation judgment unit 1001 transmits the operation instruction information to the restorability instruction unit 1003 and the content operation unit 1004.

The content operation unit 1004 judges whether the read backup flag has a value of "1". If the backup flag has a value of "1", the content operation unit 1004 detects whether the second information storage unit 103 is connected. If not connected, the content operation unit 1004 transmits an unconnection notification to the operation judgment unit 1001. Upon receiving the unconnection notification, the operation judgment unit 1001 instructs the panel generation unit 1002 to generate the connection request panel 221 shown in FIG. 19A that promotes connection of the second information storage unit 103.

The panel generation unit 1002 generates a connection request panel 221 in accordance with the generation instruction, outputs the generated connection request panel 221 to the playback control unit 112, and instructs the playback control unit 112 to display the connection request panel 221.

The content operation unit 1004 monitors whether the second information storage unit 103 gets connected for a predetermined time period. If the second information storage unit 103 does not get connected, the content operation unit 1004 ends the deletion processing.

If the second information storage unit 103 gets connected, the content operation unit 1004 deletes the content file corresponding to the content ID from the second information storage unit 103.

If the backup flag has either values of "1" or "0", the content operation unit 1004 deletes the content file from the first information storage unit 102.

Also, if receiving the operation instruction information that shows the selection of "unrestorable", the restorability instruction unit 1003 transmits a deletion instruction including the content ID to the hash deletion unit 1011. The hash deletion unit 1011 deletes the content information including the content ID and the hash value.

(5) Control of Backup Processing

In a state where the content management panel 201 shown in FIG. 18A is displayed on the monitor 120 and any one of the content panels 203 to 207 is selected, if receiving operation instruction information that shows selection of the Backup button 213 from the input unit 110, the operation judgment unit 1001 reads a content ID included in content information corresponding to the selected content panel from the secure storage unit 104, and transmits a backup instruction including the read content ID to the content operation unit 1004.

The content operation unit 1004 reads the content information including the content ID from the secure storage unit 104.

Moreover, the content operation unit 1004 judges whether a backup flag included in the content information has a value of "1".

If the backup flag has a value of "1", a content file corresponding to the content ID has been already backed up. Therefore, the content operation unit 1004 ends the backup processing.

If the backup flag has a value of "0", the content operation unit 1004 detects whether the second information storage unit 103 is connected. If not connected, the content operation unit 1004 transmits an unconnection notification to the operation judgment unit 1001.

Upon receiving the unconnection notification, the operation judgment unit 1001 instructs the panel generation unit 1002 to generate a connection request panel 221 that promotes connection of the second information storage unit 103.

The panel generation unit 1002 generates a connection request panel 221 in accordance with the generation instruction, outputs the generated connection request panel 221 to the playback control unit 112, and instructs the playback control unit 112 to display the connection request panel 221.

The content operation unit 1004 monitors whether the second information storage unit 103 gets connected for a predetermined time period. If the second information storage unit 103 does not get connected, the content operation unit 1004 ends the backup processing.

If the second information storage unit 103 gets connected, the content operation unit 1004 copies the content file including the content ID from the first information storage unit 102 to the second information storage unit 103, and rewrites the value of the backup flag of the content information including the read content ID to "1".

(6) Control of Restoration Processing

In a state where the content management panel 201 shown in FIG. 18A is displayed on the monitor 120 and any one of the content panels 203 to 207 is selected, if receiving operation instruction information that shows selection of the Restore button 214 from the input unit 110, the operation judgment unit 1001 reads a content ID included in content information corresponding to the selected content panel from the secure storage unit 104, and transmits a restoration instruction including the read content ID to the content operation unit 1004.

Upon receiving the restoration instruction, the content operation unit 1004 judges whether a backup flag included in the content information including the content ID has a value of "1".

If the backup flag has a value of "0", a content file corresponding to the content ID has not been backed up. Therefore, the content operation unit 1004 ends the restoration processing.

If the backup flag has a value of "1", the content operation unit 1004 monitors whether the second information storage unit 103 is connected. If not connected, the content operation unit 1004 transmits an unconnection notification to the operation judgment unit 1001. Upon receiving the unconnection notification, the operation judgment unit 1001 instructs the panel generation unit 1002 to generate a connection request panel 221 shown in FIG. 19A that promotes connection of the second information storage unit 103.

The panel generation unit 1002 generates a connection request panel 221 in accordance with the generation instruction, outputs the generated connection request panel 221 to the playback control unit 112, and instructs the playback control unit 112 to display the connection request panel 221.

The content operation unit 1004 monitors whether the second information storage unit 103 gets connected for a predetermined time period. If the second information storage unit 103 does not get connected, the content operation unit 1004 ends the restoration processing.

If the second information storage unit 103 gets connected, the content operation unit 1004 judges whether a content file corresponding to the content ID is stored in the second information storage unit 103. If the corresponding content file is not stored, the content operation unit 1004 ends the restoration processing.

If the corresponding content file is stored, the content operation unit 1004 transmits a deletion confirmation instruction to the operation judgment unit 1001. Upon receiving the deletion confirmation instruction, the operation judgment unit 1001 instructs the panel generation unit 1002 to generate a backup deletion execution selection panel 231 shown in FIG. 19B.

The panel generation unit 1002 generates a backup deletion execution selection panel 231 in accordance with the generation instruction, and outputs the generated backup deletion execution selection panel 231 to the playback control unit 112.

Figure 19B:
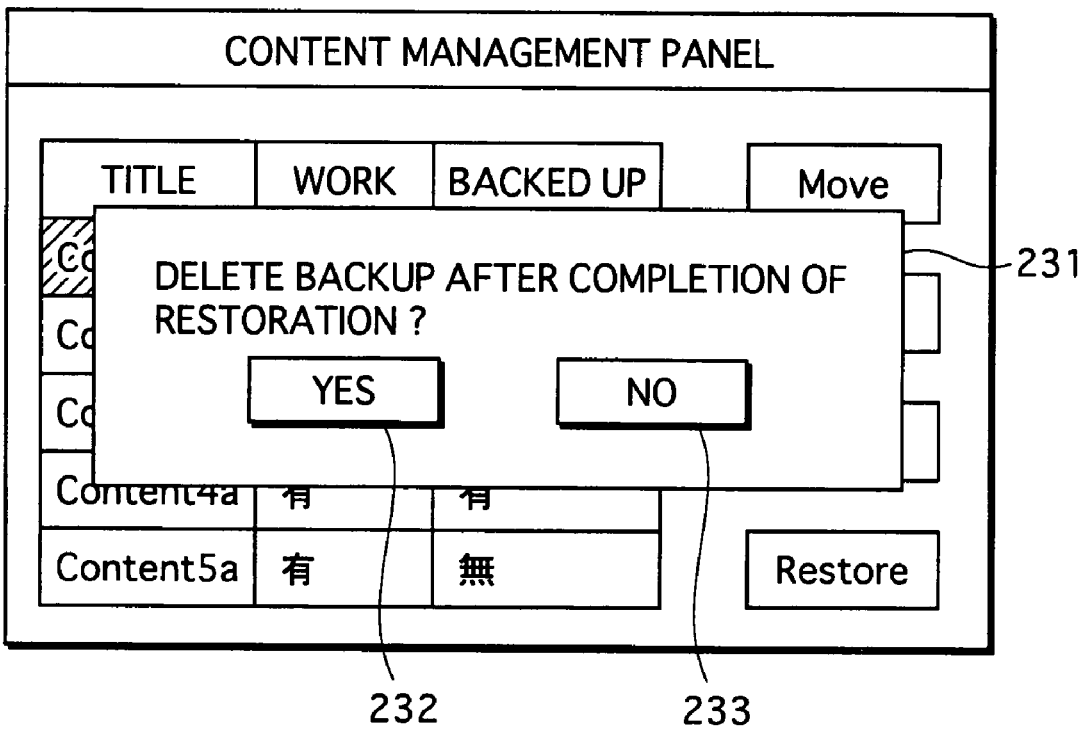

The backup deletion execution selection panel 231 includes, as shown in FIG. 19B, a deletion execution button 232 that shows execution of backup deletion and a deletion no-execution button 233 that shows no-execution of backup deletion. Either the deletion execution button 232 or the deletion no-execution button 233 is selected by the user's operation.

The content operation unit 1004 receives the selection whether backup deletion is executed via the operation judgment unit 1001. Also, the content operation unit 1004 copies content file from the second information storage unit 103 to the first information storage unit 102.

Here, upon receiving operation instruction information that shows execution of backup deletion, the content operation unit 1004 copies the content file from the second information storage unit 103 to the first information storage unit 102. And then, the content operation unit 1004 deletes the content file corresponding to the read content ID stored in the second information storage unit 103, and rewrites a value of a backup flag of the content information corresponding to the read content ID to "0".

<Operations>

The following describes operations of the backup system 1 focusing on operations of the HD recorder 100. The description uses an example where a content corresponding to a content ID "A001" shown in FIG. 3 to FIG. 5 is processed unless otherwise specified.

(1) Operations of HD Recorder 100

Figure 6:
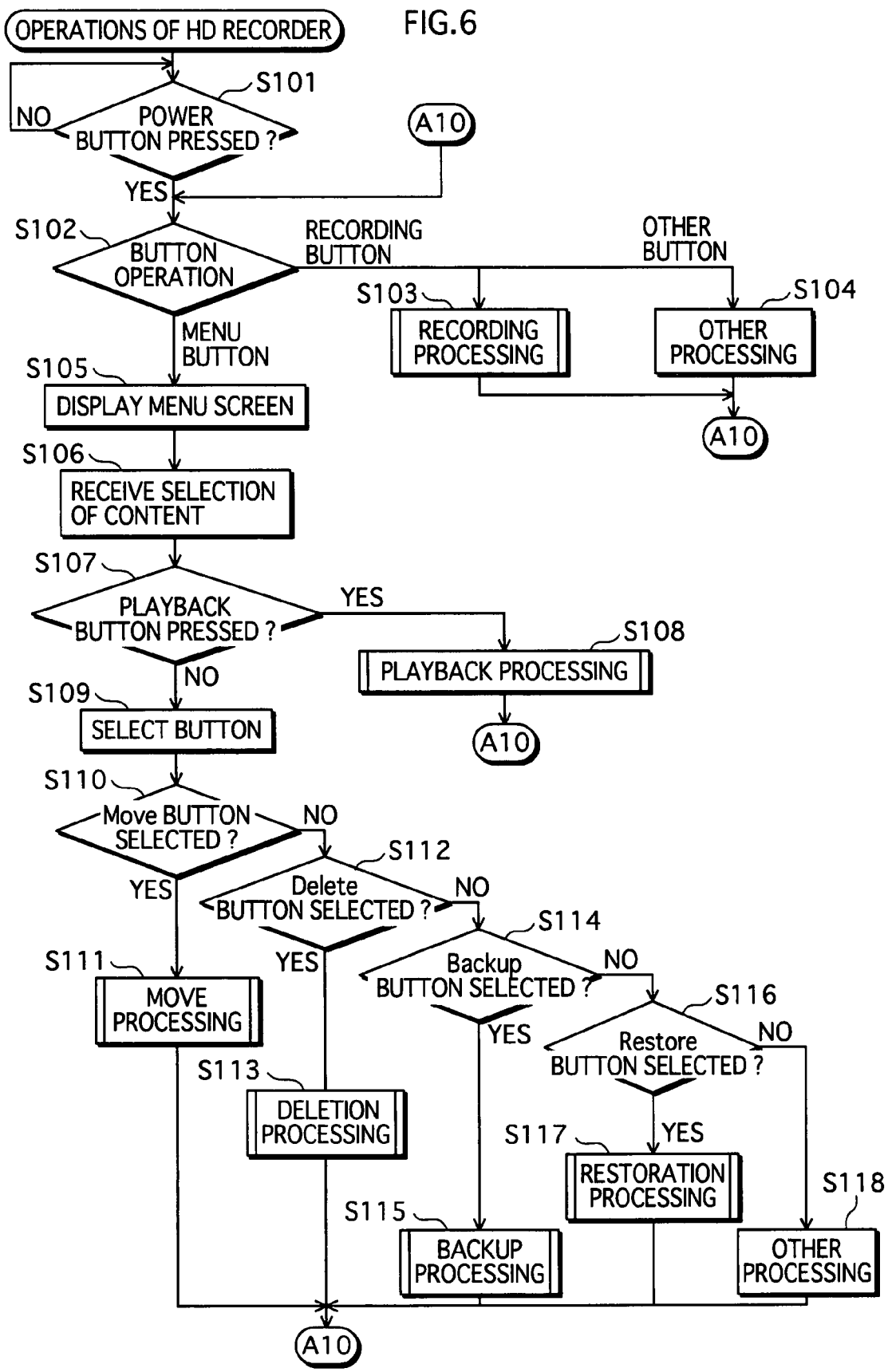
FIG. 6 is a flow chart showing operations of the HD recorder of the present invention.

Operations of the HD recorder 100 are described using a flow chart shown in FIG. 6.

The operation judgment unit 1001 judges whether operation instruction information that shows that a power button has been pressed by the user's operation is received via the input unit 110 (Step S101). If the operation instruction information has not been received (Step S101: NO), the operation judgment unit 1001 repeats Step S101 until the operation instruction information has been received.

If receiving the operation instruction information that shows the press of the power button (Step S101: YES), the operation judgment unit 1001 further receives a button operation and a remote controller operation by the user via the input unit 110 (Step S102), and transmits an instruction in accordance with the received button operation to other units.

In Step S102, if receiving operation instruction information that shows that the recording button has been pressed, the operation judgment unit 1001 transmits a recording instruction to the content operation unit 1004. The content operation unit 1004 performs recording processing (Step S103). When the recording processing completes, the flow returns to Step S102. Here, the detection of a press of the various types of buttons by the input unit 110 and the judgment of the button operations in Step S102 by the operation judgment unit 1001 are constantly performed simultaneously with other processing including the above-mentioned recording processing. For example, a recording stop instruction by the user's operation is received even during the recording.

In Step 5102, if the operation judgment unit 1001 receives operation instruction information that shows a button other than the menu button and the recording button has been pressed, the content operation unit 1004 performs other processing (Step S104).

In Step S102, if receiving operation instruction information that shows that the menu button has been pressed, the operation judgment unit 1001 instructs the panel generation unit 1002 to generate the content management panel 201 shown in FIG. 18A. The panel generation unit 1002 generates the content management panel 201 in accordance with the generation instruction, and outputs the generated content management panel 201 to the playback control unit 112.

The playback control unit 112 displays the content management panel 201 on the monitor 120 (Step S105). The operation judgment unit 1001 further receives selection of a content by the user (Step S106).

Here, in order to select a content that is a processing target, the user presses any of the input unit 110, and an up-selection key and a down-selection key included in the remote controller.

Operation instruction information showing a pressed key is output from the input unit 110 to the operation judgment unit 1001.

If receiving operation instruction information that shows that the lower selection key has been pressed, the operation judgment unit 1001 instructs the panel generation unit 1002 to generate a content management panel 201 in which a focus that shows selection of any of the content panels 203 to 207 is moved to a lower content panel. The panel generation unit 1002 generates a content management panel 201 in accordance with the generation instruction, and outputs the generated content management panel 201 to the playback control unit 112. The playback control unit 112 displays the received content management panel 201 on the monitor 120.

Here, the focus is performed by displaying a selected panel in a color different from other panels included in the content panels 203 to 207.

In the same way as the case where the lower selection key pressed, if receiving operation instruction information that shows that the upper selection key has been pressed, the operation judgment unit 1001 instructs the panel generation unit 1002 to generate a content management panel 201 in which a focus that shows selection of any of the content panels 203 to 207 is moved to an upper content panel.

The panel generation unit 1002 generates the content management panel 201 in accordance with the generation instruction, and outputs the generated content management panel 201 to the playback control unit 112. The playback control unit 112 displays the received content management panel 201 on the monitor 120.

If receiving operation instruction information that shows that the playback button has been pressed by the user's operation from the input unit 110 (Step S107: YES), the operation judgment unit 1001 transmits a playback instruction to the content operation unit 1004. The content operation unit 1004 performs playback processing in accordance with the playback instruction (Step S108).

Also, if any of the Move button 211, the Delete button 212, the Backup button 213, and the Restore button 214 is selected by the user's operation (Step S109), the operation judgment unit 1001 judges which button has been selected in accordance with the operation instruction information received from the input unit 110.

If the Move button 211 is selected (Step S110: YES), the operation judgment unit 1001 transmits a move instruction to the content operation unit 1004. The content operation unit 1004 performs move processing (Step S111). When the move processing completes, the flow returns to Step S102.

If the Delete button 212 is selected (Step S110: NO and Step S112: YES), the operation judgment unit 1001 transmits a deletion instruction to the content operation unit 1004. The content operation unit 1004 performs deletion processing (Step S113). When the deletion processing ends, the flow returns to Step S102.

If the Backup button 213 is selected (Step S112: NO and Step S114: YES), the operation judgment unit 1001 transmits a backup instruction to the content operation unit 1004. The content operation unit 1004 performs backup processing (Step S115). When the backup processing completes, the flow returns to Step S102.

If the Restore button 214 is selected (Step S114: NO and Step S116: YES), the operation judgment unit 1001 transmits a restoration instruction to the content operation unit 1004. The content operation unit 1004 performs restoration processing (Step S117). When the restoration processing completes, the flow returns to Step S102.

If other processing is selected (Step S116: NO), the operation judgment unit 1001 performs other processing (Step S118). When the other processing completes, the flow returns to Step S102.

(2) Recording Processing by HD Recorder 100

Figure 7:
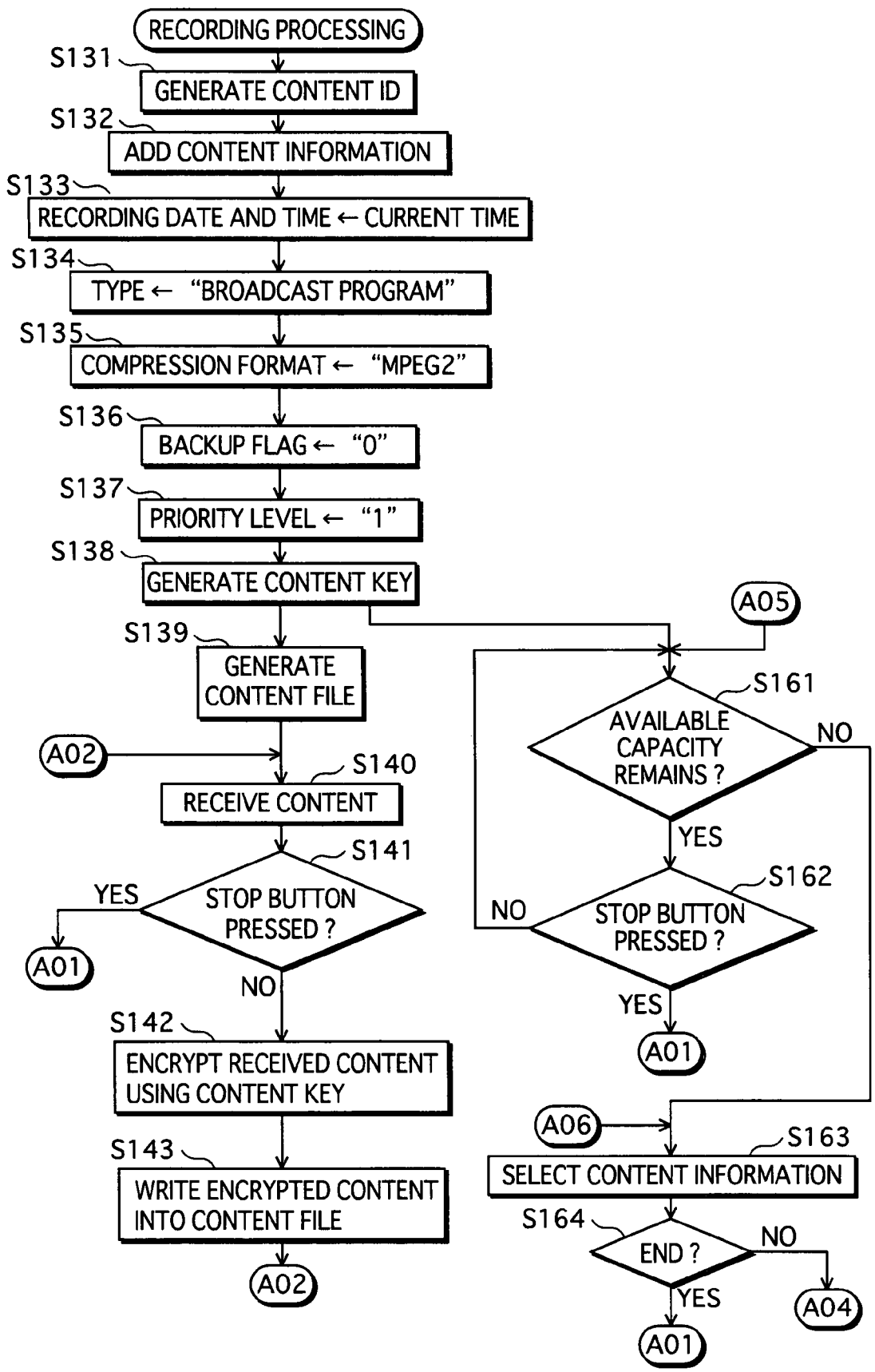
FIG. 7 is a flow chart showing operations of recording processing performed by the HD recorder.
Figure 8:
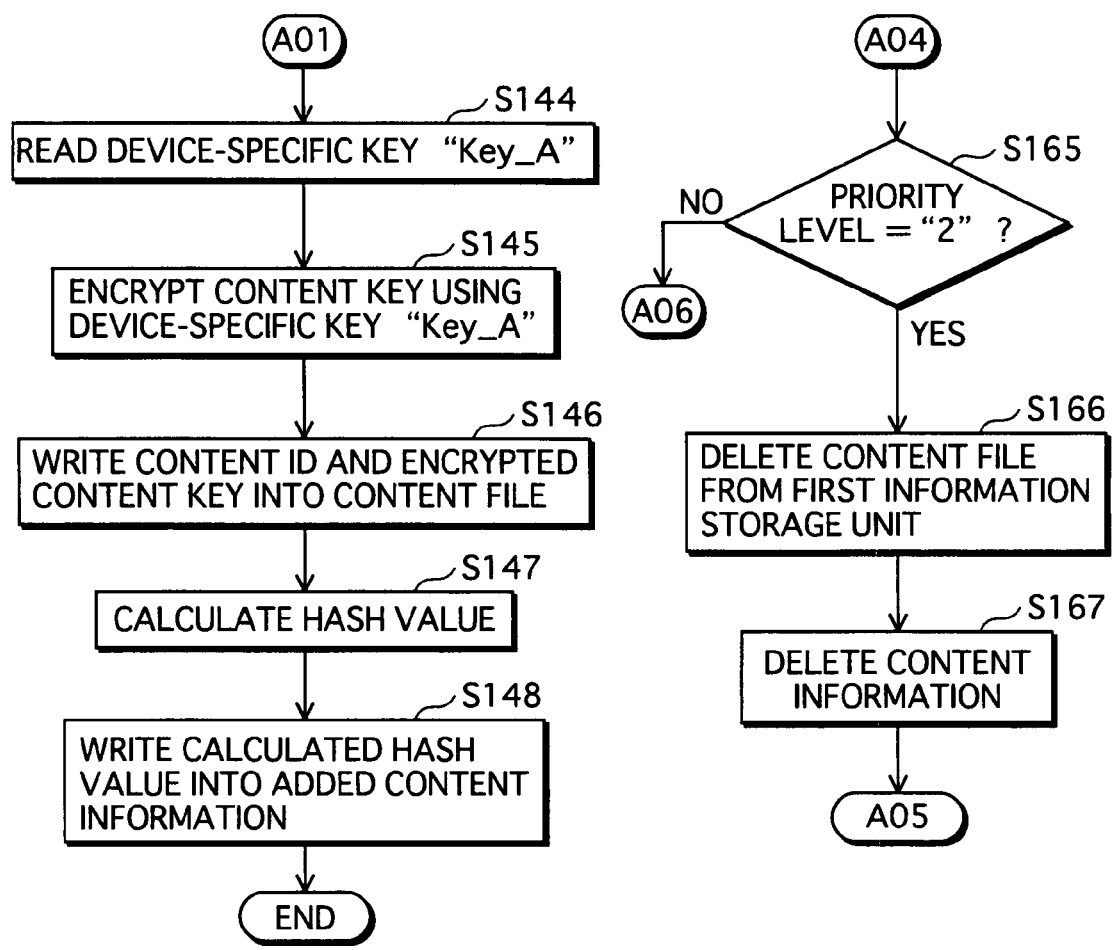
FIG. 8 is a flow chart showing the operations of the recording processing performed by the HD recorder.

The following describes operations of recording processing performed by the HD recorder 100 using flow charts shown in FIG. 7 and FIG. 8. This is a detailed description of Step S103 in FIG. 6.

Upon receiving a recording instruction from the operation judgment unit 1001, the content operation unit 1004 generates a new content ID (Step S131), and adds content information including the generated content ID to the content management table 180 (Step S132). In the added content information, the content operation unit 1004 writes a current time into the column "recording date and time" (Step S133), and writes "program" into the column "type" (Step S134). Moreover, the content operation unit 1004 writes "MPEG 2" into the column "compression format" (Step S135), writes "0" into the column "backup flag" (Step S136), and writes "1" into the column "priority level" (Step S137).

Next, the content operation unit 1004 instructs the key generation unit 108 to generate a content key. The key generation unit 108 generates a content key, and outputs the generated content key to the content operation unit 1004 (Step S138).

Next, the content operation unit 1004 generates a new content file in the first information storage unit 102 (Step S139), and then transmits a recording instruction to the broadcast receiving unit 106. The broadcast receiving unit 106 starts receiving a part of the content that has been broadcasted via the antenna 105 (Step S140), and outputs the received part to the content operation unit 1004.

Until the stop button has been pressed by the user, the content operation unit 1004 repeats the following processing in Steps S140 to S143. When the stop button is pressed (Step S141: YES), the flow proceeds to Step S144.

If the stop button has not been pressed (Step S141: NO), the content operation unit 1004 outputs the content received from the broadcast receiving unit 106 and the content key received from the key generation unit 108 to the encryption processing unit 109, and instructs the encryption processing unit 109 to encrypt the content. The encryption processing unit 109 encrypts the content to generate an encrypted content using the received content key, and outputs the generated encrypted content to the content operation unit 1004 (Step S142).

The content operation unit 1004 writes the encrypted content generated by the encryption processing unit 109 into the content file generated in the first information storage unit 102 (Step S143), and the flow returns to Step S140.

If the stop button is pressed or all parts of the content have been recorded to the end (Step S141: YES), the operation judgment unit 1001 transmits a stop instruction to the content operation unit 1004. Upon receiving the stop instruction, the content operation unit 1004 reads the device-specific key 132 "Key_A" from the specific information storage unit 101 (Step S144), outputs the read device-specific key 132 "Key_A" and the content key to the encryption processing unit 109, and instructs the encryption processing unit 109 to encrypt the content key. The encryption processing unit 109 encrypts the content key using the received device-specific key 132 "Key_A" to generate an encrypted content key. The encryption processing unit 109 outputs the generated encrypted content key to the content operation unit 1004 (Step S145).

The content operation unit 1004 receives the encrypted content key from the encryption processing unit 109, and writes the received encrypted content key and the generated content ID into the content file (Step S146).

Next, the content operation unit 1004 transmits a hash value calculation instruction to the hash calculation unit 1013. The hash calculation unit 1013 combines the encrypted content and the encrypted content key, assigns the combination to the hash function to calculate a hash value, and transmits the hash value to the hash writing unit 1012 (Step S147). The hash writing unit 1012 writes the calculated hash value into the added content information (Step S148).

Simultaneously with performing Steps S140 to S143, the content operation unit 1004 performs Steps S161 to S167. First, the content operation unit 1004 monitors whether an available capacity of the first information storage unit 102 is sufficient (Step S161). If the available capacity is sufficient (Step S161: YES) and the stop button is not pressed by the user (Step S162: NO), the flow returns to Step S161 and the content operation unit 1004 continues monitoring the available capacity. If the stop button is pressed by the user (Step S162: YES), the flow proceeds to Step S144.

If the available capacity is insufficient (Step S161: NO), the content operation unit 1004 sequentially selects pieces of content information included in the content management table 180 stored in the secure storage unit 104 in the order as listed (Step S163). At this time, if processing in Step S165 to 167 performed on all pieces of the content information included in the content management table 180 has completed, that is, if no deletable content exists in the first information storage unit 102 (Step S164: YES), the content operation unit 1004 notifies the user that the available capacity is insufficient by flashing the lamp, etc., and then the flow proceeds to Step S144.

If a deletable content exists in the first information storage unit 102 (Step S164: NO), the content operation unit 1004 reads a priority level included in a selected piece of the content information, and judges whether the read priority level has a value of "2" (Step S165). If the priority level does not have a value of "2" (Step S165: NO), the flow returns to Step S163 and the content operation unit 1004 selects a next piece of the content information.

If the priority level has a value of "2" (Step S165: YES), the content operation unit 1004 detects a content file corresponding to the selected piece of the content information based on a content ID included in the selected piece of the content information, backs up the detected content file to the second information storage unit 103, and then deletes the content file from the first information storage unit 102 (Step S166). Next, the content operation unit 1004 deletes the selected piece of the content information from the content management table 180 (Step S167), and the flow returns to Step S161.

(3) Operations HD Recorder 100 Performing Playback Processing

Figure 9:
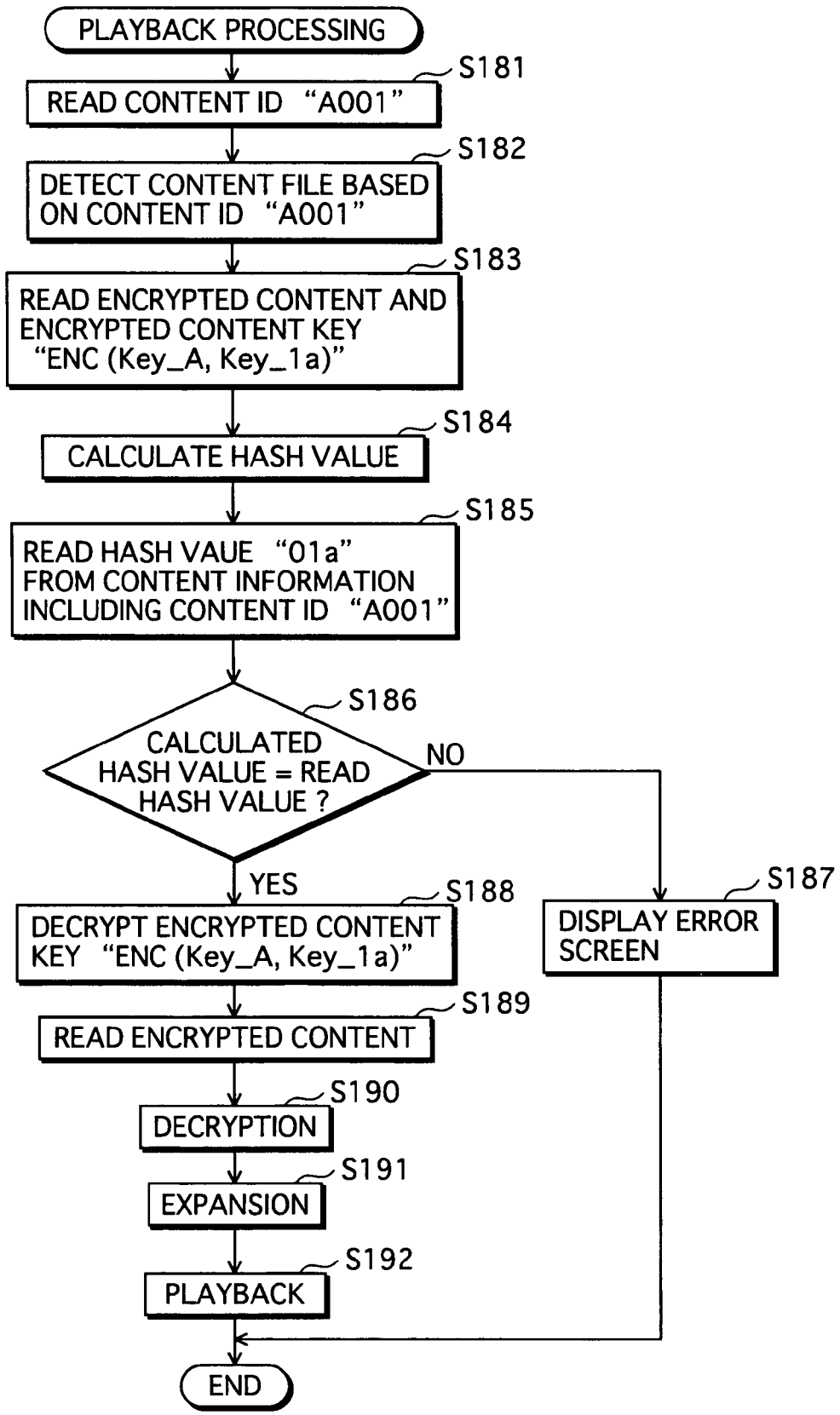
FIG. 9 is a flow chart showing operations of playback processing performed by the HD recorder.

The following describes operations of the HD recorder 100 performing playback processing using a flow chart shown in FIG. 9. This is a detailed description of Step S108 in FIG. 6.

In a state where the content management panel 201 shown in FIG. 18A is displayed, if the playback button is pressed by the user's operation, the operation judgment unit 1001 receives operation instruction information that shows the press of the playback button from the input unit 110. The operation judgment unit 1001 reads, from the secure storage unit 104, the content ID "A001" included in the content information 181 corresponding to the selected content panel 203 (Step S181), and transmits a playback instruction including the content ID to the content operation unit 1004.

Here, the following description is given based on the assumption that the content panel 203 is selected.

The content operation unit 1004 detects the content file 141 corresponding to the content information 181 from the first information storage unit 102, based on the content ID "A001" (Step S182). The content operation unit 1004 reads the encrypted content 143 and the encrypted content key 144 "ENC (Key_A, Key_1a)" from the detected content file 141 (Step S183). The content operation unit 1004 transmits the content ID, the read encrypted content 143, and the read encrypted content key 144 "ENC (Key_A, Key_1a)" to the hash calculation unit 1013. The hash calculation unit 1013 combines the encrypted content 143 and the encrypted content key 144 "ENC (Key_A, Key_1a)" and assigns the combination to the hash function to calculate a hash value, and transmits the calculated hash value and the content ID to the hash comparison unit 1014 (Step S184).

Next, the hash comparison unit 1014 reads a hash value "01a" from the content information 181 including the content ID "A001" (Step S185). The hash comparison unit 1014 compares the calculated hash value with the read hash value (Step S186), and transmits a comparison result that shows whether these hash values match each other to the content operation unit 1004.

If the comparison result received from the hash comparison unit 1014 shows that the values do not match each other (Step S186: NO), the content operation unit 1004 transmits an error notification to the operation judgment unit 1001.

The operation judgment unit 1001 instructs the panel generation unit 1002 to generate an error screen. The panel generation unit 1002 generates an error screen that shows that the selected content cannot be played back, and displays the generated error screen (Step S187). The content operation unit 1004 ends the playback processing.

If the comparison result shows that the values match each other (Step S186: YES), the content operation unit 1004 reads the device-specific key 132 "Key_A" from the specific information storage unit 101, outputs the read device-specific key 132 "Key_A" and the encrypted content key 144 "ENC (Key_A, Key_1a)" to the encryption processing unit 109, and instructs the encryption processing unit 109 to decrypt the encrypted content key 144 "ENC (Key_A, Key_1a)".

The encryption processing unit 109 receives the encrypted content key 144 "ENC (Key_A, Key_1a)" and the device-specific key 132 "Key_A" from the content operation unit 1004. The encryption processing unit 109 decrypts the encrypted content key 144 "ENC (Key_A, Key_1a)" using the received device-specific key 132 "Key_A" to generate a content key "Key_1a", and outputs the generated content key "Key_1a" to the content operation unit 1004 (Step S188).

Upon receiving the content key "Key_1a" from the encryption processing unit 109, the content operation unit 1004 reads the encrypted content 143 from the content file 141, outputs the read encrypted content 143 and the content key "Key_1a" to the encryption processing unit 109, and instructs the encryption processing unit 109 to decrypt the encrypted content 143.

In accordance with the decryption instruction by the content operation unit 1004, the encryption processing unit 109 decrypts the encrypted content 143 using the content key "Key_1a" to generate a content, and outputs the generated content to the content operation unit 1004 (Step S190).

The content operation unit 1004 receives the content from the encryption processing unit 109, and outputs the received content to the decoding unit 107. Upon receiving the content, the decoding unit 107 expands the received content to generate an image signal and a sound signal (Step S191), and outputs the generated image signal and sound signal. The monitor 120 plays back an image and a sound (Step S192).

Here, if a content targeted for playback is not stored in the first information storage unit 102 and is stored only in the second information storage unit 103, the content operation unit 1004 performs the later-described restoration processing before playing back the content. And then, after making the content get stored in the first information storage unit 102, the content operation unit 1004 plays back the content.

(4) Operations of HD Recorder 100 Performing Move Processing

Figure 10:
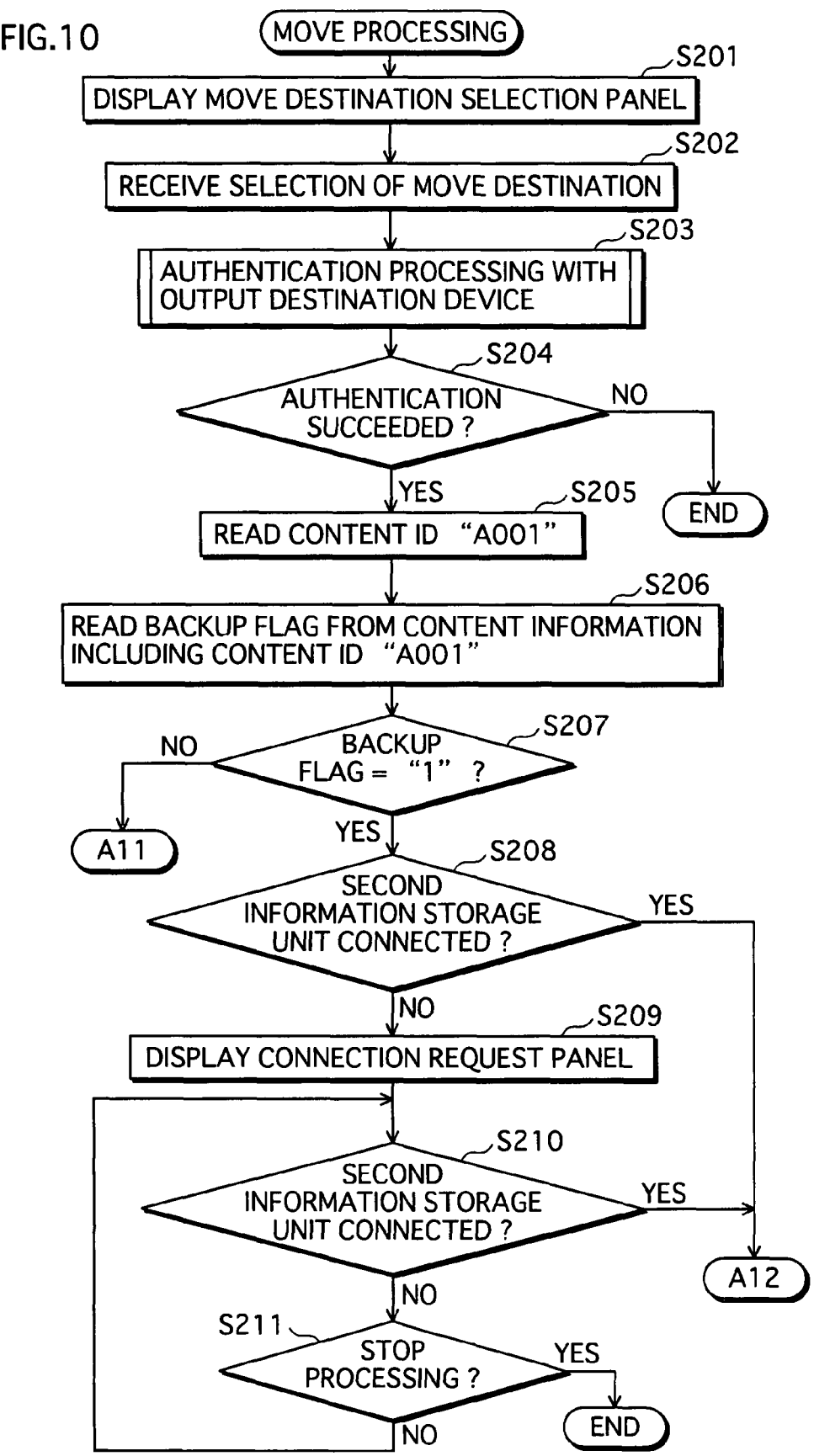
FIG. 10 is a flow chart showing operations of move processing performed by the HD recorder.
Figure 11:
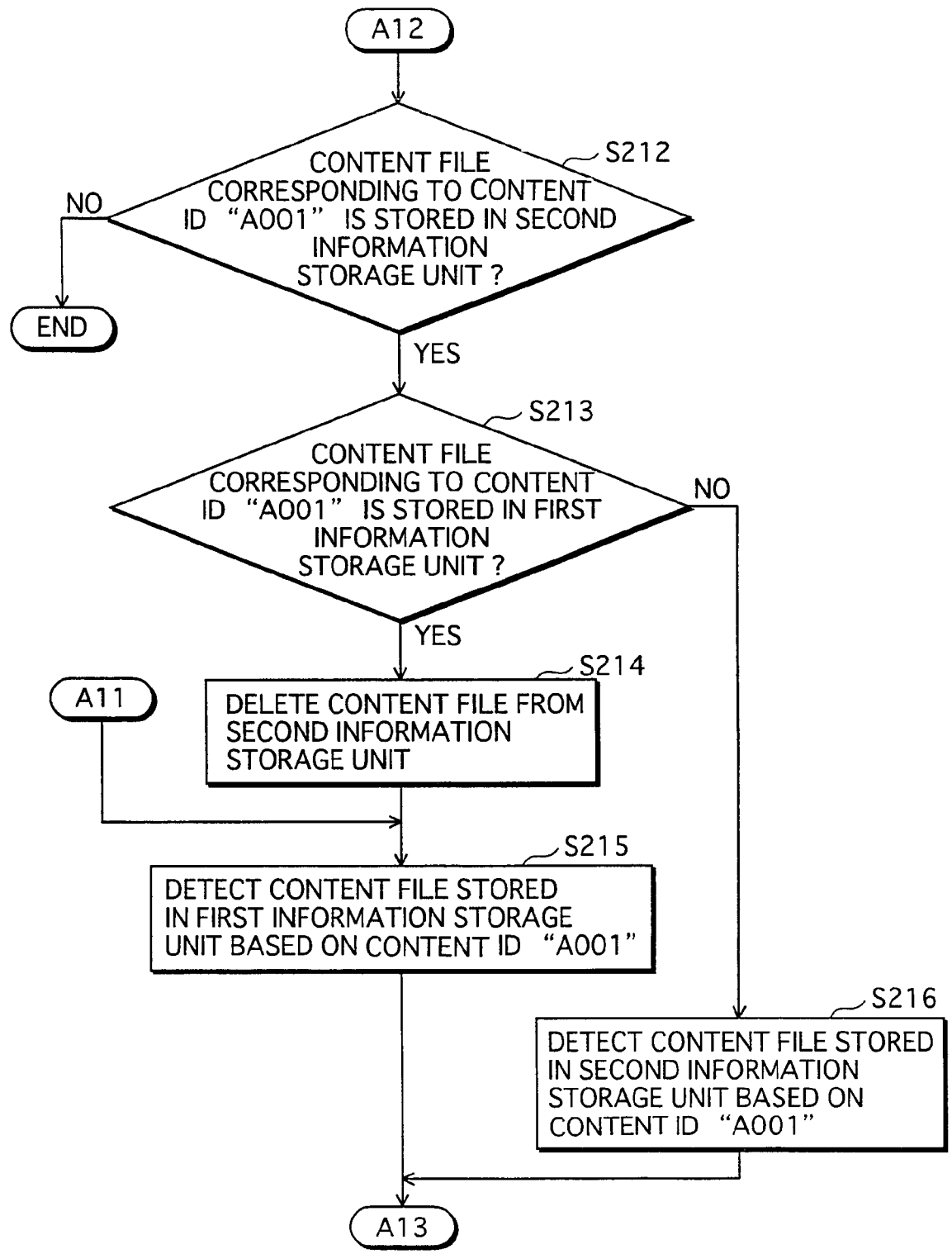
FIG. 11 is a flow chart showing the operations of the move processing performed by the HD recorder.
Figure 12:
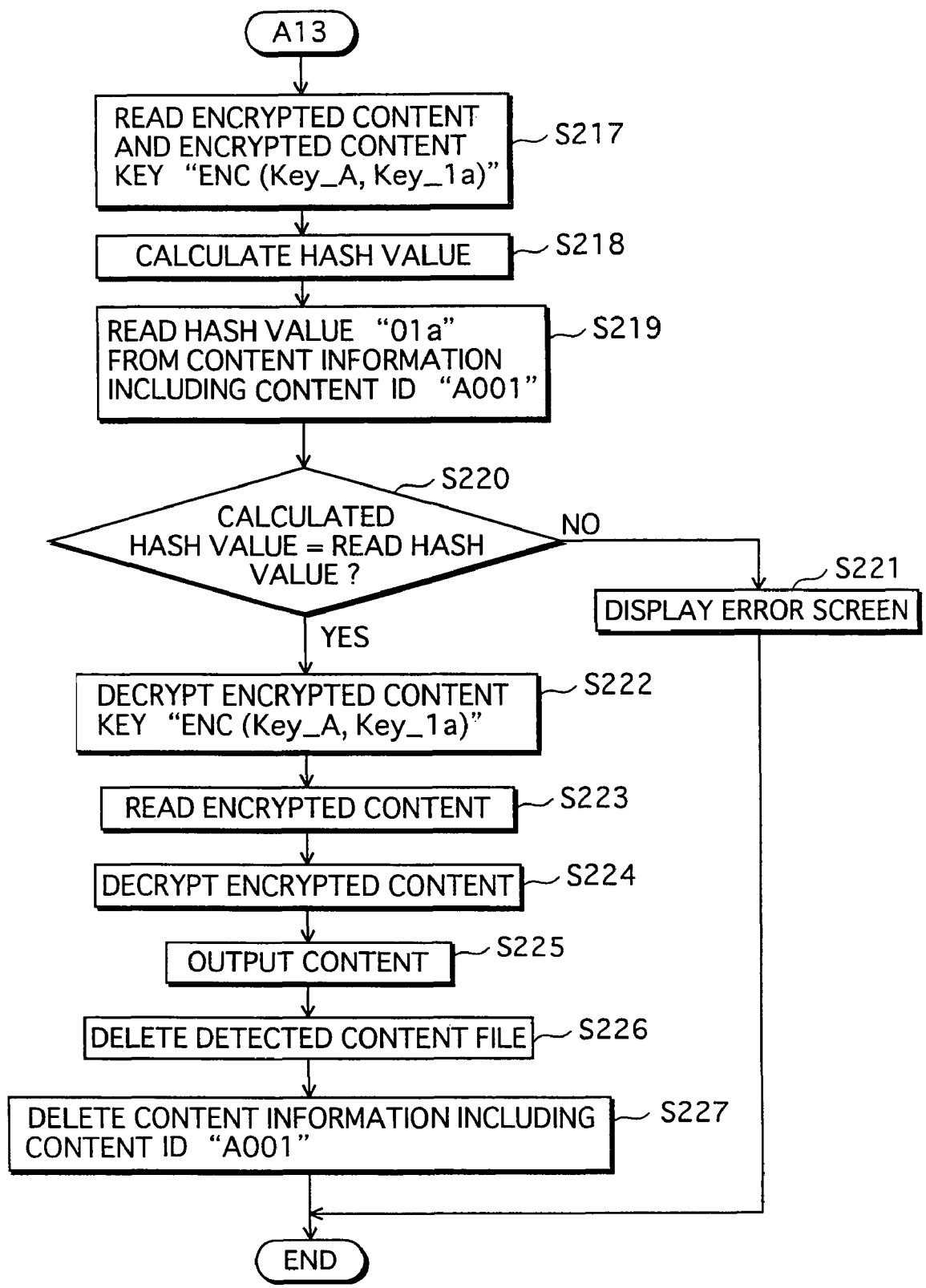
FIG. 12 is a flow chart showing the operations of the move processing performed by the HD recorder.

The following describes operations of the HD recorder 100 performing the move processing using flow charts shown in FIG. 10, FIG. 11, and FIG. 12. This is a detailed description of Step S111 in FIG. 6.

In a state where the content management panel 201 shown in FIG. 18A is displayed, if receiving operation instruction information that shows selection of the Move button 211 from the input unit 110, the operation judgment unit 1001 instructs the panel generation unit 1002 to generate the move destination selection panel 215 that shows a list of candidates for a move destination. The panel generation unit 1002 generates the move destination selection panel 215 in accordance with the generation instruction, and outputs the generated move destination selection panel 215 to the playback control unit 112. The playback control unit 112 generates an image composed of the move destination selection panel 215 overlaying the content management panel 201, and displays the generated image on the monitor 120, as shown in FIG. 18B (Step S201).

The move destination selection panel 215 displays device identification information of a device connected to the home network 30, and includes the move destination panel 216 corresponding to a device that has device identification information "ID_B", and the move destination panel 217 corresponding to a device that has device identification information "ID_C".

The user operates to select either the move destination panels 216 or 217. In accordance with the user's operation, the operation judgment unit 1001 receives operation instruction information that shows the selection of a transmission destination device of the content from the input unit 110 (Step S202).

The operation judgment unit 1001 instructs the authentication unit 114 to perform authentication processing between the HD recorder 100 and the transmission destination device.

The authentication unit 114 performs authentication processing between the HD recorder 100 and the transmission destination device (Step S203). The authentication processing in Step S203 is described later.

The operation judgment unit 1001 receives an authentication result in the authentication processing from the authentication unit 114.

If the authentication fails (Step S204: NO), the operation judgment unit 1001 ends the move processing.

If the authentication succeeds (Step S204: YES), the operation judgment unit 1001 reads a content ID included in content information corresponding to the selected content panel from the secure storage unit 104 (Step S205), and transmits the move instruction including the content ID to the content operation unit 1004.

The content operation unit 1004 reads a backup flag included in the content information including the content ID (Step S206).

If the backup flag has a value of "0" (Step S207: NO), the flow proceeds to Step S215, which is described later. If the backup flag has a value of "1" (Step S207: YES), the content operation unit 1004 detects whether the second information storage unit 103 is connected (Step S208). If not connected (Step S208: NO), the content operation unit 1004 transmits, to the operation judgment unit 1001, an unconnection notification that shows that the second information storage unit 103 is not connected. Upon receiving the unconnection notification, the operation judgment unit 1001 instructs the panel generation unit 1002 to generate a connection request panel 221 that promotes connection of the second information storage unit 103. The panel generation unit 1002 generates a connection request panel 221 in accordance with the generation instruction, outputs the generated connection request panel 221 to the playback control unit 112, and instructs the playback control unit 112 to display the connection request panel 221 (Step S209).

The playback control unit 112 generates an image composed of the connection request panel 221 overlaying the content management panel 201, and displays the generated image on the monitor 120, as shown in FIG. 19A.

Also, the content operation unit 1004 continues monitoring whether the second information storage unit 103 is connected (Step S210). If not connected (Step S210: NO), the content operation unit 1004 judges whether operation instruction information has been received that shows stop of the processing (Step S211).

If receiving the operation instruction information that shows stop of the processing from the input unit 110 (Step S211: YES), the operation judgment unit 1001 transmits a stop instruction of the move processing to the content operation unit 1004. The content operation unit 1004 stops the move processing.

If not receiving the operation instruction information that shows stop of the processing (Step S211: NO), the content operation unit 1004 performs Step S210.

If the second information storage unit 103 is connected (Step 208: YES, and Step S210: YES), the content operation unit 1004 judges whether a content file including the encrypted content indicated by the content ID is stored in the second information storage unit 103 (Step S212).

If the content file is not stored in the second information storage unit 103 (Step S212: NO), the content operation unit 1004 ends the move processing. This is because the backup flag does not match a backup condition, and therefore there is a possibility that an illegitimate processing is performed.

If the content file is stored in the second information storage unit 103 (Step S212: YES), the content operation unit 1004 judges whether the content file including the encrypted content indicated by the content ID is stored the first information storage unit 102 (Step S213).

If the content file is stored in the first information storage unit 102 (Step S213: YES), the content operation unit 1004 deletes the content file from the second information storage unit 103 (Step 5214).

The content operation unit 1004 detects the content file including the encrypted content indicated by the content ID from the first information storage unit 102 (Step S215).

If the content file is not stored in the first information storage unit 102 (Step S213: NO), the content operation unit 1004 detects the content file including the encrypted content indicated by the content ID from the second information storage unit 103 (Step S216).

The content operation unit 1004 reads the encrypted content and the encrypted content key "ENC (Key_A, Key_1a)" that are included in the detected content file (Step S217).

The content operation unit 1004 outputs the encrypted content and the encrypted content key "ENC (Key_A, Key_1a)" that are included in the detected content file to the hash calculation unit 1013. The hash calculation unit 1013 combines the encrypted content and the encrypted content key "ENC (Key_A, Key_1a)", assigns the combination to the hash function to calculate a hash value, and outputs the calculated hash value and the content ID to the hash comparison unit 1014 (Step S218).

Next, the hash comparison unit 1014 reads the hash value "01a" from the content information 181 including the content ID (Step S219). The hash comparison unit 1014 compares the calculated hash value with the read hash value (Step S220), and transmits a comparison result to the content operation unit 1004. If the comparison result shows that the two values do not match each other (Step S220: NO), the content operation unit 1004 transmits an error notification to the operation judgment unit 1001. The operation judgment unit 1001 instructs the panel generation unit 1002 to generate an error screen that shows that the selected content cannot be moved. The panel generation unit 1002 generates a panel that displays the error screen in accordance with the generation instruction, and outputs the generated panel to the playback control unit 112. The playback control unit 112 displays the error screen on the monitor 120 (Step S221). The content operation unit 1004 ends the move processing.

If the comparison result received from the hash calculation unit 1013 shows that the two values match each other (Step S220: YES), the content operation unit 1004 reads the device-specific key 132 "Key_A" from the specific information storage unit 101, outputs the encrypted content key "ENC (Key_A, Key_1a)" and the read device-specific key 132 "Key_A" to the encryption processing unit 109, and instructs the encryption processing unit 109 to decrypt the encrypted content key "ENC (Key_A, Key_1a)".

The encryption processing unit 109 receives the encrypted content key "ENC (Key_A, Key_1a)" and the device-specific key 132 "Key_A" from the content operation unit 1004. The encryption processing unit 109 decrypts the encrypted content key "ENC (Key_A, Key_1a)" using the device-specific key 132 "Key_A" to generate a content key "Key_1a", and outputs the generated content key "Key_1a" to the content operation unit 1004 (Step S222).

The content operation unit 1004 receives the content key "Key_1a" from the encryption processing unit 109. Upon receiving the content key "Key_1a", the content operation unit 1004 reads the encrypted content from the content file 141 (Step S223), outputs the read encrypted content and the content key "Key_1a" to the encryption processing unit 109, and instructs the encryption processing unit 109 to decrypt the encrypted content.

In accordance with the decryption instruction by the content operation unit 1004, the encryption processing unit 109 decrypts the encrypted content using the content key "Key_1a" to generate a content, and outputs the generated content to the content operation unit 1004 (Step S224).

The content operation unit 1004 receives the content from the encryption processing unit 109, and outputs the received content to the transmission destination device via the transmission/reception unit 115 (Step S225).

Note that, if the authentication processing succeeds, a communication path to be encrypted has been established based on the DTCP between the HD recorder 100 and the transmission destination device.

After completing the output, the content operation unit 1004 deletes the detected content file (Step S226).

The content operation unit 1004 deletes content information including the content ID from the content management table 180 (Step S227).

(5) Operations of HD Recorder 100 Performing Deletion Processing

Figure 13:
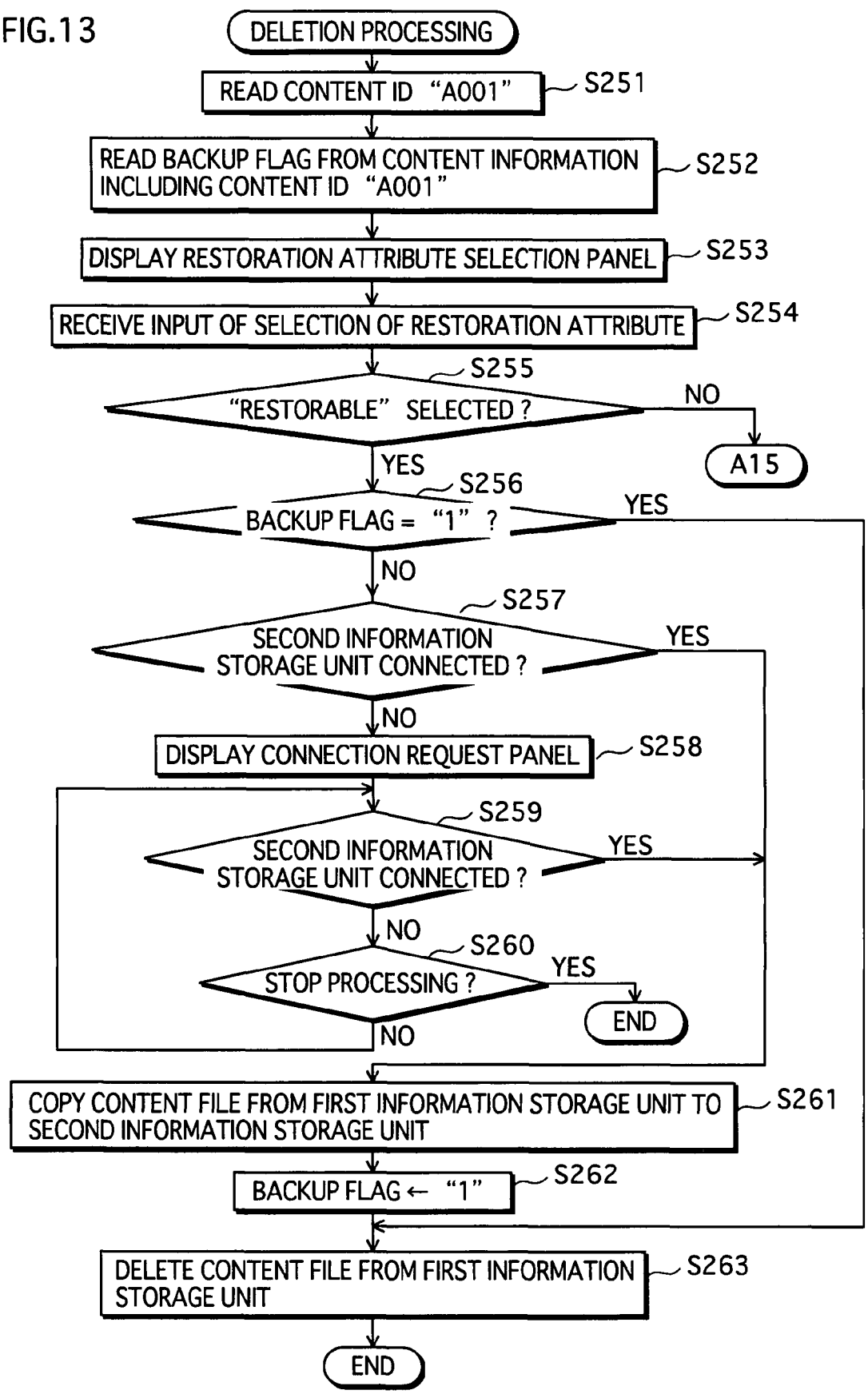
FIG. 13 is a flow chart showing operations of deletion processing performed by the HD recorder.
Figure 14:
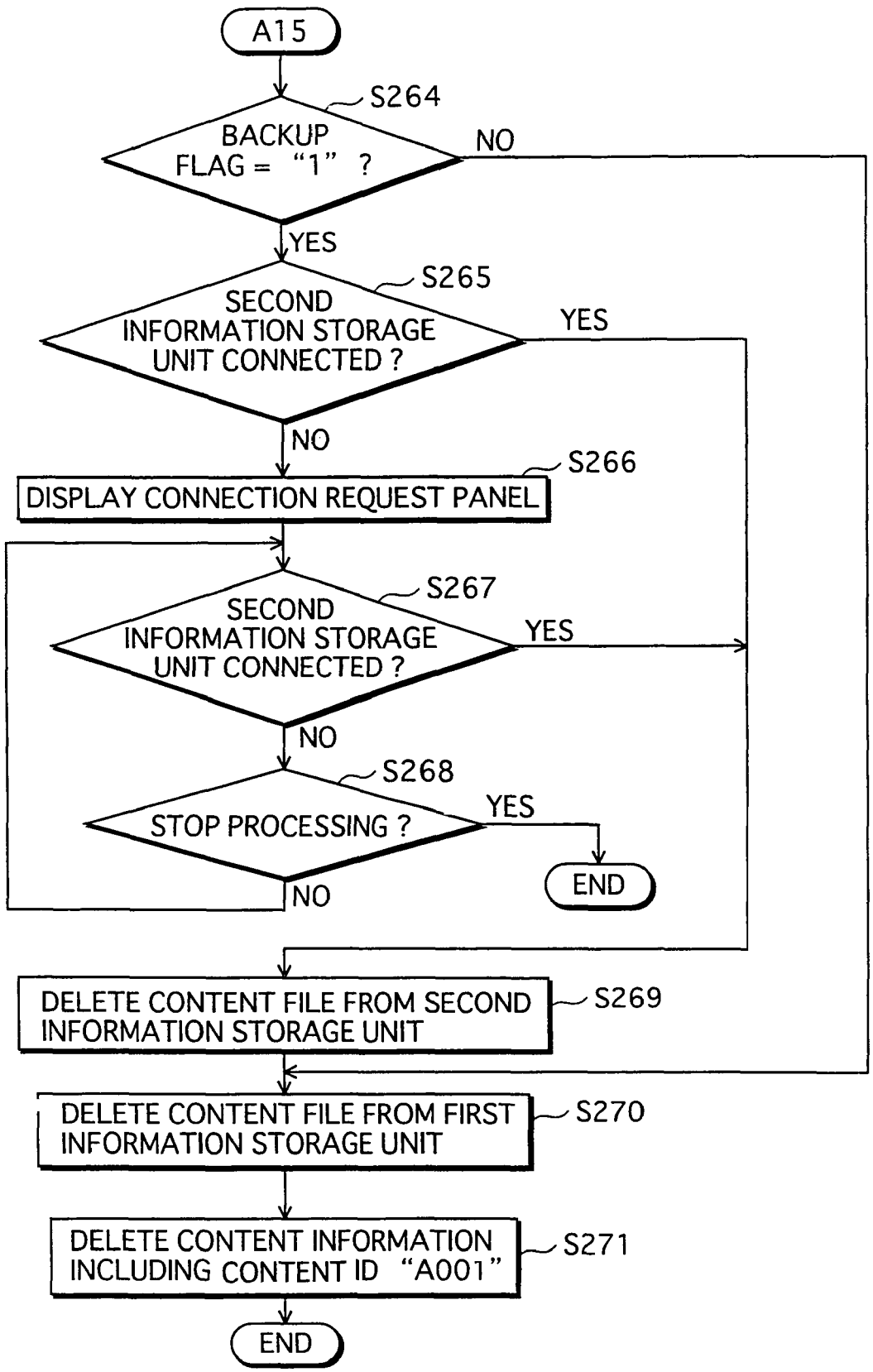
FIG. 14 is a flow chart showing the operations of the deletion processing performed by the HD recorder.

The following describes operations of the HD recorder 100 performing the deletion processing using flow charts shown in FIG. 13 and FIG. 14. This is a detailed description of Step S113 in FIG. 6.

As described above, in a state where any one of the content panels 203 to 207 is selected, if receiving operation instruction information that shows selection of the Delete button 212, the operation judgment unit 1001 reads a content ID included in content information corresponding to the selected content panel from the secure storage unit 104, and transmits a deletion instruction including the content ID to the content operation unit 1004.

Upon receiving the deletion instruction, the content operation unit 1004 reads a backup flag included in the content information (Step S252).

The operation judgment unit 1001 instructs the panel generation unit 1002 to generate the restoration attribute selection panel 241 that promotes the user to select whether to set the content to "restorable" or "unrestorable". The panel generation unit 1002 generates the restoration attribute selection panel 241 in accordance with the generation instruction, outputs the generated restoration attribute selection panel 241 to the playback control unit 112, and instructs the playback control unit 112 to display the restoration attribute selection panel 241 (Step S253).

The playback control unit 112 displays the restoration attribute selection panel 241 overlaying the content management panel 201 on the monitor 120.

The operation judgment unit 1001 receives operation instruction information that shows either the button 242 indicating "restorable" or the button 243 indicating "unrestorable" selected by the user via the input unit 110, and transmits the operation instruction information to the restorability instruction unit 1003 (Step S254).

If the operation instruction information shows selection of "restorable" (Step S255: YES), the content operation unit 1004 judges whether a backup flag included in the content information has a value of "1" (Step S256).

If the backup flag has a value of "1" (Step S256: YES), a content file corresponding to the content ID has been backed up. Therefore, the content operation unit 1004 deletes the content file corresponding to the content ID from the first information storage unit 102, and ends the deletion processing.

If the backup flag has a value of "0" (Step S256: NO), the content operation unit 1004 detects whether the second information storage unit 103 is connected (Step S257). If connected (Step S257: YES), the content operation unit 1004 copies the content file including the encrypted content indicated by the content ID from the first information storage unit 102 to the second information storage unit 103 (Step S261).

If not connected (Step S257: NO), the content operation unit 1004 transmits an unconnection notification to the operation judgment unit 1001. The operation judgment unit 1001 receives the unconnection notification, and instructs the panel generation unit 1002 to generate the connection request panel 221 that promotes connection of the second information storage unit 103.

The panel generation unit 1002 generates the panel in accordance with the generation instruction, outputs the generated connection request panel 221 to the playback control unit 112, and instructs the playback control unit 112 to display the connection request panel 221 (Step S258).

The playback control unit 112 displays the connection request panel 221 overlaying the content management panel 201 on the monitor 120.

Also, the content operation unit 1004 continues monitoring whether the second information storage unit 103 gets connected (Step S259). If the second information storage unit 103 does not get connected (Step S259: NO), the content operation unit 1004 judges whether operation instruction information has been received that shows stop of the processing (Step S260).

If receiving the operation instruction information that shows stop of the processing (Step S260: YES), the operation judgment unit 1001 transmits a deletion stop instruction to the content operation unit 1004. The content operation unit 1004 stops the deletion processing in accordance with the deletion stop instruction.

If not receiving the operation instruction information that shows stop of the processing via the input unit 110 (Step S260: NO), the content operation unit 1004 performs Step S259.

If the second information storage unit 103 gets connected (Step S259: YES), the flow proceeds to Step S261.

The content operation unit 1004 rewrites the value of the backup flag of the content information including the content ID to "1" (Step S262), deletes the content file corresponding to the content ID from the first information storage unit 102, and ends the deletion processing.

In Step S255, if "unrestorable" is selected (Step S255: NO), the content operation unit 1004 judges whether the backup flag included in the content information has a value of "1" (Step S264).

If the backup flag has a value of "1" (Step S264: YES) the content operation unit 1004 detects whether the second information storage unit 103 is connected (Step S265). If not connected (Step S265: NO), the content operation unit 1004 transmits an unconnection notification to the operation judgment unit 1001. The operation judgment unit 1001 receives the unconnection notification, and instructs the panel generation unit 1002 to generate the connection request panel 221 that promotes connection of the second information storage unit 103.

The panel generation unit 1002 generates the connection request panel 221 in accordance with the generation instruction, outputs the generated connection request panel 221 to the playback control unit 112, and instructs the playback control unit 112 to display the connection request panel 221 (Step S266).

The playback control unit 112 displays the connection request panel 221 overlaying the content management panel 201 on the monitor 120.

Also, the content operation unit 1004 continues monitoring whether the second information storage unit 103 gets connected (Step S267). If the second information storage unit 103 does not get connected (Step S267: NO), the content operation unit 1004 judges whether operation instruction information has been received that shows stop of the processing (Step S268).

If receiving the operation instruction information that shows stop of the processing (Step S268: YES), the operation judgment unit 1001 transmits a deletion stop instruction to the content operation unit 1004. The content operation unit 1004 stops the deletion processing.

If not receiving the operation instruction information that shows stop of the processing via the operation judgment unit 1001 (Step S268: NO), the content operation unit 1004 performs Step S267.

If the second information storage unit 103 gets connected (Step S267: YES, Step S265: YES), the content operation unit 1004 deletes the content file including the encrypted content indicated by the content ID from the second information storage unit 103 (Step S269). Moreover, the content operation unit 1004 deletes the content file including the encrypted content indicated by the content ID from the first information storage unit 102 (Step S270).

Also, if the operation instruction information shows selection of "unrestorable", the restorability instruction unit 1003 transmits a deletion instruction to the hash deletion unit 1011. The hash deletion unit 1011 deletes the content information including the content ID and the hash value (Step S271).

If the backup flag has a value of "1" (Step S264: NO), the content operation unit 1004 performs the above-described Step S270 and Step S271, and ends the deletion processing.

(6) Operations of HD Recorder 100 Performing Backup Processing

Figure 15:
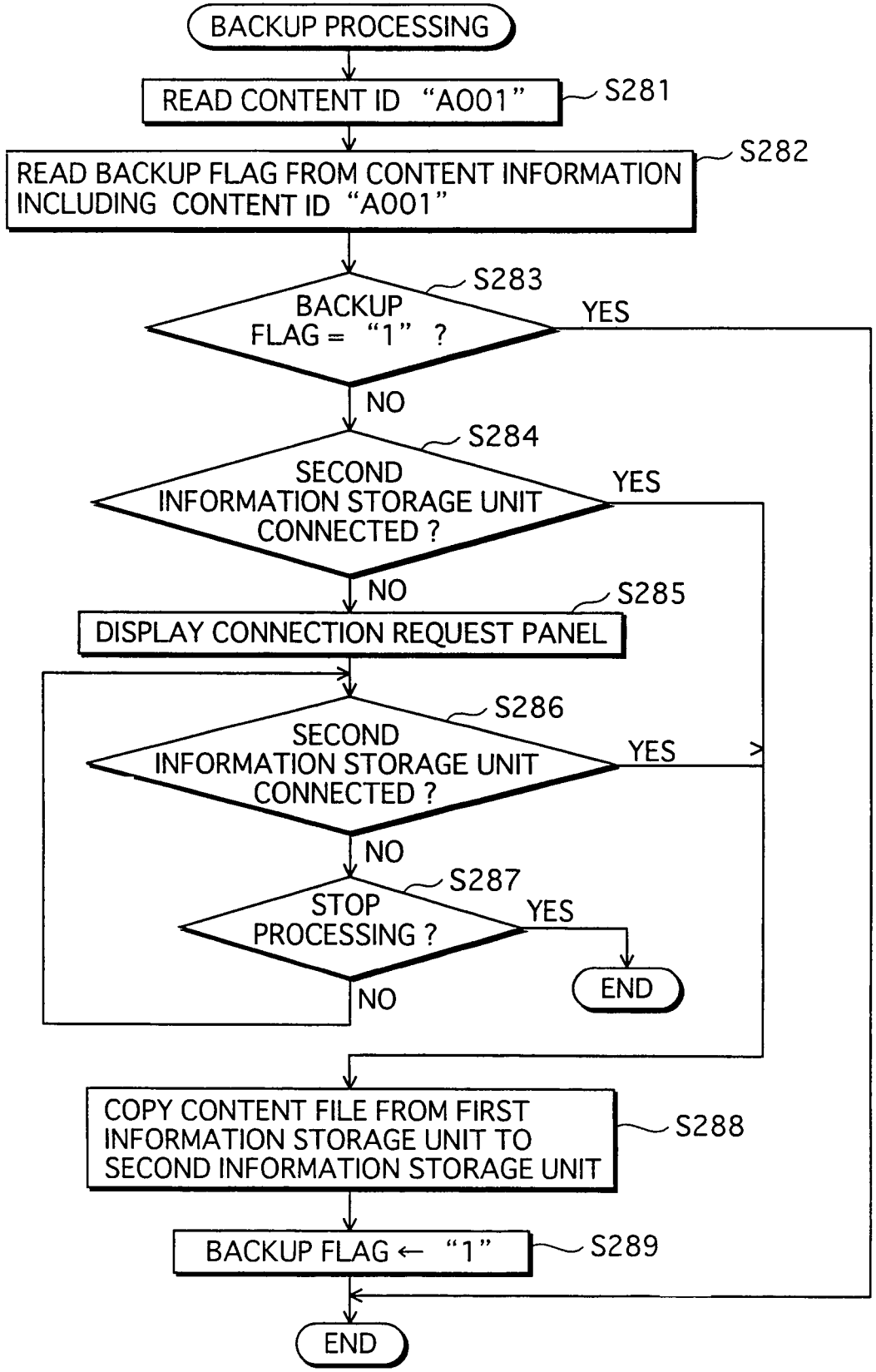
FIG. 15 is a flow chart showing operations of backup processing performed by the HD recorder.

The following describes operations of the HD recorder 100 performing backup processing using a flow chart shown in FIG. 15. This is a detailed description of Step S115 in FIG. 6.

As described above, in a state where any one of the content panels 203 to 207 is selected, if receiving operation instruction information that, shows selection of the Backup button 213, the operation judgment unit 1001 reads a content ID included in content information corresponding to the selected content panel from the secure storage unit 104 (Step S281), and transmits a backup instruction including the read content ID to the content operation unit 1004.

Moreover, the content operation unit 1004 receives the backup instruction, reads a backup flag included in the content information (Step S282), and judges whether the backup flag has a value of "1" (Step S283).

If the backup flag has a value of "1" (Step S283: YES), a content file corresponding to the content ID has been backed up. Therefore, the content operation unit 1004 ends the backup processing.

If the backup flag has a value of "0" (Step S283: NO), the content operation unit 1004 detects whether the second information storage unit 103 is connected (Step S284). If connected (Step S284: YES), the flow proceeds to Step S288 described later. If not connected (Step S284: NO), the content operation unit 1004 transmits an unconnection notification to the operation judgment unit 1001. The operation judgment unit 1001 instructs the panel generation unit 1002 to generate the connection request panel 221 that promotes connection of the second information storage unit 103. The panel generation unit 1002 generates the connection request panel 221 in accordance with the generation instruction, outputs the generated connection request panel 221 to the playback control unit 112, and instructs the playback control unit 112 to display the connection request panel 221 (Step S285).

The playback control unit 112 displays the connection request panel 221 overlaying the content management panel 201 on the monitor 120.

Also, the content operation unit 1004 continues monitoring whether the second information storage unit 103 gets connected (Step S286). If the second information storage unit 103 does not get connected (Step S286: NO), the content operation unit 1004 judge whether the operation judgment unit 1001 has received operation instruction information that shows stop of the processing (Step S287).

If receiving the operation instruction information that shows stop of the processing via the operation judgment unit 1001 (Step S287: YES), the content operation unit 1004 stops the deletion processing.

If not receiving the operation instruction information that shows stop of the processing via the operation judgment unit 1001 (Step S287: NO), the content operation unit 1004 performs Step S286.

If the second information storage unit 103 gets connected (Step S286: YES), the content operation unit 1004 copies the content file including the content ID from the first information storage unit 102 to the second information storage unit 103 (Step S288).

The content operation unit 1004 rewrites the value of the backup flag of the content information including the content ID to "1" (Step S289).

(7) Operations of HD Recorder 100 Performing Restoration Processing

Figure 16:
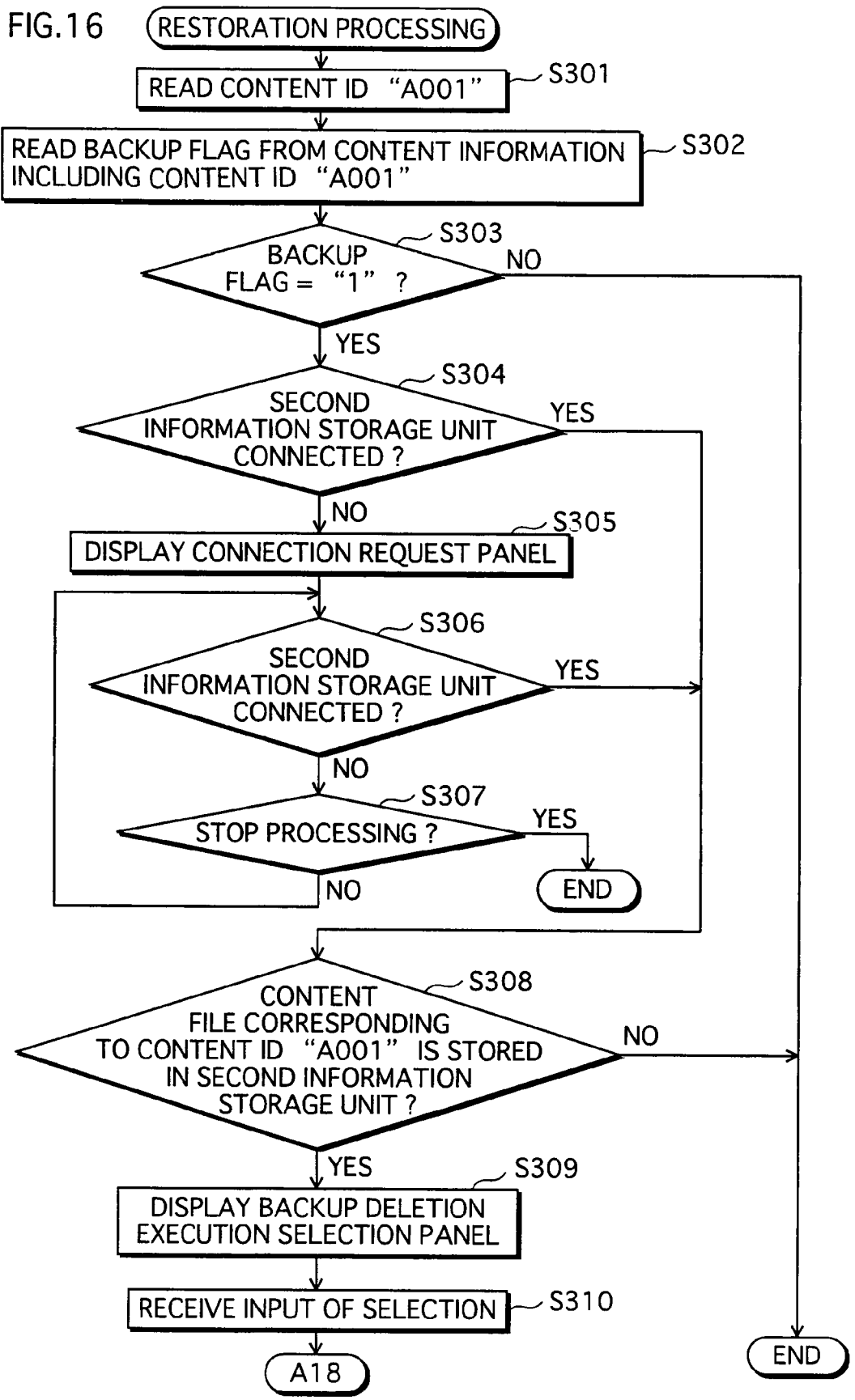
FIG. 16 is a flow chart showing operations of restoration processing performed by the HD recorder.
Figure 17:
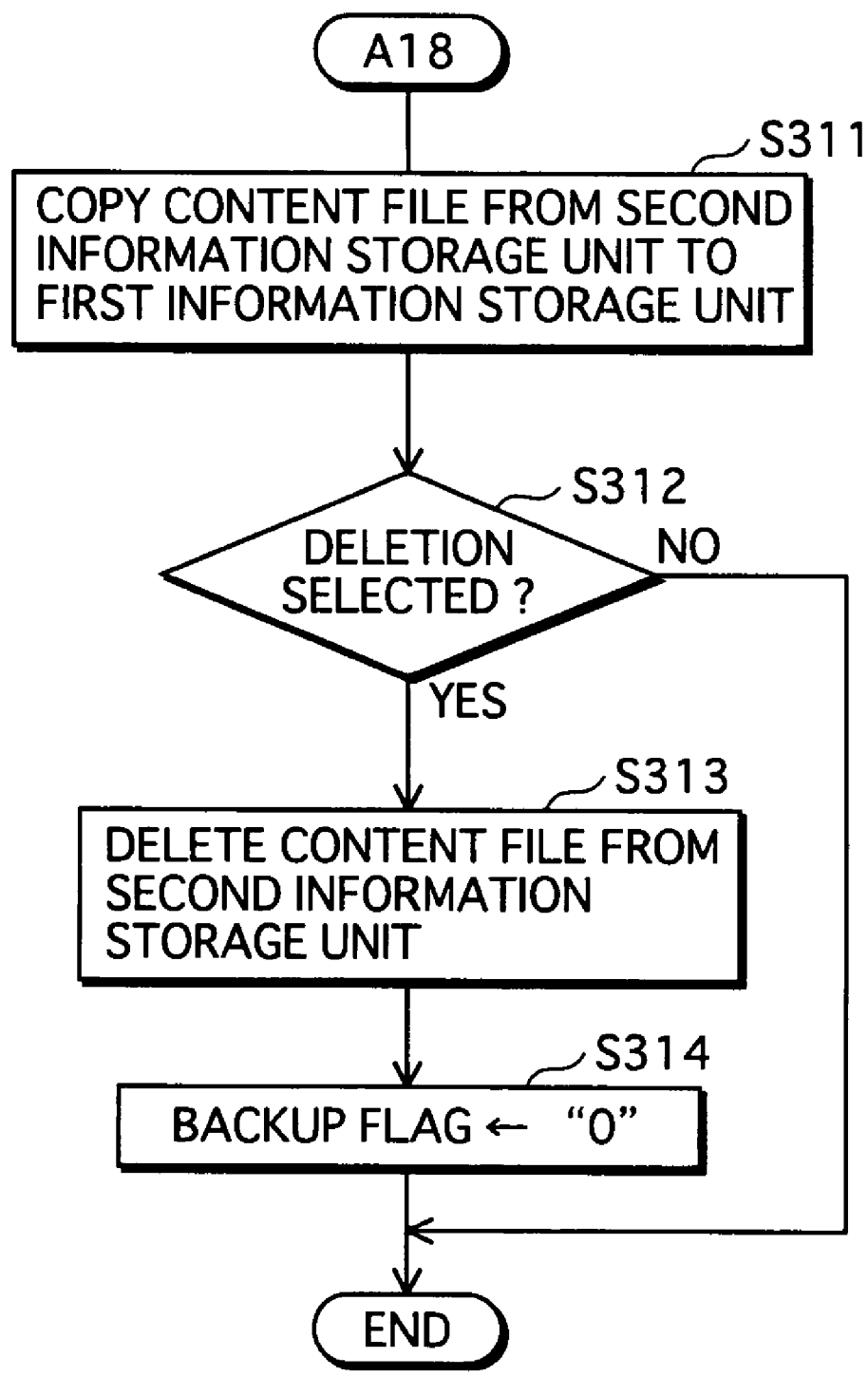
FIG. 17 is a flow chart showing the operations of the restoration processing performed by the HD recorder.

The following describes operations of the HD recorder 100 performing restoration processing using flow charts shown in FIG. 16 and FIG. 17. This is a detailed description of Step S117 in FIG. 6.

As described above, in a state where any one of the content panels 203 to 207 is selected, if receiving operation instruction information that shows selection of the Restore button 214, the operation judgment unit 1001 reads a content ID included in content information corresponding to the selected content panel from the secure storage unit 104 (Step S301), and transmits a restoration instruction including the read content ID to the content operation unit 1004.

Moreover, the content operation unit 1004 receives the restoration instruction, reads a backup flag included in the content information (Step S302), and judges whether the backup flag has a value of "1" (Step S303).

If the backup flag has a value of "0" (Step S303: NO), no backup content file exists, and therefore restoration cannot be performed. Therefore, the content operation unit 1004 ends the restoration processing.

If the backup flag has a value of "1" (Step S303: YES), the content operation unit 1004 detects whether the second information storage unit 103 is connected (Step S304). If not connected (Step S304: NO), the content operation unit 1004 transmits an unconnection notification to the operation judgment unit 1001. Upon receiving the unconnection notification, the operation judgment unit 1001 instructs the panel generation unit 1002 to generate the connection request panel 221 that promotes connection of the second information storage unit 103. The panel generation unit 1002 generates the panel in accordance with the generation instruction, outputs the generated connection request panel 221 to the playback control unit 112, and instructs the playback control unit 112 to display the connection request panel 221 (Step S305).

The playback control unit 112 displays the connection request panel 221 overlaying the content management panel 201 on the monitor 120.

Also, the content operation unit 1004 continues monitoring whether the second information storage unit 103 gets connected (Step S306). If the second information storage unit 103 does not get connected (Step S306: NO), the content operation unit 1004 judges whether the operation judgment unit 1001 has received operation instruction information that shows stop of the processing (Step S307).

If receiving the operation instruction information that shows stop of the processing via the operation judgment unit 1001 (Step S307: YES), the content operation unit 1004 stops the restoration processing.

If not receiving the operation instruction information that shows stop of the processing via the operation judgment unit 1001 (Step S307: NO), the content operation unit 1004 performs Step S306.

If the second information storage unit 103 gets connected (Step S304: YES, Step S306: YES), the content operation unit 1004 judges whether the content file including the content ID is stored in the second information storage unit 103.

If the content file is not stored in the second information storage unit 103 (Step S308: NO), the content operation unit 1004 ends the restoration processing.

If the content file is stored in the second information storage unit 103 (Step S308: YES), the content operation unit 1004 transmits a notification that shows an existence of a backup to the operation judgment unit 1001.

The operation judgment unit 1001 receives the notification, and instructs the panel generation unit 1002 to generate the backup deletion execution selection panel 231 that promotes selection whether backup deletion is executed.

The panel generation unit 1002 generates the backup deletion execution selection panel 231 in accordance with the generation instruction, and outputs the generated backup deletion execution selection panel 231 to the playback control unit 112 (Step S309).

The playback control unit 112 displays the backup deletion execution selection panel 231 overlaying the content management panel 201 on the monitor 120.

The user selects either the deletion execution button 232 or the deletion no-execution button 233 via the input unit 110. The content operation unit 1004 receives operation instruction information that shows selection whether deletion is executed via the operation judgment unit 1001 (Step S310).

The content operation unit 1004 copies the content file stored from the second information storage unit 103 to the first information storage unit 102 (Step S311).

The content operation unit 1004 judges whether the operation instruction information received in Step S310 shows execution of deletion (Step S312). If the operation instruction information shows execution of deletion (Step S312: YES), the content operation unit 1004 deletes the content file from the second information storage unit 103 (Step S313), and rewrites the value of the backup flag included in the content information to "0" (Step S314).

If the operation instruction information shows no-execution of deletion (Step S312: NO), the content operation unit 1004 ends the restoration processing.

(8) Device Authentication Processing

Figure 21:
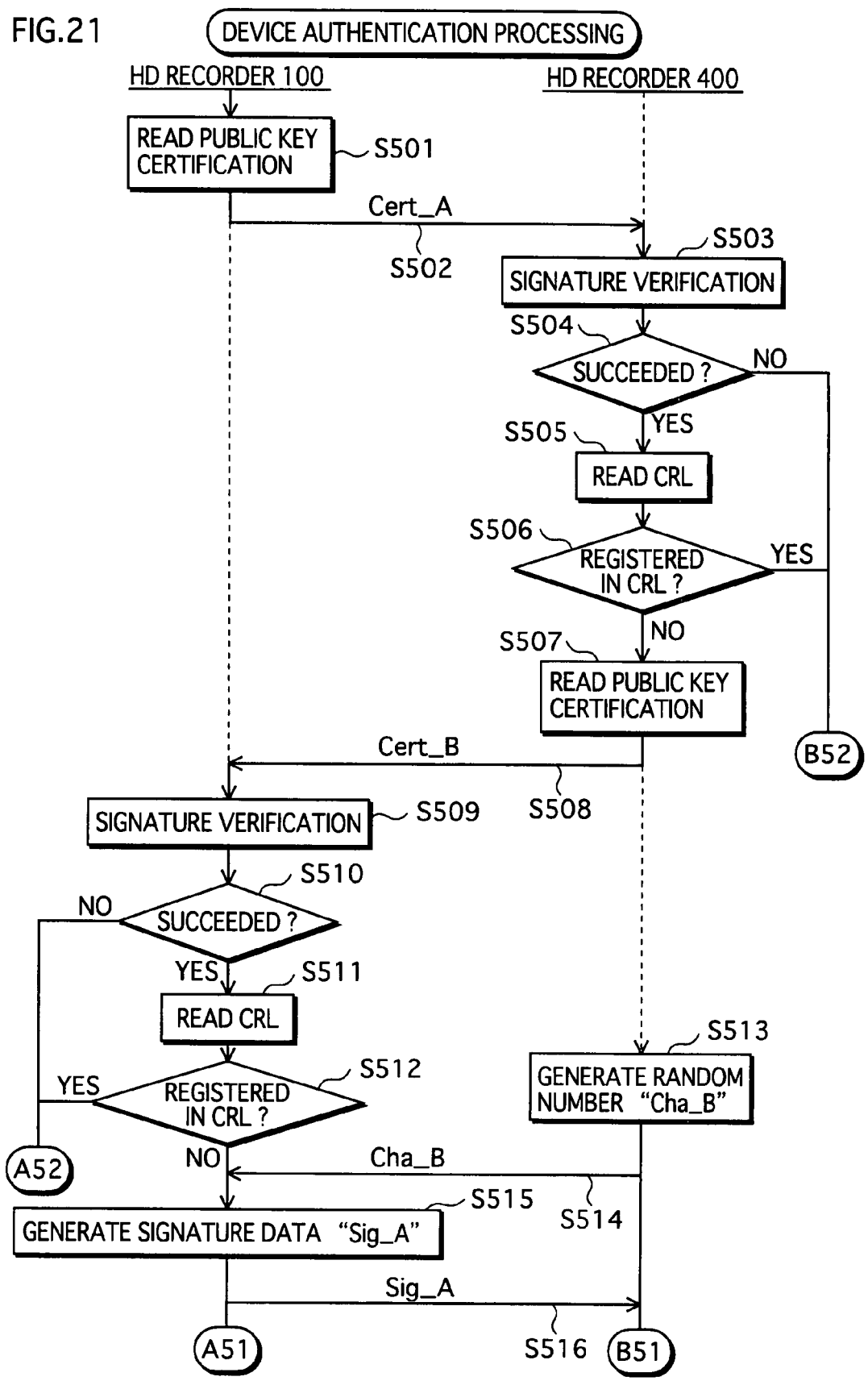
FIG. 21 is a flow chart showing device authentication processing.
Figure 22:
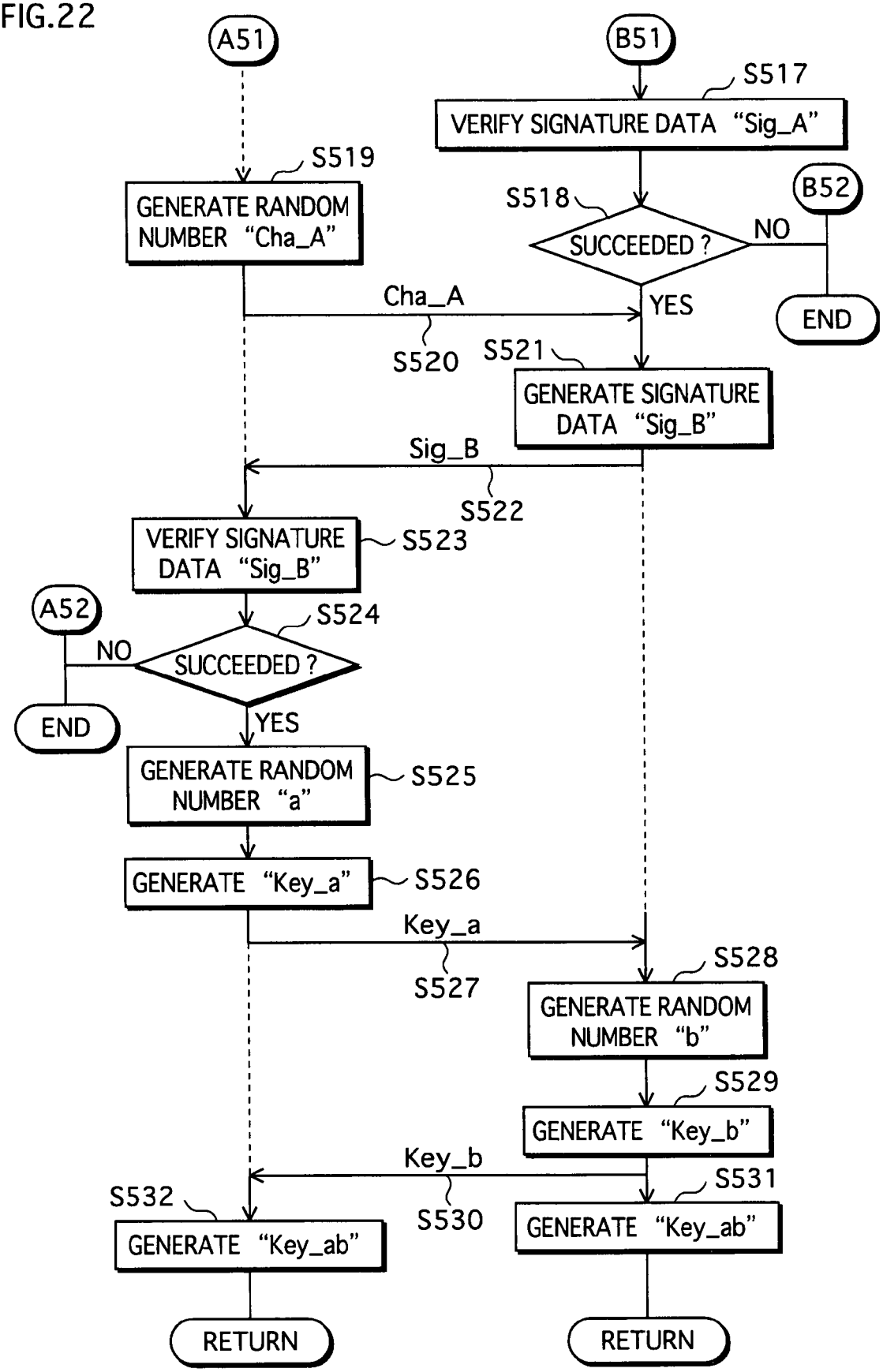
FIG. 22 is a flow chart showing the device authentication processing.

The following describes device authentication processing using an example of operations of device authentication processing between the HD recorder 100 and the HD recorder 400 using flow charts shown in FIG. 21 and FIG. 22.

Note that the method used here for device authentication is just one example, and other authentication methods or key sharing schemes may be used. Here, "Gen( )" is a key generation function and "Y" is a system-specific parameter. Also, the key generation function "Gen( )" is a function that satisfies a relation "Gen(x, Gen(Y,z))=Gen(Y, Gen(x, z))". Moreover, since key generation functions are realizable by arbitrary well-known arts, the details of such functions are not described here.

The authentication unit 114 of the HD recorder 100 reads the public key certificate "Cert_A" (Step S501), and transmits read public key certificate "Cert_A" to the HD recorder 400 via the transmission/reception unit 115 (Step S502).

Upon receiving the public key certificate "Cert_A", the authentication unit 414 of the HD recorder 400 performs signature verification by applying a signature verification algorithm V to signature data of the certification authority "Sig_CA" included in the received public key certificate of the certification authority "Cert_A" using the public key of the certification authority "PK_CA" (Step S503). Here, the signature verification algorithm V is an algorithm for verifying signature data generated by using the signature generation algorithm S. If the signature verification fails (Step S504: NO), the authentication unit 414 ends the device authentication processing.

If the signature verification succeeds (Step S504: YES), the authentication unit 414 reads a CRL (Step S505), and judges whether a certification identification number "ID_a" included in the received public key certificate "Cert_A" is registered in the read CRL (Step S506). If registered (Step S506: YES), the authentication unit 414 ends the device authentication processing.

If not registered (Step S506: NO), the authentication unit 414 reads a public key certificate "Cert_B" (Step S507), and transmits the read public key certificate "Cert_B" to the HD recorder 100.

Upon receiving the public key certificate "Cert_B", the authentication unit 114 of the HD recorder 100 performs signature verification by applying the signature verification algorithm V to the signature data of the certification authority "Sig_CA" included in the received public key certificate of the certification authority "Cert_B" using the public key of the certification authority "PK_CA" (Step S509). If the signature verification fails (Step S510: NO), the authentication unit 414 ends the device authentication processing.

If the signature verification succeeds (Step S510: YES), the authentication unit 114 reads a CRL (Step S511), and judges whether a certification identification number "ID_b" included in the received public key certificate "Cert_B" is registered in the read CRL (Step S512). If registered (Step S512: YES), the authentication unit 414 ends the device authentication processing. If not registered (Step S512: NO), the authentication unit 414 continues the device authentication processing.

The authentication unit 414 of the HD recorder 400 generates a random number "Cha_B" (Step S513), and transmits the generated random number "Cha_B" to the HD recorder 100 (Step S514).

The authentication unit 114 of the HD recorder 100 receives the random number "Cha_B", and applies the signature generation algorithm S to the received random number "Cha_B" using the secret key of the HD recorder 100 "SK_A" to generate signature data "Sig_A" (Step S515), and transmits the generated signature data "Sig_A" to the HD recorder 400 (Step S516).

Upon receiving the signature data "Sig_A", the authentication unit 414 of the HD recorder 400 performs signature verification by applying the signature verification algorithm V to the received signature data "Sig_A" using the public key of the HD recorder 100 "PK_A" included in the received public key certificate "Cert_A" (Step S517). If the signature verification fails (Step S518: NO), the authentication unit 414 ends the device authentication processing. If the signature verification succeeds (Step S518: YES), the authentication unit 414 continues the device authentication processing.

The authentication unit 114 of the HD recorder 100 generates a random number "Cha_A" (Step S519), and transmits the generated random number "Cha_A" to the HD recorder 400 (Step S520).

The authentication unit 414 of HD recorder 400 receives the random number "Cha_A", and applies the signature generation algorithm S to the received random number "Cha_A" using the secret key of the HD recorder 400 "SK_B" to generate signature data "Sig_B" (Step S521), and transmits the generated signature data "Sig_B" to the HD recorder 100 (Step S522).

Upon receiving the signature data "Sig_B", the authentication unit 114 of the HD recorder 100 performs signature verification by applying the signature verification algorithm V to the received signature data "Sig_B" using the public key of the HD recorder 400 "PK_B" included in the received public key certificate "Cert_B" (Step S523). If the signature verification fails (Step S524: NO), the authentication unit 114 ends the device authentication processing. If the signature verification succeeds (Step S524: YES), the authentication unit 114 generates a random number "a" (Step S525), generates "Key_a=Gen(a,Y)" using the generated random number "a" (Step S526), and transmits the generated "Key_a" to the HD recorder 400 (Step S527).

Upon receiving "Key_a", the authentication unit 414 of the HD recorder 400 generates a random number "b" (Step S528), generates "Key_b=Gen (b, Y)" using the generated random number "b" (Step S529), and transmits the generated. "Key_1b" to the HD recorder 100 (Step S530).

Moreover, the authentication unit 414 generates, as a session key, "Key_ab=Gen(b, Key_A)=Gen(b, Gen(a, Y))" using the generated random number "b" and the received "Key_a" (Step S531).

Upon receiving "Key_b", the HD recorder 100 generates, as a session key, "Key_ab=Gen(a, Key_b)=Gen(a, Gen(b, Y))" using the generated random number "a" and the received "Key_b" (Step S532).

Second Embodiment

<Outline of Backup System 2>

In the first embodiment, the HD recorder 100 includes the backup hard disk included for backing up of contents. Contents are backed up using the backup hard disk. In a second embodiment, the HD recorder 100 does not include a backup hard disk. Instead, a backup device 500 includes a backup hard disk. If a content needs to be backed up, the HD recorder 100 requests the backup device 500 to back up the content. Upon receiving the request, the backup device 500 backs up the content.

Figure 23:
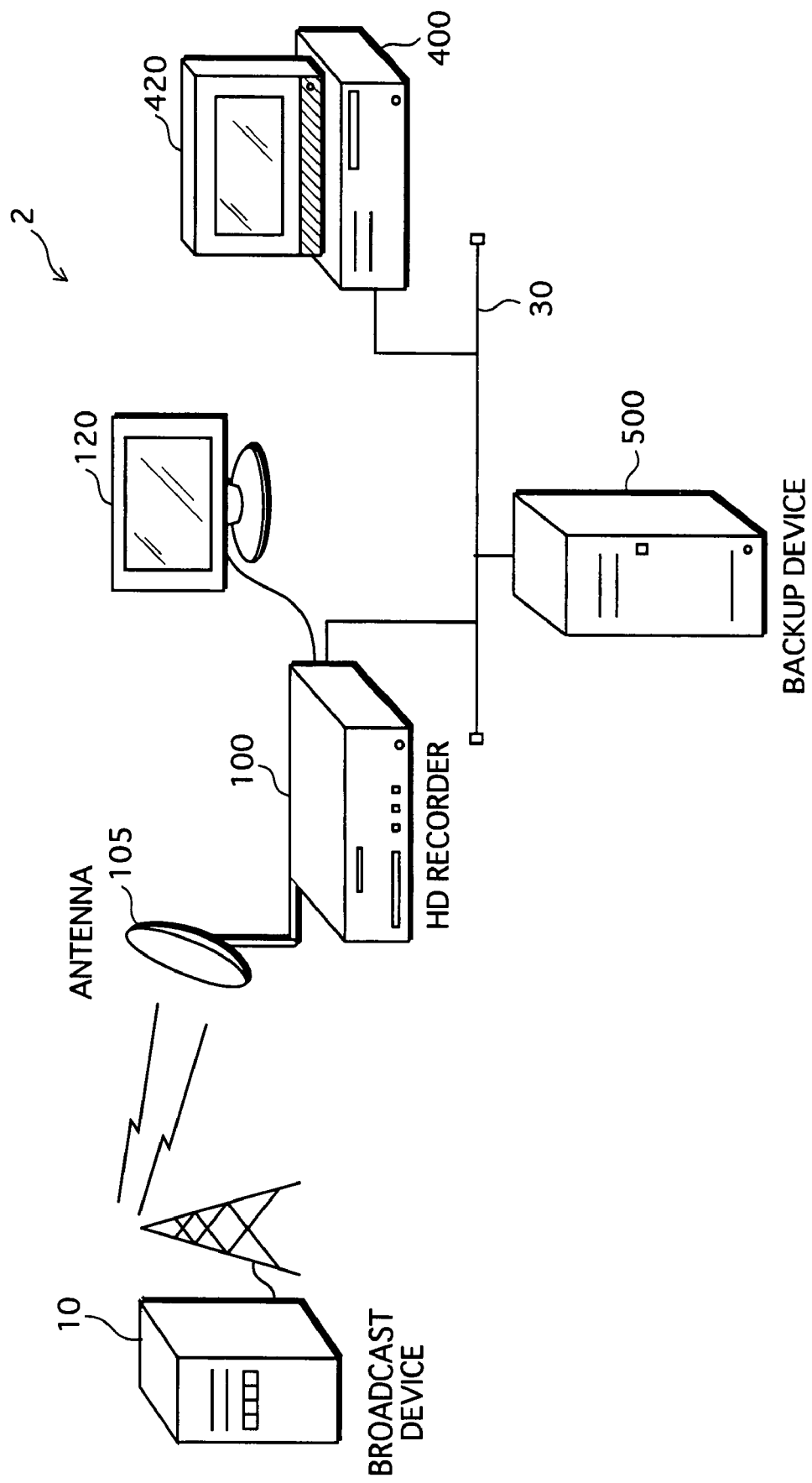
FIG. 23 is a schematic diagram showing a structure of a backup system according to a second embodiment of the present invention.

A backup system 2 according to the present invention includes an HD recorder 100, an HD recorder 400, and the backup device 500, as shown in FIG. 23. The HD recorder 100, the HD recorder 400, and the backup device 500 are connected with each other via a home network 30 based on IEEE1394.

The HD recorder 100 acquires a content composed of a video and a sound by receiving a broadcast wave transmitted from a broadcast device 10, and stores the acquired content. Moreover, the HD recorder 100 is equipped with a DVD as an external recording medium, and can acquire contents from the external recording medium.

If a content needs to be backed up, the HD recorder 100 transmits the content stored therein to the backup device 500. The backup device 500 receives the content from the HD recorder 100, and stores the received content therein.

Moreover, in accordance with a request by the HD recorder 400, the HD recorder 100 can move a content stored therein or the content stored in the backup device 500 to the HD recorder 400.

Furthermore, when deleting a content stored therein, the HD recorder 100 can set up an attribute whether the content is restorable later.

When deleting a content having an attribute set up as to be restorable, the HD recorder 100 stores a copy of the content in the backup device 500, and then deletes the content stored in the HD recorder 100 itself.

In the same way as the HD recorder 100, the HD recorder 400 receives a content including a broadcast program, stores and plays back the content, and then transmits the content to the backup device 500.

<HD Recorder 100 and HD Recorder 400>

Figure 24:
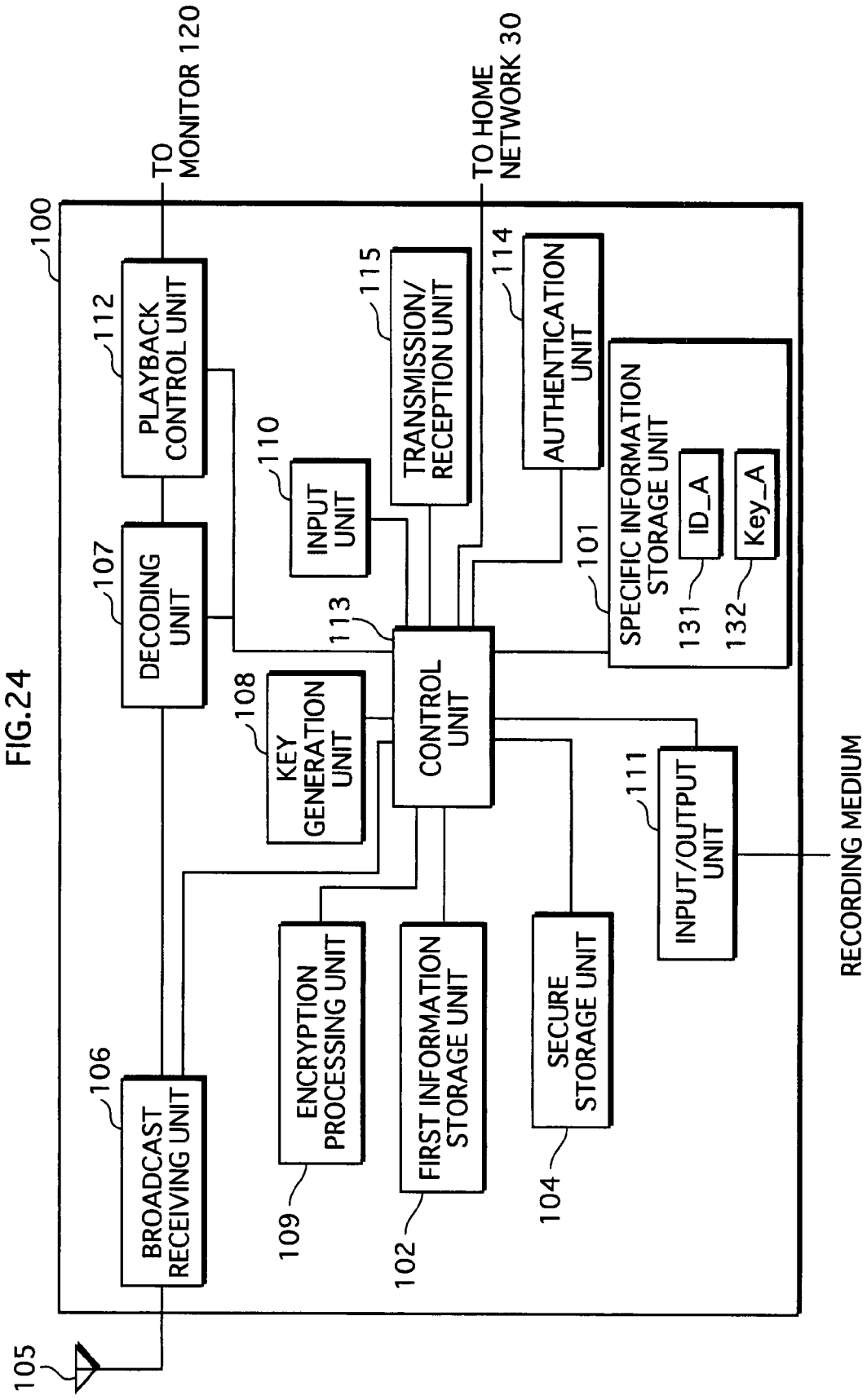
FIG. 24 is a block diagram showing a structure of an HD recorder according to the second embodiment of the present invention.

The HD recorder 100 of the second embodiment includes units that constitute the HD recorder 100 of the first embodiment except for the second information storage unit 103, as shown in FIG. 24.

Also, the control unit 113 performs processing different from those in the first embodiment, in the backup processing in Step S115, the restoration processing in Step S117, the deletion processing in Step S113, and the move processing in Step S111 shown in FIG. 6 described in the first embodiment.

Furthermore, if receiving a move request from an external device, the control unit 113 performs new processing that is not in the first embodiment. The processing performed by the control unit 113 is described here.

(1) Control of Backup Processing

In a state where any one of the content panels 203 to 207 is selected in Steps S101 to S106 described in the first embodiment using FIG. 6, if receiving operation instruction information that shows selection of the Backup button 213, the operation judgment unit 1001 reads content information corresponding to the selected content panel from the secure storage unit 104.

Moreover, the operation judgment unit 1001 judges whether a backup flag included in the content information has a value of "1".

If the backup flag has a value of "1", a content file corresponding to the content information has been already backed up. Therefore, the operation judgment unit 1001 ends the backup processing. If the backup flag has a value of "0", the operation judgment unit 1001 transmits an activation instruction to the backup device 500 via the transmission/reception unit 115.

If not receiving an activation notification from the backup device 500 within a predetermined time period, the content operation unit 1004 ends the backup processing. If receiving the activation notification, the operation judgment unit 1001 instructs the authentication unit 114 to perform device authentication between the HD recorder 100 and the backup device 500.

If the device authentication fails, the operation judgment unit 1001 ends the processing. If the device authentication succeeds, the operation judgment unit 1001 transmits a backup instruction including the content ID to the content operation unit 1004.

The content operation unit 1004 reads a title, a recording date and time, and a hash value from the content information including the content ID, reads the content file including the content ID from the first information storage unit 102, and reads a device identifier from the specific information storage unit 101. Then, the content operation unit 1004 transmits a backup request, the content ID, the title, the recording date and time, the hash value, the device identifier, and the content file, to the backup device 500 via the transmission/reception unit 115.

If receiving a backup response, as a response to the backup request, from the backup device 500 via the transmission/reception unit 115, the content operation unit 1004 rewrites a value of the backup flag of the content information including the content ID to "1", rewrites a value of a priority level to "2", notifies the operation judgment unit 1001 that the backup has completed, and ends the backup processing.

(2) Control of Restoration Processing

In a state where any one of the content panels 203 to 207 is selected in Steps S101 to S106 described in the first embodiment using FIG. 6, if receiving operation instruction information that shows selection of the Restore button 214, the operation judgment unit 1001 reads content information corresponding to the selected content panel from the secure storage unit 104. The operation judgment unit 1001 reads a content ID included in the content information, and transmits an activation instruction to the backup device 500 via the transmission/reception unit 115.

If not receiving an activation notification from the backup device 500 within a predetermined time period, the operation judgment unit 1001 ends the restoration processing. If receiving the activation notification, the operation judgment unit

1001 instructs the authentication unit 114 to perform device authentication between the HD recorder 100 and the backup device 500.

If the device authentication fails, the content operation unit 1004 ends the restoration processing. If the device authentication succeeds, the operation judgment unit 1001 transmits a restoration instruction including the content ID to the content operation unit 1004.

The content operation unit 1004 reads the device identifier 131 "ID_A" from the specific information storage unit 101, and transmits a restoration request, the content ID, and the read device identifier 131 "ID_A", to the backup device 500 via the transmission/reception unit 115.

The content operation unit 1004 receives a content file, as a response to the restoration request, from the backup device 500 via the transmission/reception unit 115, and writes the received content file into the first information storage unit 102.

(3) Control of Deletion Processing

In a state where any one of the content panels 203 to 207 is selected in Steps S101 to S106 described in the first embodiment using FIG. 6, if receiving operation instruction information that shows selection of the Delete button 212, the operation judgment unit 1001 reads content information corresponding to the selected content panel from the secure storage unit 104, and instructs the panel generation unit 1002 to generate a restoration attribute selection panel 241. The panel generation unit 1002 generates the restoration attribute selection panel 241 in accordance with the generation instruction, and outputs the generated restoration attribute selection panel 241 to the playback control unit 112.

Next, if receiving operation instruction information that shows selection of "restorable" from the input unit 110, the operation judgment unit 1001 transmits the operation instruction information and a deletion instruction including a content ID to the content operation unit 1004.

The content operation unit 1004 judges whether a backup flag included in the content information including the content ID has a value of "1". If the backup flag has a value of "1", the content operation unit 1004 deletes a content file including the content ID included in the content information from the first information storage unit 102.

If the backup flag has a value of "0", the content operation unit 1004 backs up the content file including the content ID included in the content information from the first information storage unit 102 to the second information storage unit 103. Then, the content operation unit 1004 deletes the content file from the first information storage unit 102.

If receiving operation instruction information that shows selection of "unrestorable", the operation judgment unit 1001 transmits a deletion instruction including the operation instruction information and the content ID to the content operation unit 1004.

The content operation unit 1004 judges whether the backup flag included in the content information including the content ID has a value of "1". If the backup flag has a value of "0", the content operation unit 1004 deletes the content file including the content ID from the first information storage unit 102, and transmits a deletion instruction including the content ID to the hash deletion unit 1011. The hash deletion unit 1011 deletes the content information from the secure storage unit 104 in accordance with the deletion instruction.

If the backup flag has a value of "1", the content operation unit 1004 transmits an activation instruction to the backup device 500 via the transmission/reception unit 115.

If not receiving an activation notification from the backup device 500 within a predetermined time period, the content operation unit 1004 ends the deletion processing. If receiving the activation notification, the content operation unit 1004 instructs the authentication unit 114 to perform device authentication between the HD recorder 100 and the backup device 500.

If the device authentication fails, the content operation unit 1004 ends the deletion processing. If the device authentication succeeds, the content operation unit 1004 reads a device identifier from the specific information storage unit 101, and transmits a deletion request, the content ID, and the read device identifier, to the backup device 500 via the transmission/reception unit 115.

The content operation unit 1004 receives a deletion response, as a response to the deletion request, from the backup device 500, deletes the content file including the content ID from the first information storage unit 102, and transmits a deletion instruction including the content ID to the hash deletion unit 1011.

The hash deletion unit 1011 deletes the content information from the secure storage unit 104 in accordance with the deletion instruction.

(4) Control of Move Processing

In a state where any one of the content panels 203 to 207 is selected in Steps S101 to S106 described in the first embodiment using FIG. 6, if receiving operation instruction information that shows selection of the Move button 211, the operation judgment unit 1001 instructs the panel generation unit 1002 to generate the move destination selection panel 215 that shows a list of candidates for a move destination.

The panel generation unit 1002 generates the move destination selection panel 215 in accordance with the generation instruction, and outputs the generated move destination selection panel 215 to the playback control unit 112.

In order to generate the move destination selection panel 215, the operation judgment unit 1001 transmits a broadcast instruction to the transmission/reception unit 115, and receives an information acquisition response including pieces of device identification information of other devices connected to the home network 30, as a response to the broadcast instruction, via the transmission/reception unit 115. The operation judgment unit 1001 extracts the pieces of device identification information included in the received information acquisition response, and instructs the panel generation unit 1002 to generate move destination panels that correspond one-to-one with the pieces of device identification information. The panel generation unit 1002 generates move destination panels that correspond to all devices whose responses to the broadcast instruction have been received, combines all the generated move destination panels to generate a move destination selection panel 215.

Next, the operation judgment unit 1001 receives operation information instruction that shows a move destination selected by the user's operation from the input unit 110.

Here, the HD recorder 400 is selected as the move destination.

The operation judgment unit 1001 reads content information corresponding to the selected content panel from the secure storage unit 104, and transmits a move instruction including a content ID included in the content information to the content operation unit 1004.

The content operation unit 1004 judges whether a backup flag included in the content information including the content ID has a value of "1".

If the backup flag has a value of "1", the content operation unit 1004 judges whether a content file including the selected content ID is stored in the first information storage unit 102. If the content file is not stored, the content operation unit 1004 performs the above-described restoration processing on the content file including the content ID.

If the content file is stored, the content operation unit 1004 performs deletion processing on the content file including the content ID that has been restored in the backup device 500.

If the content file including the content ID is stored only in the first information storage unit 102, the content operation unit 1004 detects the content file including the content ID from the first information storage unit 102, reads an encrypted content and an encrypted content key that are included in the detected content file, and transmits the content ID, the read encrypted content, and the read encrypted content key to the hash calculation unit 1013.

The hash calculation unit 1013 combines the read encrypted content and the read encrypted content key, assigns the combination to the hash function to calculate a hash value, and transmits the read hash value and the content ID to the hash comparison unit 1014.

The hash comparison unit 1014 reads the hash value from the content information including the content ID. The hash comparison unit 1014 compares the calculated hash value with the read hash value, and transmits a comparison result that shows whether these hash values match each other to the content operation unit 1004.

If the comparison result shows that the values do not match each other, the content operation unit 1004 ends the move processing. If the comparison result shows that the values match each other, the content operation unit 1004 reads the device-specific key 132 "Key_A" from the specific information storage unit 101, outputs the read device-specific key 132 "Key_A" and the encrypted content key to the encryption processing unit 109, and instructs the encryption processing unit 109 to decrypt the encrypted content key. The content operation unit 1004 receives a content key, as a response to the decryption instruction, from the encryption processing unit 109.

The content operation unit 1004 instructs the authentication unit 114 to perform device authentication between the HD recorder 100 and the HD recorder 400.

If the device authentication fails, the content operation unit 1004 ends the move processing.

If the device authentication succeeds, the content operation unit 1004 instructs the transmission/reception unit 115 to transmit a move request to the HD recorder 400, together with the content key corresponding to the content ID, the content information, and the content file.

Next, the content operation unit 1004 receives a move response, as a response to the move request, from the HD recorder 400 via the transmission/reception unit 115, and transmits a deletion instruction to delete the content information transmitted together with the move request to the hash deletion unit 1011.

The hash deletion unit 1011 deletes the content information from the secure storage unit 104 of the HD recorder 100.

Moreover, the content operation unit 1004 deletes the content file from the first information storage unit 102 of the HD recorder 100, and ends the move processing.

(5) Control if Receiving Move Request from External Device

If receiving a move request, content information, a content file, and a content key from the external device via the transmission/reception unit 115 and the operation judgment unit 1001, the content operation unit 1004 reads the device-specific key 132 "Key_B" from the specific information storage unit 101, transmits the received content key and the read device-specific key 132 "Key_B" to the encryption processing unit 109, and instructs the encryption processing unit 109 to encrypt the content key.

The content operation unit 1004 receives an encrypted content key, as a response to the encryption instruction, from the encryption processing unit 109.

The content operation unit 1004 writes the received content file into the first information storage unit 102, and rewrites an encrypted content key included in the written content file to the encrypted content key received from the encryption processing unit 109.

The content operation unit 1004 transmits an encrypted content and the encrypted content key that are included in the content file to the hash calculation unit 1013.

The hash calculation unit 1013 receives and combines the encrypted content and the encrypted content key, and assigns the combination to the hash function to calculate a hash value. The hash calculation unit 1013 replaces the hash value included in the content information with the calculated hash value, and then writes the calculated hash value into the secure storage unit 104.

The content operation unit 1004 instructs the transmission/reception unit 115 to transmit a move response to the external device.

<Backup Device 500>

Figure 25:
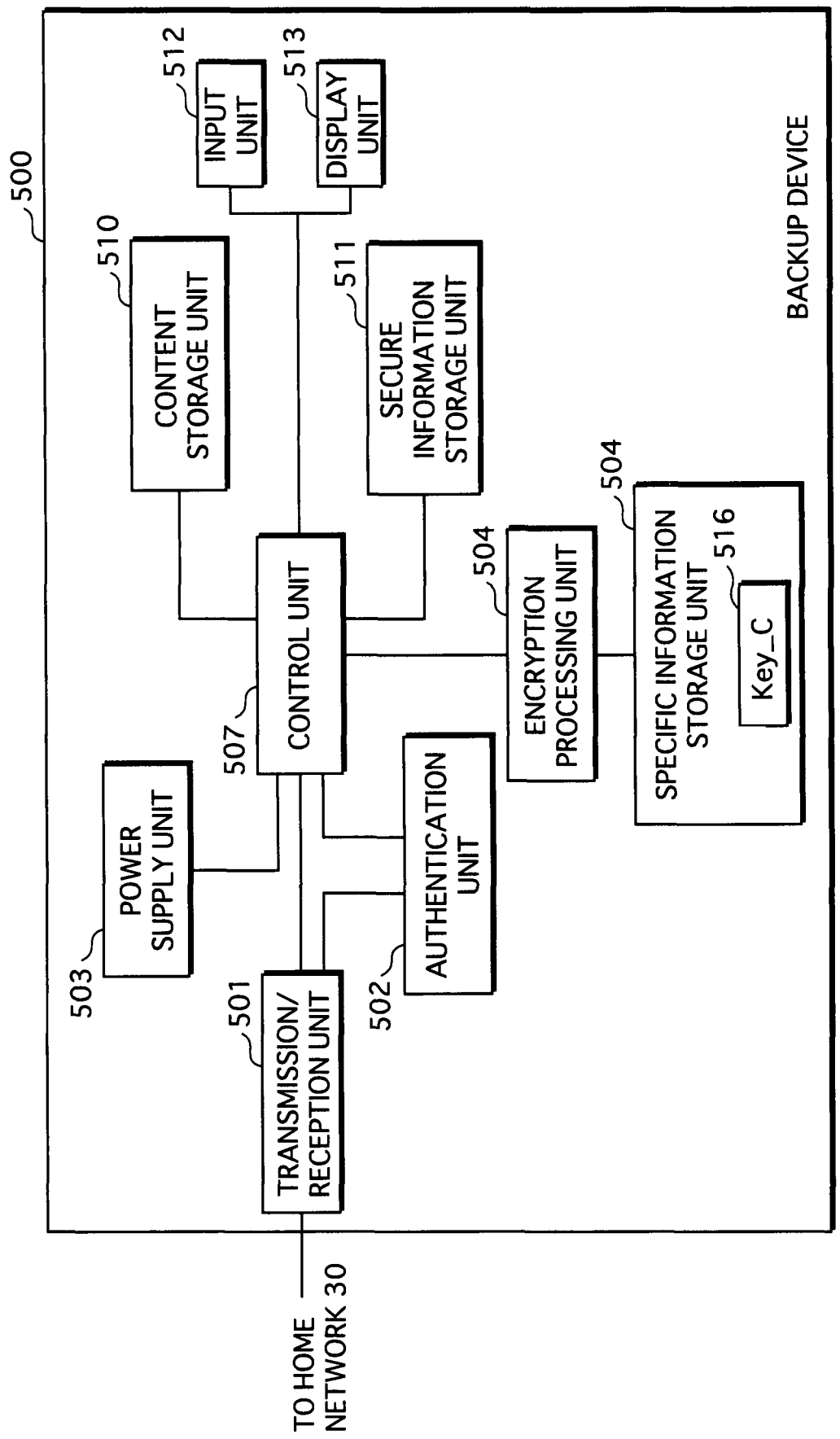
FIG. 25 is a block diagram showing a structure of a backup device according to the second embodiment of the present invention.

The backup device 500 includes, as shown in FIG. 25, a transmission/reception unit 501, an authentication unit 502, a power supply unit 503, a control unit 507, an encryption processing unit 509, a specific information storage unit 504, a content storage unit 510, a secure information storage unit 511, an input unit 512, and a display unit 513.

The backup device 500 is specifically a computer system composed of a microprocessor, a RAM, and a ROM. A computer program is stored in the RAM and the ROM. Part of functions of the backup device 500 is achieved by the microprocessor operating in accordance with the computer program.

The specific information storage unit 504 is composed of a ROM, and stores a device-specific key 516 "Key_C". The device-specific key 516 "Key_C" is key data specific to the backup device 500, and is prestored before shipment of the backup device 500.

Figure 26:
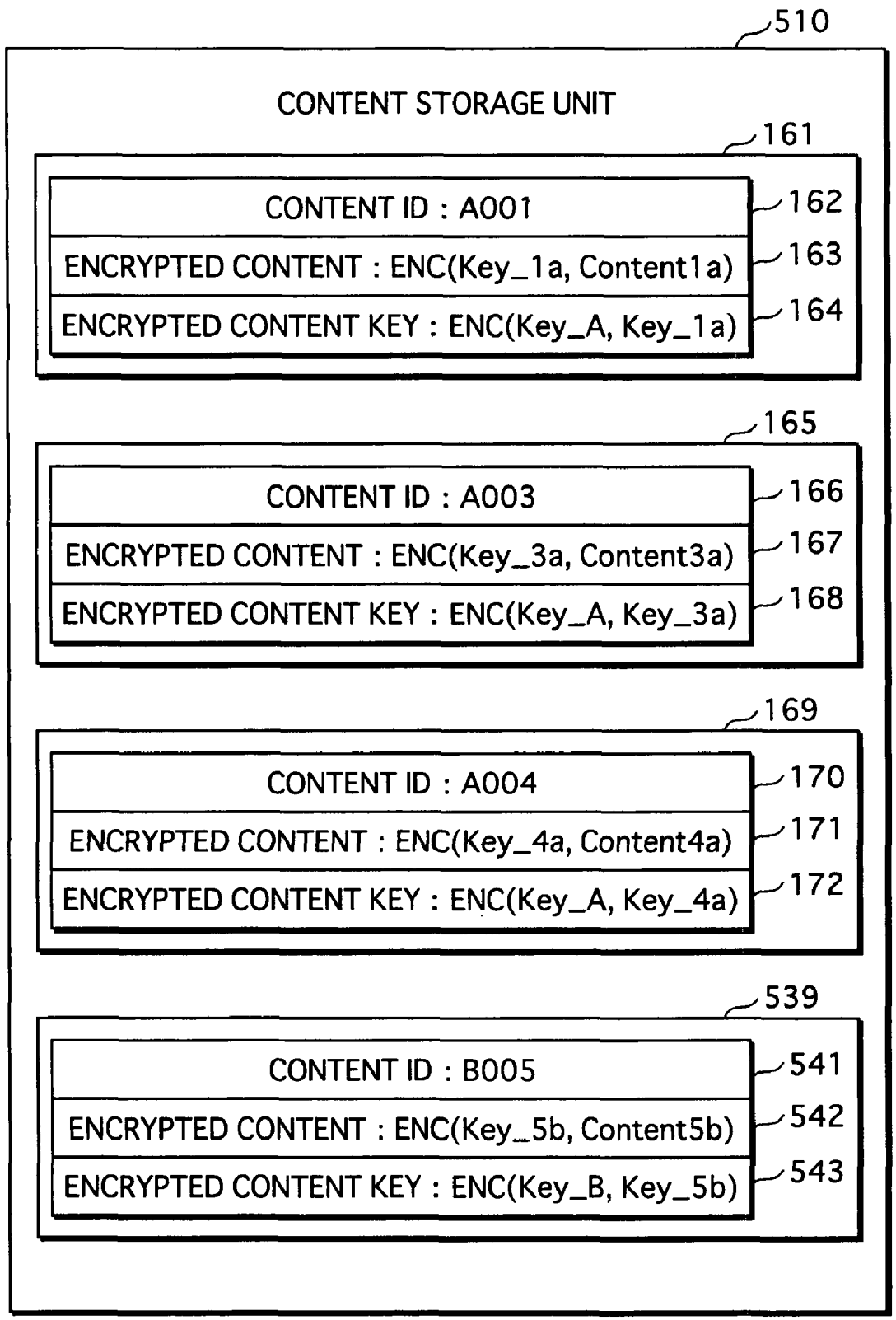
FIG. 26 is a schematic diagram showing data stored in a content storage unit.

The content storage unit 510 is composed of hard disk units, and stores content files 161, 165, 169, 539, and so on as shown in FIG. 26, for example.

The content files 161, 165, and 169 are the same as those described in the first embodiment using FIG. 4.

Moreover, the content file 539 includes a content ID 541 "B005", an encrypted content 542 "ENC(Key_5b, Content5b)", and an encrypted content key 543 "ENC(Key_B, Key_5b)".

Here, the content file 539 is a backup of a content file stored in the first information storage unit 102 of the HD recorder 400. Content information corresponding to the content file stored in the first information storage unit 102 is stored in the secure storage unit 104 of the HD recorder 400.

The content ID 541 "B001" is information for uniquely identifying the encrypted content 542 "ENC(Key_5b, Content5b)", and is the same as a content ID "B001" stored in the first information storage unit 102 of the HD recorder 400. The encrypted content 542 "ENC(Key_5b, Content5b)" is generated by applying the encryption algorithm E1 to a content "Content5b" using a content key "Key_5b". The encrypted content 542 is the same as that stored in the first information storage unit 102 of the HD recorder 400.

The encrypted content key 543 "ENC(Key_B, Key_5b)" is generated by applying the encryption algorithm E1 to the content key "Key_5b" using the device-specific key 132 "Key_B" stored in the specific information storage unit 101 of the HD recorder 400.

The secure information storage unit 511 includes a flash memory. Moreover, the secure information storage unit 511 includes a protection mechanism, and is protected against accesses from an external device.

Figure 27:
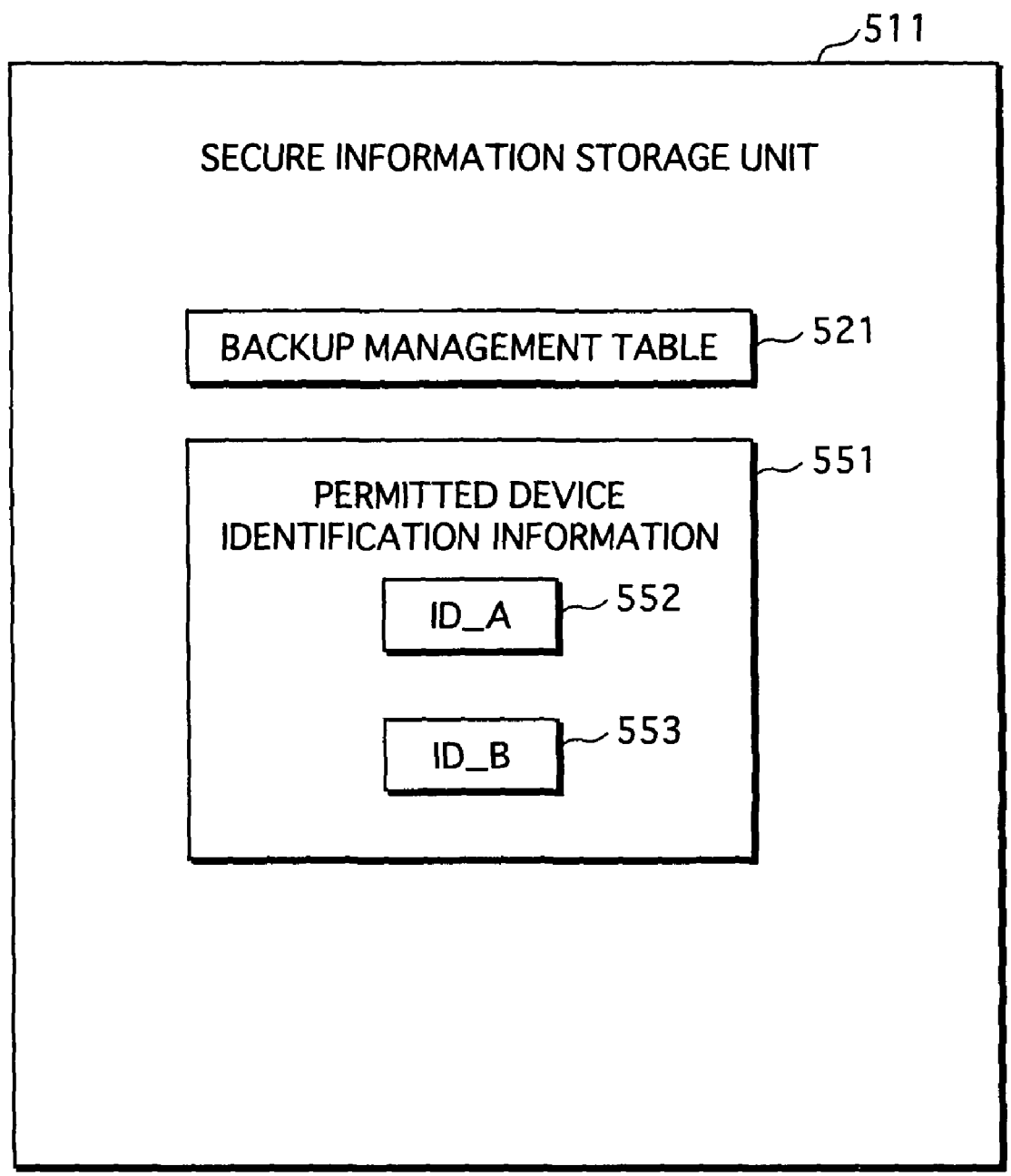
FIG. 27 is a schematic diagram showing data stored in a secure information storage unit.

The secure information storage unit 511 stores, for example, a backup management table 521 and permitted device identification information 551, as shown in FIG. 27.

The backup management table 521 includes a plurality of pieces of backup information 522, 523, 524, 525, and so on, as shown in FIG. 28. Each piece of the backup information includes a content ID, a title, a recording date and time, a backup source device identifier, and a hash value. Pieces of the content information correspond one-to-one with content files stored in the content storage unit 510.

The content ID is the same as a content ID included in a corresponding content file, and is identification information for identifying an encrypted content. The title is a name of a corresponding encrypted content.

The recording date and time shows a date and time when the HD recorder 100 or the HD recorder 400 has acquired a content before being encrypted from the broadcast device 10 or the external recording medium. The backup source device identifier is a device identifier of a device that requests backup of an encrypted content included in the corresponding content file. The hash value is a value generated by combining the encrypted content and an encrypted content key that are included in the corresponding content file and assigning the combination to the hash function.

The permitted device identification information 551 includes identification information of a device by which the backup device 500 receives various types of instructions, such as a backup request. In the second embodiment, the permitted device identification information 551 includes a device identifier 552 "ID_A" indicating the HD recorder 100 that constitutes the backup system 1 and a device identifier 553 "ID_B" indicating the HD recorder 400.

The power supply unit 503 acquires an electric power from an external power, and supplies the acquired electric power to each circuit that constitutes the backup device 500 in accordance with instruction by the control unit 507.

Normally, the power supply unit 503 supplies an electric power to the transmission/reception unit 501 and the control unit 507.

The power supply unit 503 is instructed by the control unit 507 to start supplying an electric power, and starts supplying an electric power to other units. Also, the power supply unit 503 is instructed by the control unit 507 to stop supplying an electric power, stops supplying an electric power to other units except for the transmission/reception unit 501 and the control unit 507.

The transmission/reception unit 501 is connected with the home network 30, and transmits and receives various types of information between the external device connected with the home network 30 and each of the control unit 507 and the authentication unit 502. The external devices used here are the HD recorder 100 and the HD recorder 400.

The authentication unit 502 stores beforehand a secret key specific to the backup device 500 "SK_C", a public key certificate "Cert_C", a public key of the certification authority "PK_CA", and a CRL. The public key certificate "Cert_C" certifies validity of a public key "PK_C" corresponding to the secret key "SK_C", and includes a certification identification number, the public key "PK_C", and signature data of the certification authority. The signature data of the certification authority is generated by at least applying a signature generation algorithm S to the public key "PK_C" using the secret key of the certification authority "SK_C".

The CRL includes a certification identification number of an invalidated public key certificate.

The public key of the certification authority "PK_CA" is a public key that forms a pair with the secret key of the certification authority "SK_CA".

Upon receiving an instruction by the control unit 507, the authentication unit 502 performs device authentication between the HD recorder 100 and the external device in accordance with the DTCP. If the device authentication fails, the authentication unit 502 prohibits a communication between the control unit 507 and the external device. If the device authentication succeeds, the authentication unit 502 generates a session key that is shared between the HD recorder 100 and the external device, and outputs the generated session key to the control unit 507.

The operations in the device authentication between the HD recorder 100 and the HD recorder 400 have been already described using FIG. 21 and FIG. 22. Regarding operations in device authentication between the HD recorder 100 and the backup device 500, the following replacement is used in place of a description thereof. The HD recorder 400, "Cert_B", "Cha_B", "Sig_B", the random number "b", "Key_b", and "Key_ab" in Steps S501 to S532 are replaced with the backup device 500, "Cert_C", "Cha_C", "Sig_C", a random number "c", "Key_c", and "Key_ac", respectively.

The encryption processing unit 509 receives a plaintext and a key from the control unit 507, and is instructed to encrypt the received plaintext. Also, the encryption processing unit 509 receives a ciphertext and a key from the control unit 507, and is instructed to decrypt the received ciphertext.

Upon instructed to encrypt the received plaintext, the encryption processing unit 509 applies the encryption algorithm E1 to the received plaintext using the received key to generate a ciphertext, and outputs the generated ciphertext to the control unit 507.

Upon instructed to decrypt the received ciphertext, the encryption processing unit 509 applies the decryption algorithm D1 to the received ciphertext using the received key to generate a decrypted text, and outputs the generated decrypted text to the control unit 507.

A pair of a plaintext and a key received by the encryption processing unit 509 is composed of a content key and the device-specific key 132 "Key_C", for example. Also, a pair of a ciphertext and a key received by the encryption processing unit 509 is composed of an encrypted content key and the device-specific key 132 "Key_C", for example.

The control unit 507 receives an activation instruction to activate the backup device 500 from the external device via the transmission/reception unit 501. The external device is the HD recorder 100 or the HD recorder 400.

Upon receiving the activation instruction, the control unit 507 instructs the power supply unit 503 to start supplying electric power. Next, the control unit 507 transmits an activation notification that shows activation of the backup device 500 to the external device via the transmission/reception unit 501.

Next, the control unit 507 instructs the authentication unit 502 to perform device authentication between the backup device 500 and the external device. If the device authentication performed by the authentication unit 502 fails, the control unit 507 instructs the power supply unit 503 to stop supplying electric power.

If the device authentication succeeds, the control unit 507 receives a session key from the authentication unit 502. In the following processing, the control unit 507 realizes a secret communication between the backup device 500 and the external device in accordance with a common key encryption system using the received session key. A description of encryption and decryption processing relating to the secret communication is omitted here.

Next, the control unit 507 receives a device identifier, a backup request, a content ID, a content key, a title, a recording date and time, and an encrypted content from the external device via the transmission/reception unit 501. Or, instead of these, the control unit 507 receives a device identifier, an extension request, and content ID. Or, instead of these, the control unit 507 receives a device identifier and a restoration information request.

(1) Backup Processing

Upon receiving a backup request, a device identifier, a content ID, a title, a recording date and time, a hash value, and a content file, the control unit 507 checks whether the received device identifier is included in the permitted device identification information 551 stored in the secure information storage unit 511. If the identifier is not included, the control unit 507 transmits an error notification that shows reception of the backup request is impossible to the external device via the transmission/reception unit 501. Next, the control unit 507 instructs the power supply unit 503 to stop supplying electric power.

If the received identifier is included in the permitted device identification information 551, the control unit 507 writes the received content file into the content storage unit 510.

Next, the control unit 507 generates backup information that consists of the received content ID, title, recording date and time, hash value, and device identifier, and adds the generated backup information to the backup management table 521. Here, the received device identifier is set as a backup source device identifier.

Next, the control unit 507 transmits a backup response that shows completion of the backup to the external device via the transmission/reception unit 501.

When the transmission has completed, the control unit 507 instructs the power supply unit 503 to stop supplying electric power.

(2) Restoration Processing

Upon receiving a restoration request, a content ID, and a device identifier from the external device via the transmission/reception unit 501, the control unit 507 checks whether the received device identifier is included in the permitted device identification information 551 stored in the secure information storage unit 511. If the identifier is not included, the control unit 507 transmits an error notification that shows reception of the restoration request is impossible to the external device via the transmission/reception unit 501. Next, the control unit 507 instructs the power supply unit 503 to stop supplying electric power.

If the received identifier is included in the permitted device identification information 551, the control unit 507 selects and read backup information, which includes an content ID that is the same as the received content ID included in the backup management table 521 stored in the secure information storage unit 511 and a backup source device identifier that is the same as the received device identifier.

Next, the control unit 507 detects and reads a content file corresponding to the selected backup information based on the received content ID and device identifier, and transmits the read content file to the external device.

(3) Deletion Processing

Upon receiving a deletion request, a content ID, and a device identifier from the external device via the transmission/reception unit 501, the control unit 507 checks whether the received device identifier is included in the permitted device identification information 551 stored in the secure information storage unit 511. If the identifier is not included, the control unit 507 transmits an error notification that shows reception of the deletion request is impossible to the external device via the transmission/reception unit 501. Next, the control unit 507 instructs the power supply unit 503 to stop supplying electric power.

If the received identifier is included in the permitted device identification information 551, the control unit 507 selects backup information, which includes a content ID that is the same as the received content ID included in the backup management table 521 stored in the secure information storage unit 511 and a backup source device identifier that is the same as the received device identifier, and deletes the selected backup information from the secure information storage unit 511. The control unit 507 detects a content file including the received content ID corresponding to the deleted backup information, and deletes the detected content file from the content storage unit 510.

The control unit 507 transmits a deletion response that shows the deletion of the content file to the external device.

The input unit 512 receives an input of information and an instruction by the user, and outputs the received information and operation instruction information based on the received instruction to the control unit 507.

The display unit 513 displays various types of information under control of the control unit 507.

<Operations>

The following operations of the backup system 2, especially operations different from those of the backup system 1 in the second embodiment, are described focusing on operations of the HD recorder 100 using flow charts.

(1) Operations of HD Recorder 100

In the operation of the HD recorder 100 in the second embodiment, backup processing in Step S115, restoration processing in Step S117, deletion processing in Step S113, and move processing in Step S111 shown in FIG. 6 are different from those in the first embodiment. The following describes the backup processing, the restoration processing, the deletion processing, and the move processing.

(2) Backup Processing

Figure 29:
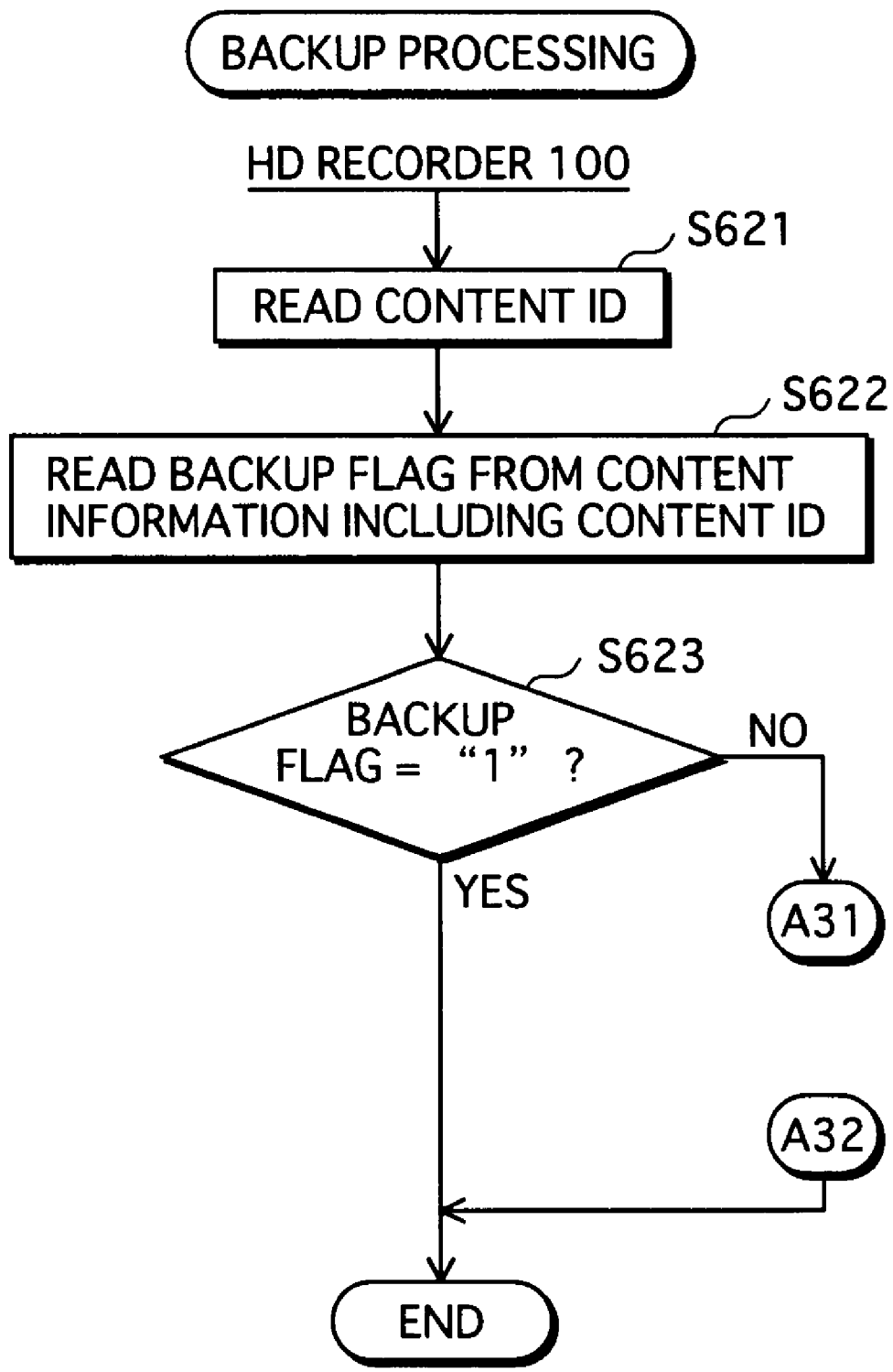
FIG. 29 is a flow chart showing operations of backup processing in the backup system.
Figure 30:
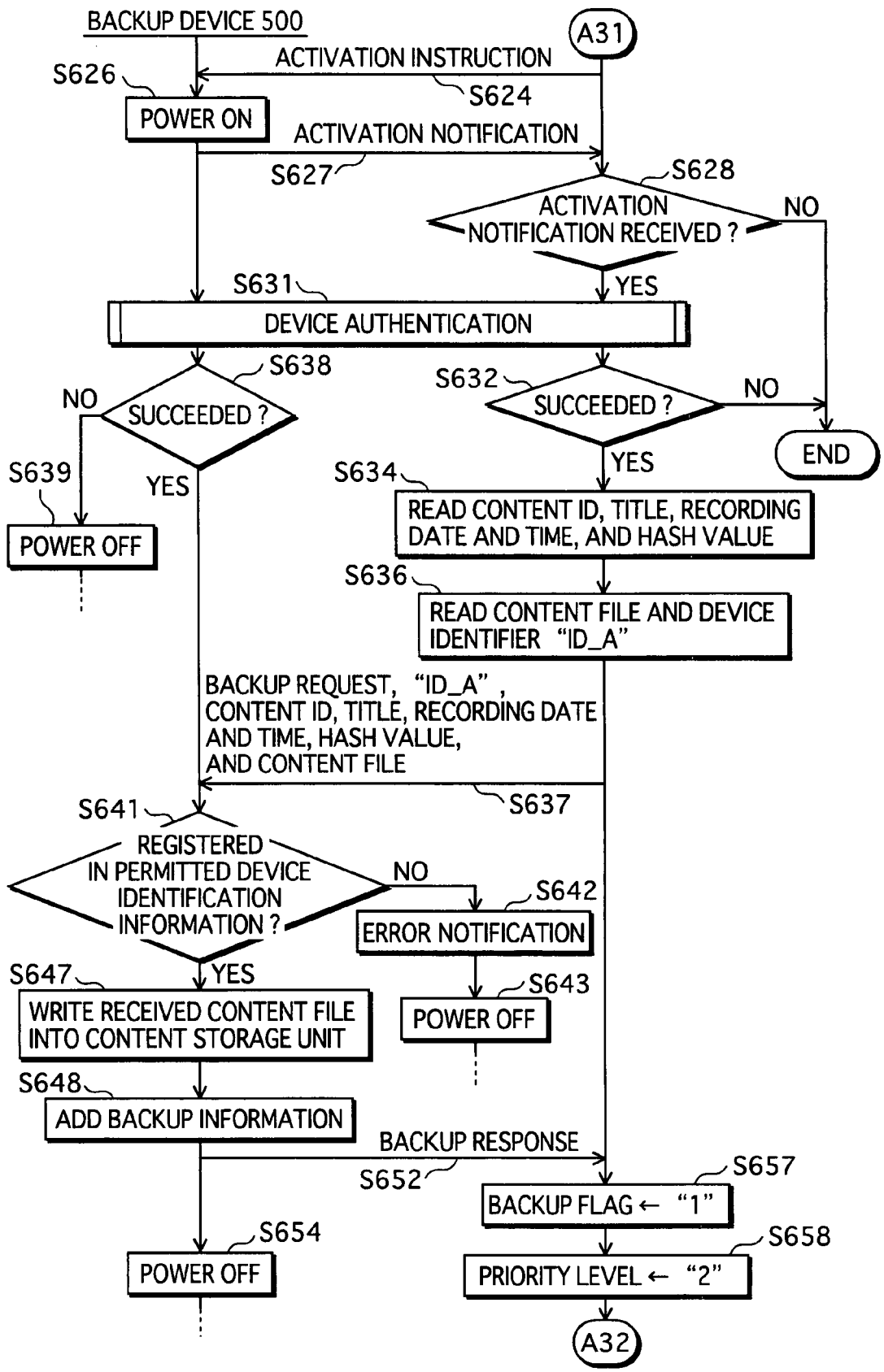
FIG. 30 is a flow chart showing the operations of the backup processing in the backup system.

Operations in the backup processing are described using flow charts shown in FIG. 29 and FIG. 30.

In a state where any one of the content panels 203 to 207 is selected in Steps S101 to S106 described in the first embodiment using FIG. 6, if receiving operation instruction information that shows selection of the Backup button 213, the operation judgment unit 1001 reads content information corresponding to the selected content panel from the secure storage unit 104. The operation judgment unit 1001 reads a content ID included in the content information (Step S621), and transmits a backup instruction including the content ID to the content operation unit 1004.

Moreover, the content operation unit 1004 reads a backup flag included in the content information (Step S622), and judges whether the backup flag has a value of "1" (Step S623).

If the backup flag has a value of "1" (Step S623: YES), a content file corresponding to the content information has been already backed up. Therefore, the content operation unit 1004 ends the backup processing.

If the backup flag has a value of "0" (Step S623: NO), the content operation unit 1004 transmits an activation instruction to the backup device 500 via the transmission/reception unit 115 (Step S624).

The control unit 507 of the backup device 500 receives the activation instruction from the HD recorder 100 via the transmission/reception unit 501, and instructs the power supply unit 503 to start supplying electric power. Upon receiving the start instruction, the power supply unit 503 starts supplying electric power to the units that constitutes the backup device 500 (Step S626).

The control unit 507 transmits an activation notification to the HD recorder 100 via the transmission/reception unit 501 (Step S627).

If not receiving the activation notification from the backup device 500 within a predetermined time period (Step S628: NO), the content operation unit 1004 of the HD recorder 100 ends the backup processing.

If receiving the activation notification within the predetermined time period (Step S628: YES), the content operation unit 1004 instructs the authentication unit 114 to perform device authentication between the HD recorder 100 and the backup device 500.

In accordance with the authentication instruction by the content operation unit 1004, the authentication unit 114 performs device authentication between the HD recorder 100 and the backup device 500 (Step S631). If the device authentication fails (Step S632: NO), the control unit 507 ends the backup processing.

Here, Step S631 is the same as the above-described Steps S501 to S532 in which the HD recorder 400, "Cert_B", "Cha_B", "Sig_B", the random number "b", "Key_b", and "Key_ab" are replaced with the backup device 500, "Cert_C", "Cha_C", "Sig_C", the random number "c", "Key_c", and "Key_ac", respectively.

If the device authentication succeeds (Step S632: YES), the content operation unit 1004 reads a content ID, a title, a recording date and time, and a hash value that are included in the content information (Step S634).

The content operation unit 1004 reads the device identifier 131 "ID_A" from the specific information storage unit 101, and reads a content file including the content ID from the first information storage unit 102 (Step S636).

The content operation unit 1004 transmits a backup request, the read device identifier 131 "ID_A", the content ID, the title, the recording date and time, the hash value, and the content file to the backup device 500 via the transmission/reception unit 115 (Step S637).

If the device authentication between the backup device 500 and the HD recorder 100 fails (Step S638: NO), the control unit 507 instructs the power supply unit 503 to stop supplying electric power. The power supply unit 503 stops supplying electric power to other units except for the transmission/reception unit 501 and the control unit 507 (Step S639).

If the device authentication succeeds (Step S638: YES), the control unit 507 receives the backup request, the device identifier 131 "ID_A", the content ID, the title, the recording date and time, the hash value, and the content file from the HD recorder 100 via the transmission/reception unit 501. The control unit 507 judges whether the received device identifier 131 "ID_A" is registered in the permitted device identification information 551 stored in the secure information storage unit 511 (Step S641). If not registered (Step S641: NO), the control unit 507 transmits an error notification that shows reception of the backup request is impossible to the HD recorder 100 via the transmission/reception unit 501 (Step S642), and stops supplying electric power to each unit that constitutes the backup device 500 (Step S643). Here, upon receiving the error notification, the HD recorder 100 ends the backup processing.

If the received device identifier 131 "ID_A" is registered (Step S641: YES), the control unit 507 writes the received content file into the content storage unit 510 (Step S647).

Next, the control unit 507 generates backup information including the received content ID, title, recording date and time, device identifier 131 "ID_A", and hash value, and adds the generated backup information to the backup management table 521 (Step S648). Here, the received device identifier 131 "ID_A" is set as a backup source device identifier.

The control unit 507 transmits a backup response that shows completion of the backup to the HD recorder 100 via the transmission/reception unit 501 (Step S652). When the transmission has completed, the control unit 507 instructs the power supply unit 503 to stop supplying electric power (Step S654).

The content operation unit 1004 of the HD recorder 100 receives the backup response from the backup device 500 via the transmission/reception unit 115, rewrites the value of the backup flag included in the content information to "1" (Step S657), rewrites a value of a priority level to "2" (Step S658), and ends the backup processing.

(3) Restoration Processing

Figure 31:
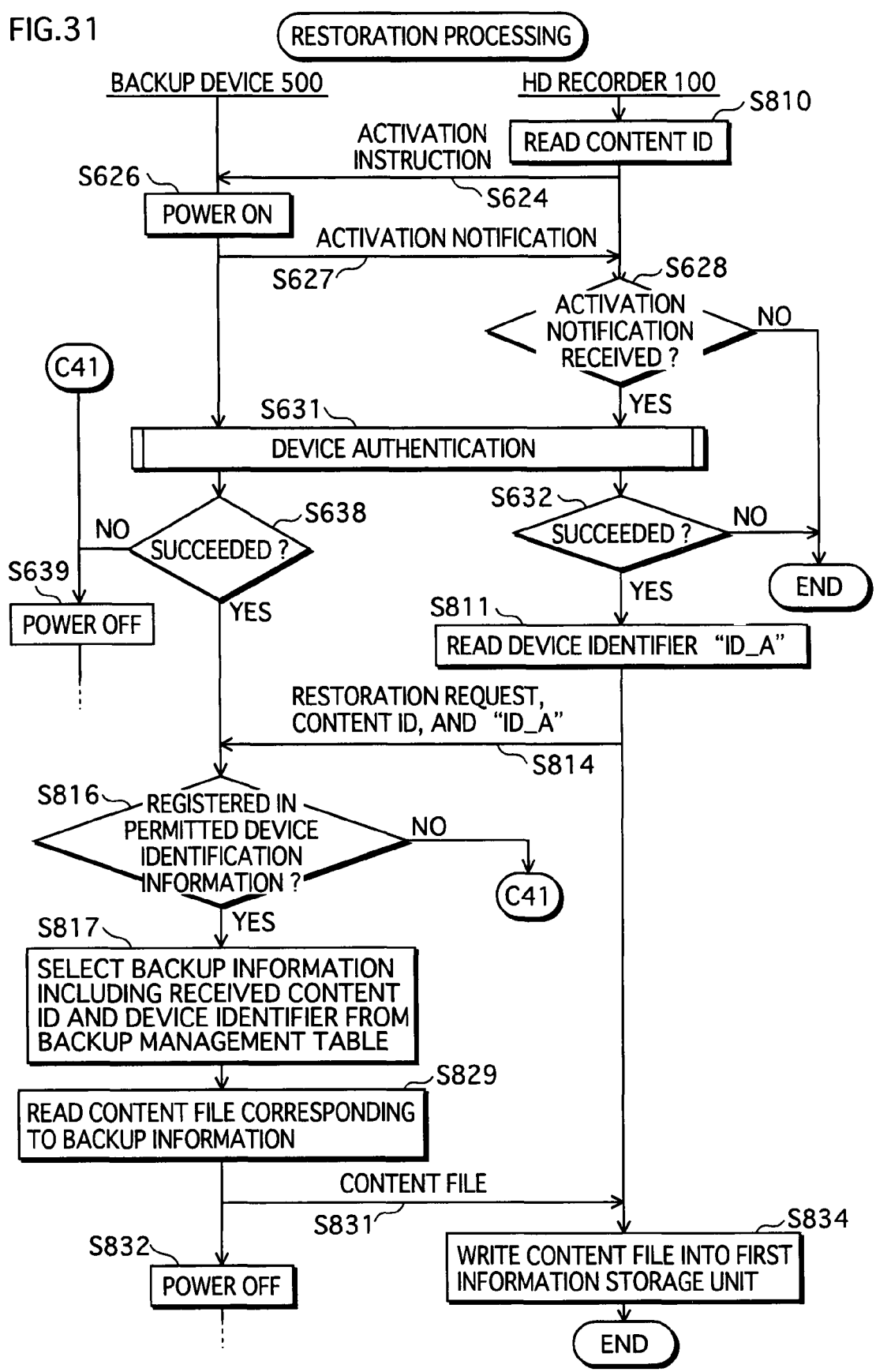
FIG. 31 is a flow chart showing operations of restoration processing in the backup system.

Operations in the restoration processing are described using a flow chart shown in FIG. 31.

In a state where any one of the content panels 203 to 207 is selected in Steps S101 to S106 described in the first embodiment using FIG. 6, if receiving operation instruction information that shows selection of the Restore button 214, the operation judgment unit 1001 reads content information corresponding to the selected content panel from the secure storage unit 104, and a content ID included in the content information (Step S810).

Steps S624 to S639 are the same processing as those above described.

If not receiving an activation notification from the backup device 500 within a predetermined time period via the transmission/reception unit 115 (Step S628: NO), the content operation unit 1004 ends the restoration processing.

If the device authentication succeeds (Step S632: YES), the content operation unit 1004 reads the device identifier 131 "ID_A" from the specific information storage unit 101 (Step S811), and transmits a restoration request, the content ID, and the read device identifier 131 "ID_A" to the backup device 500 via the transmission/reception unit 115 (Step S814).

If the device authentication succeeds (Step S638: YES), the control unit 507 receives the restoration request, the content ID, and the device identifier 131 "ID_A" from the HD recorder 100 via the transmission/reception unit 501. The control unit 507 judges whether the received device identifier 131 "ID_A" is registered in the permitted device identification information 551 stored in the secure information storage unit 511 (Step S816). If not registered (Step S816: NO), the control unit 507 proceeds to Step S639.

If registered (Step S816: YES), the control unit 507 selects backup information, which includes the content ID received from the backup management table 521 stored in the secure information storage unit 511 and a backup source device identifier that is the same as the received device identifier (Step S827).

Next, the control unit 507 detects a content file corresponding to the backup information and including the content ID stored in the content storage unit 510, and reads the detected content file from the content storage unit 510 (Step S829).

Next, the control unit 507 transmits the read content file to the HD recorder 100 via the transmission/reception unit 501 (Step S831). Then, the control unit 507 instructs the power supply unit 503 to stop supplying electric power. The power supply unit 503 receives the stop instruction by the control unit 507, and stops supplying electric power to the units except for the transmission/reception unit 501 and the control unit 507 (Step S832).

The content operation unit 1004 of the HD recorder 100 receives the content file from the backup device 500 via the transmission/reception unit 115. The content operation unit 1004 writes the received content file into the first information storage unit 102 (Step S834).

(4) Deletion Processing

Figure 32:
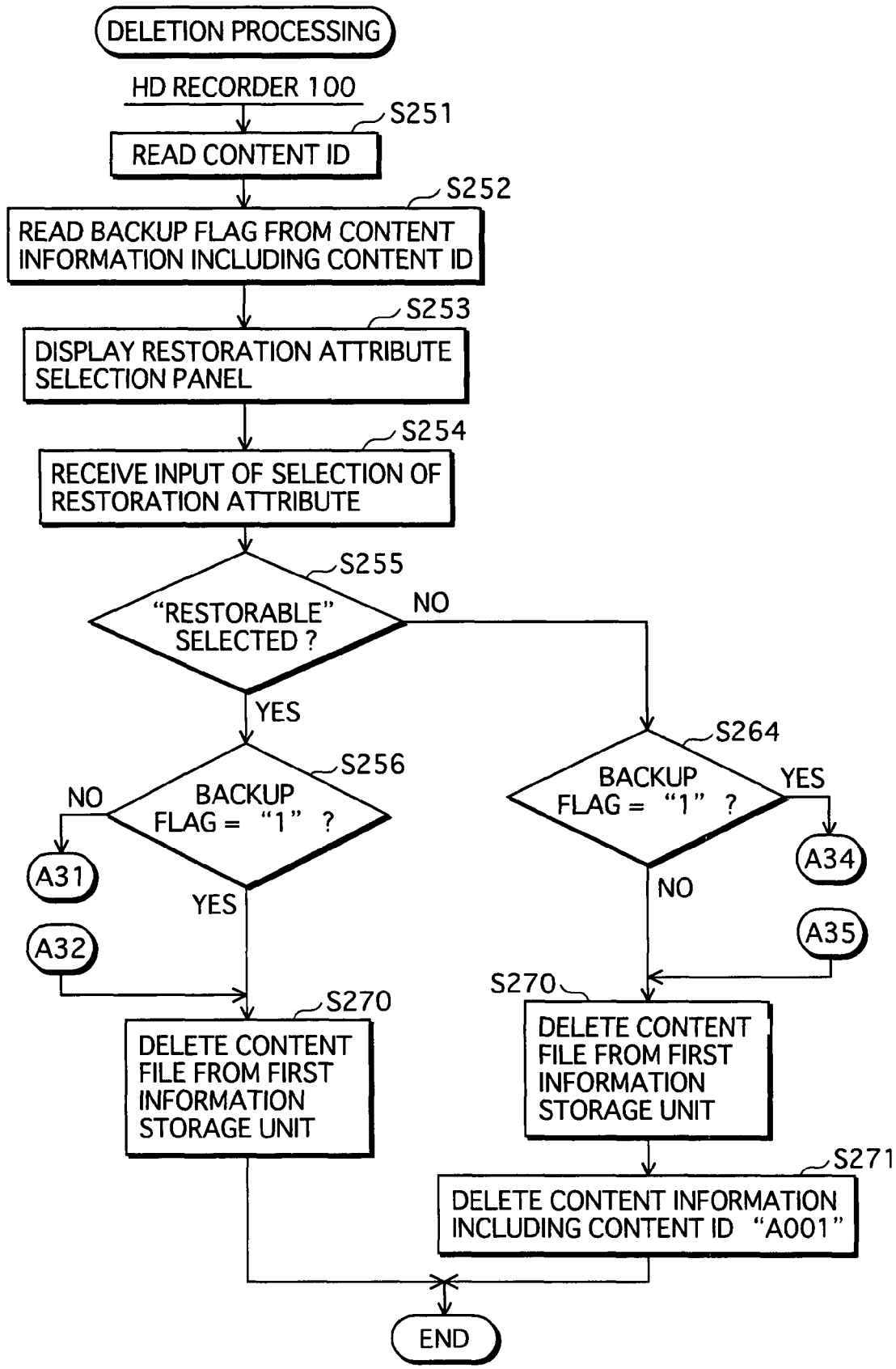
FIG. 32 is a flow chart showing operations of deletion processing in the backup system.
Figure 33:
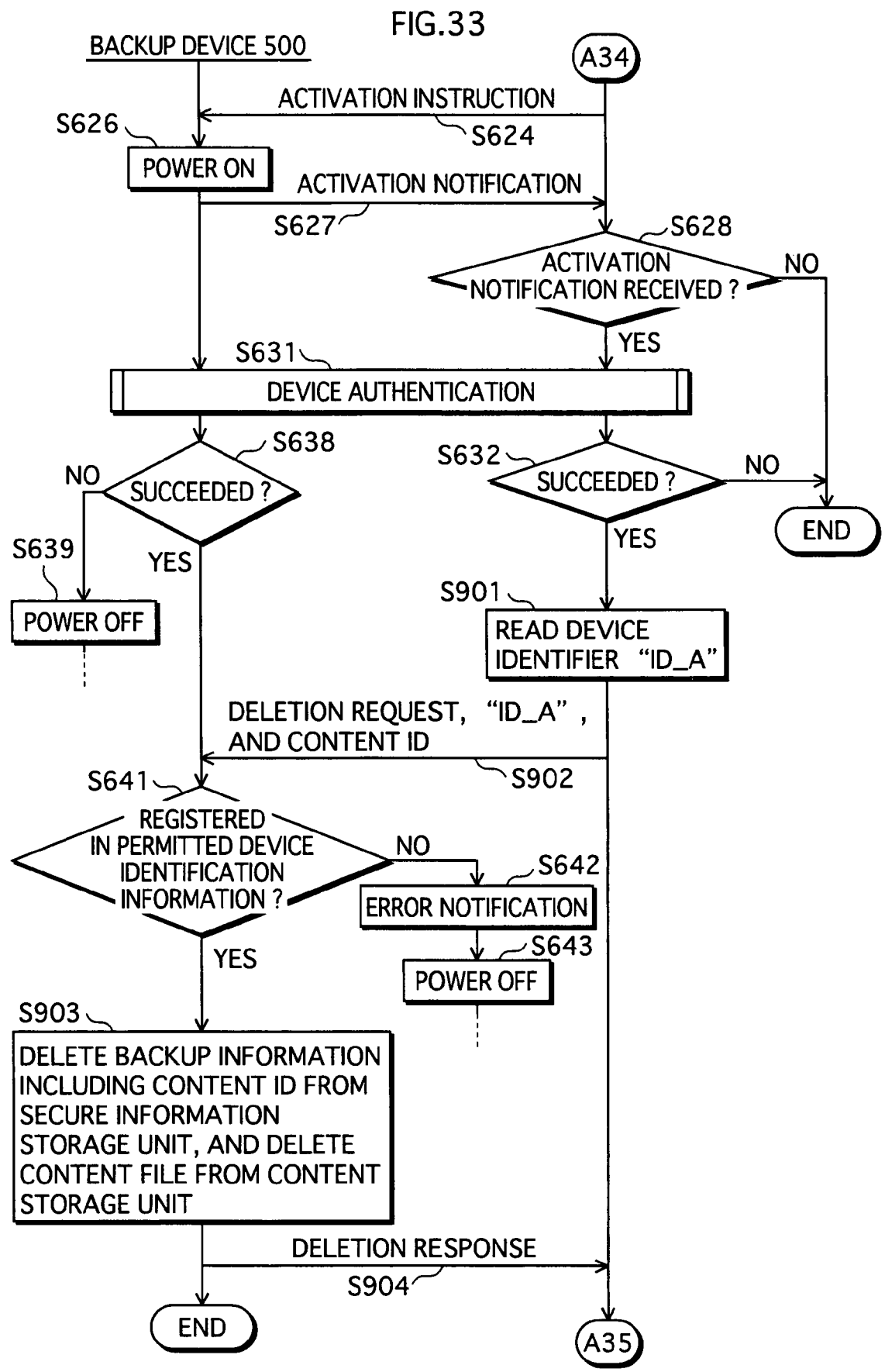
FIG. 33 is a flow chart showing the operations of the deletion processing in the backup system.

Operations in the deletion processing are described using flow charts shown in FIG. 32 and FIG. 33.

Note that processing in Steps S251 to S256, S264, S270, and S271 in FIG. 32 are the same as those in Steps having the same step numbers in FIG. 13 and FIG. 14. Furthermore, in Step S256, if the backup flag does not have a value of "1" (Step S256: NO), the same processing as shown in FIG. 30 is performed.

Moreover, the processing performed in the case where the backup flag has a value of "1" (Step S264: YES) is shown in FIG. 33. Processing in Steps S624 to S639, and S641 to S643 in FIG. 33 are the same as those in Steps having the same step numbers in FIG. 30.

Steps S901 to 904 shown in FIG. 33 are described here.

If the device authentication succeeds (Step S632: YES), the content operation unit 1004 reads the device identifier 131 "ID_A" from the specific information storage unit 101 (Step S901), and transmits a deletion request, the read device identifier 131 "ID_A", and the content ID read in Step S251 to the backup device 500 (Step S902).

If the device authentication between the backup device 100 and the HD recorder 100 succeeds (Step S638: YES), the control unit 507 receives the deletion request, the device identifier 131 "ID_A", and the content ID from the HD recorder 100 via the transmission/reception unit 501. The control unit 507 judges whether the received device identifier 131 "ID_A" is registered in the permitted device identification information 551 stored in the secure information storage unit 511 (Step S641).

If the received identifier is registered (Step S641: YES), the control unit 507 deletes a content file, which corresponds to backup information including the content ID and a backup source device identifier that is the same as the received device identifier and includes the content ID, and deletes the backup information from the backup management table 521 (Step S903).

When the deletion in Step S903 has completed, the control unit 507 transmits a deletion response to the HD recorder 100 via the transmission/reception unit 501 (Step S904).

The content operation unit 1004 of the HD recorder 100 receives the deletion response via the transmission/reception unit 115, and performs processing subsequent to Step S270.

(5) Move Processing

Figure 34:
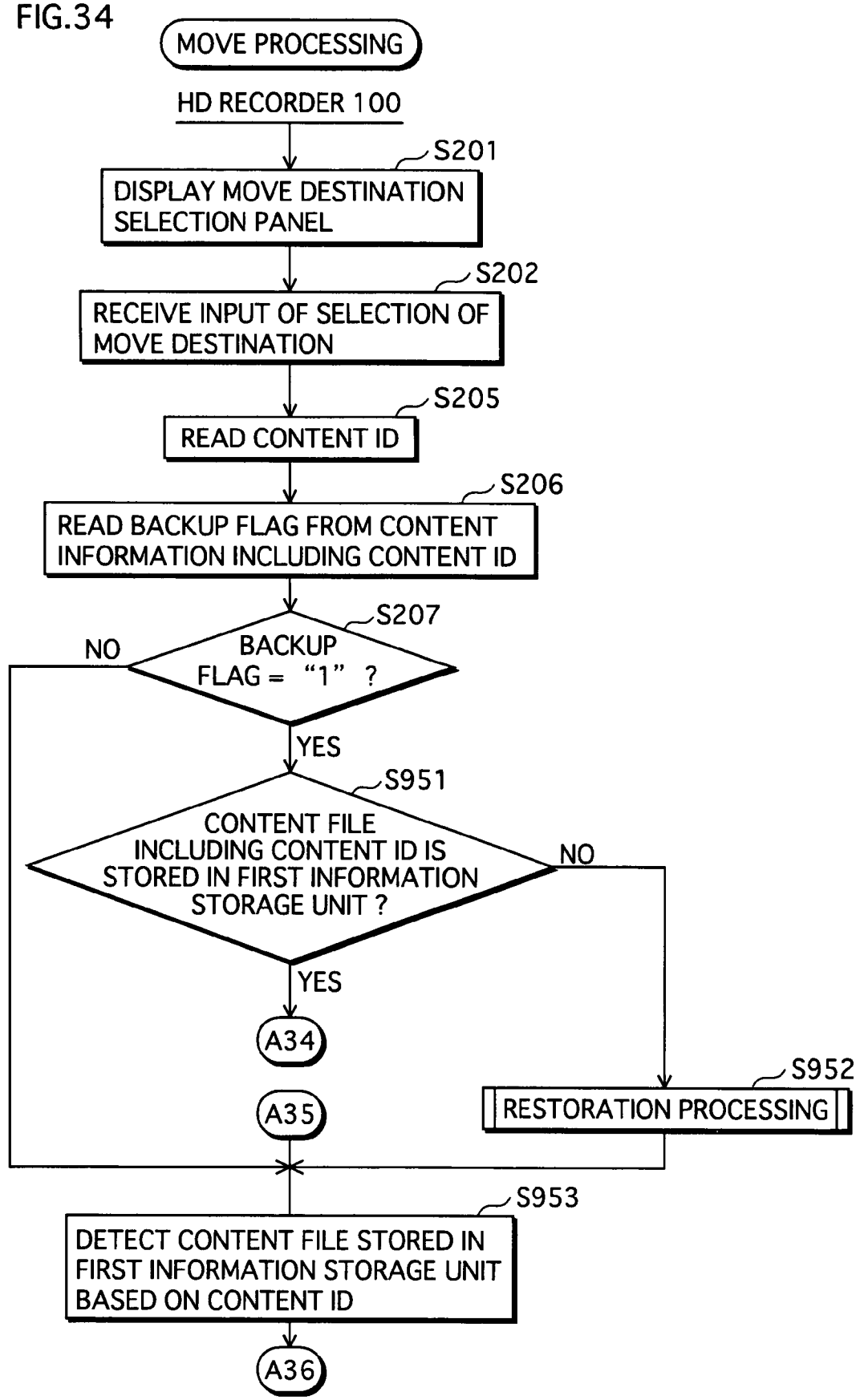
FIG. 34 is a flow chart showing operations of move processing in the backup system.
Figure 35:
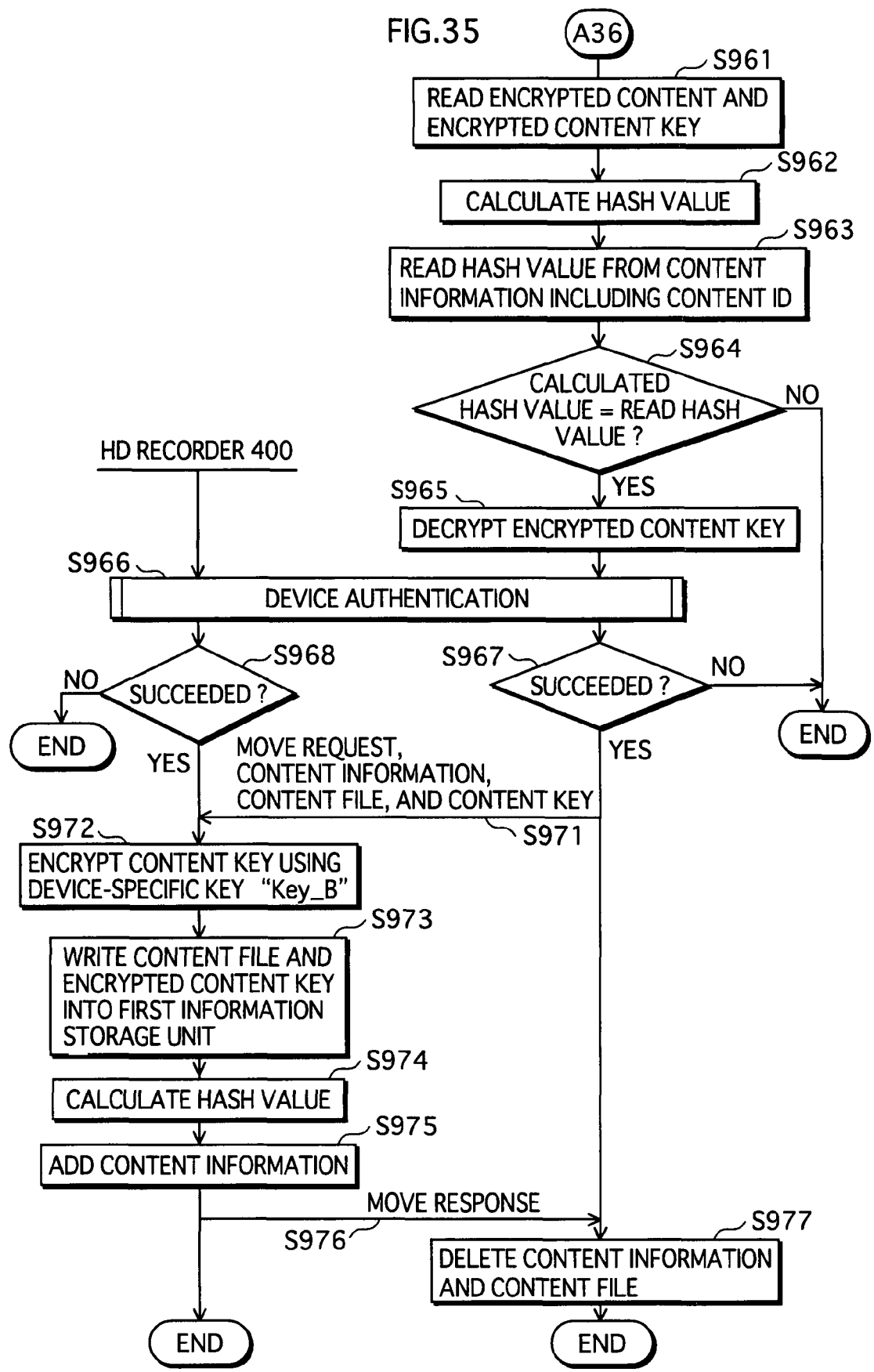
FIG. 35 is a flow chart showing the operations of the move processing in the backup system.

Operations in the move processing are described using flow charts shown in FIG. 34 and FIG. 35.

Steps S201 to S207 in FIG. 34 are the same as those described in FIG. 10.

If the backup flag has a value of "1" (Step S207: YES), the content operation unit 1004 detects whether a content file including the selected content ID is stored in the first information storage unit 102 (Step S951).

If the content file is not stored (Step S951: NO), the content operation unit 1004 performs restoration processing (Step S952).

The restoration processing in Step S952 is the same as that described using FIG. 31.

If the content file is stored (Step S951: YES), the content operation unit 1004 performs the deletion processing described using FIG. 33 (Steps S624 to S904).

By performing the above-described processing, the content file gets stored in only the first information storage unit 102.

The content operation unit 1004 detects the content file including the content ID from the first information storage unit 102 (Step S953).

The content operation unit 1004 reads an encrypted content and an encrypted content key that are included in the detected content file (Step S961), and transmits the encrypted content, the encrypted content key, and the content ID to the hash calculation unit 1013.

The hash calculation unit 1013 receives the encrypted content and the encrypted content key, combines the encrypted content and the encrypted content key, and assigns the combination to the hash function to calculate a hash value (Step S962). The hash calculation unit 1013 transmits the content ID and the hash value to the hash comparison unit 1014.

The hash comparison unit 1014 reads the hash value from the content information 181 including the content ID (Step S963), and compares the received hash value with the read hash value (Step S964), and transmits a comparison result that shows whether the two hash values match each other to the content operation unit 1004.

If the comparison result shows that the values do not match each other (Step S5964: NO), the content operation unit 1004 ends the move processing.

If the comparison result shows that the values match each other (Step S964: YES), the content operation unit 1004 reads the device-specific key 132 "Key_A" from the specific information storage unit 101, outputs the encrypted content key and the read device-specific key 132 "Key_A" to the encryption processing unit 109, and instructs the encryption processing unit 109 to decrypt the encrypted content key.

The encryption processing unit 109 receives the encrypted content key and the device-specific key 132 "Key_A" from the content operation unit 1004, decrypts the encrypted content key using the received device-specific key 132 "Key_A" to generate a content key, and outputs the generated content key to the content operation unit 1004 (Step S965).

The content operation unit 1004 instructs the authentication unit 114 to perform device authentication between the HD recorder and the HD recorder 400.

The authentication unit 114 performs device authentication between the HD recorder 100 and the HD recorder 400 (Step S966).

The device authentication in Step S966 is the same as those described using FIG. 21 and FIG. 22.

If the device authentication performed by the authentication unit 114 fails (Step S967: NO), the content operation unit 1004 ends the move processing.

If the device authentication succeeds (Step S967: YES), the content operation unit 1004 instructs the transmission/reception unit 115 to transmit a move request to the HD recorder 400 together with a content key, content information, and content file that each correspond to the selected content ID.

The transmission/reception unit 115 transmits the move request and the decrypted content key, the content information, and the content file to the HD recorder 400 (Step S971).

The HD recorder 400 receives the move request and the content key, the content information, and the content file that each correspond to the selected content ID from the HD recorder 100.

The following Steps S972 to S975 are performed within the HD recorder 400.

The content operation unit 1004 of the HD recorder 400 reads the device-specific key 132 "Key_B" from the specific information storage unit 101, and transmits the received content key and the device-specific key 132 "Key_B" to the encryption processing unit 109, and instructs the encryption processing unit 109 to encrypt the content key.

Upon receiving the encryption instruction by the content operation unit 1004, the encryption processing unit 109 encrypts the content key using the received device-specific key 132 "Key_B" to generate an encrypted content key, and outputs the generated encrypted content key to the content operation unit 1004 (Step S972).

The content operation unit 1004 writes the received content file into the first information storage unit 102, and rewrites the encrypted content key included in the written content file to the generated encrypted content key (Step S973).

The content operation unit 1004 transmits the encrypted content, the encrypted content key, and the content ID that are included in the content file to the hash calculation unit 1013. The hash calculation unit 1013 combines the encrypted content and the encrypted content key, assigns the combination to the hash function to calculate a hash value (Step S974), and transmits the calculated hash value to the hash writing unit 1012 together with the content ID.

The hash writing unit 1012 rewrites the hash value included in the content information including the content ID to the hash value received from the hash calculation unit 1013, and then writes the written hash value into the secure storage unit 104 (Step S975).

The content operation unit 1004 instructs the transmission/reception unit 115 to transmit a move response.

The transmission/reception unit 115 transmits the move response to the HD recorder 100 (Step S976).

The HD recorder 100 receives the move response, deletes the transmitted content information from the secure storage unit 104 of the HD recorder 100 together with the move request, deletes the content file from the first information storage unit 102 of the HD recorder 100 (Step S977), and ends the move processing.

<Supplementary Description>

While the present invention has been described based on the above embodiments, the present invention is not limited to the above embodiments. Various modifications may be made in a range that does not deviate from the scope of the present invention. The present invention also includes the following cases.

(a) In a state where a content file is not stored in a backup source device and a backup of the content file is stored in only the backup device 500, move (backup transfer) may be realized by transferring a proprietary right of the backup of the content without actually moving the backup of the content file.

Figure 36:
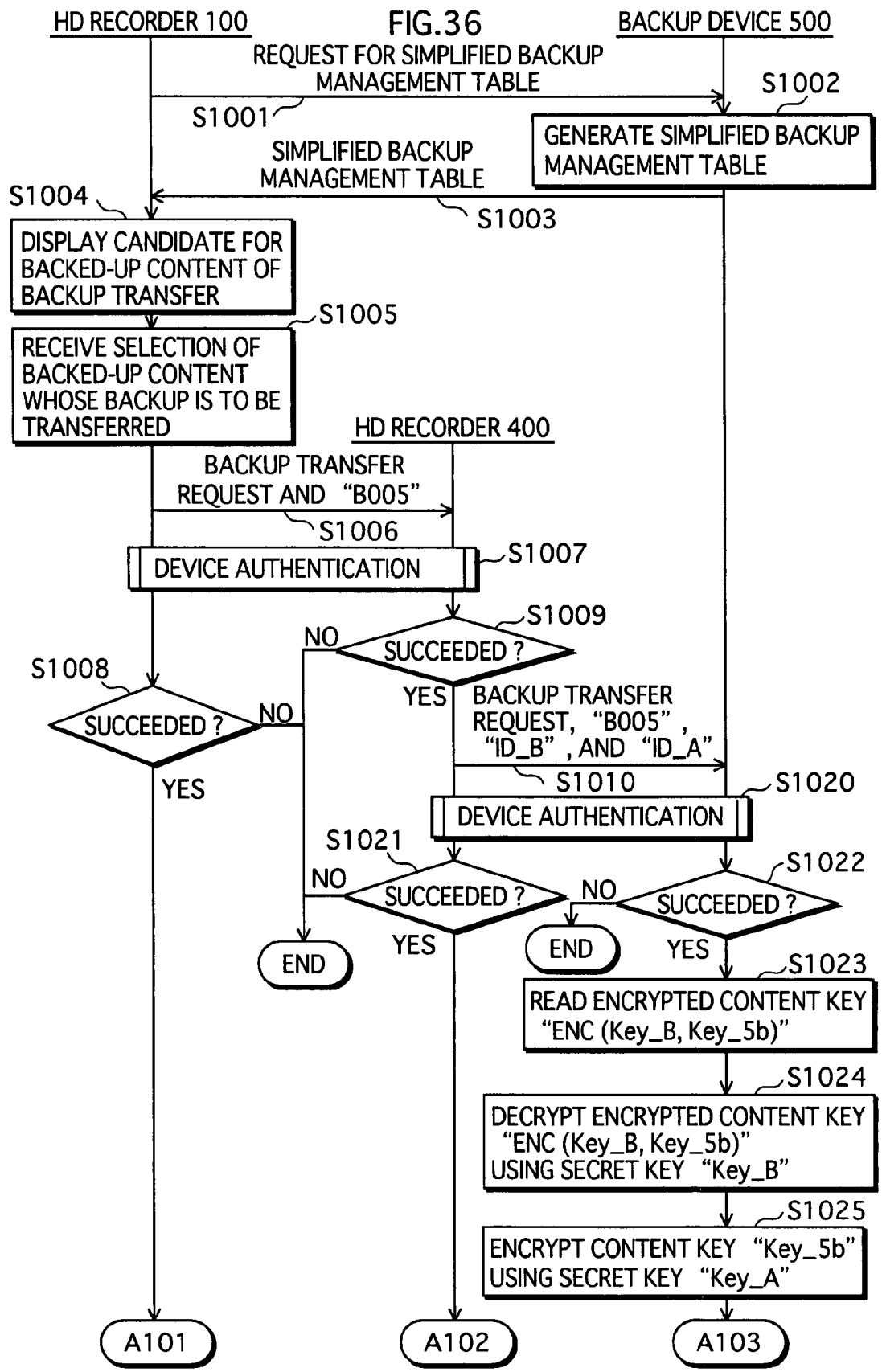
FIG. 36 is a flow chart showing operations of move processing where only backup is performed.
Figure 37:
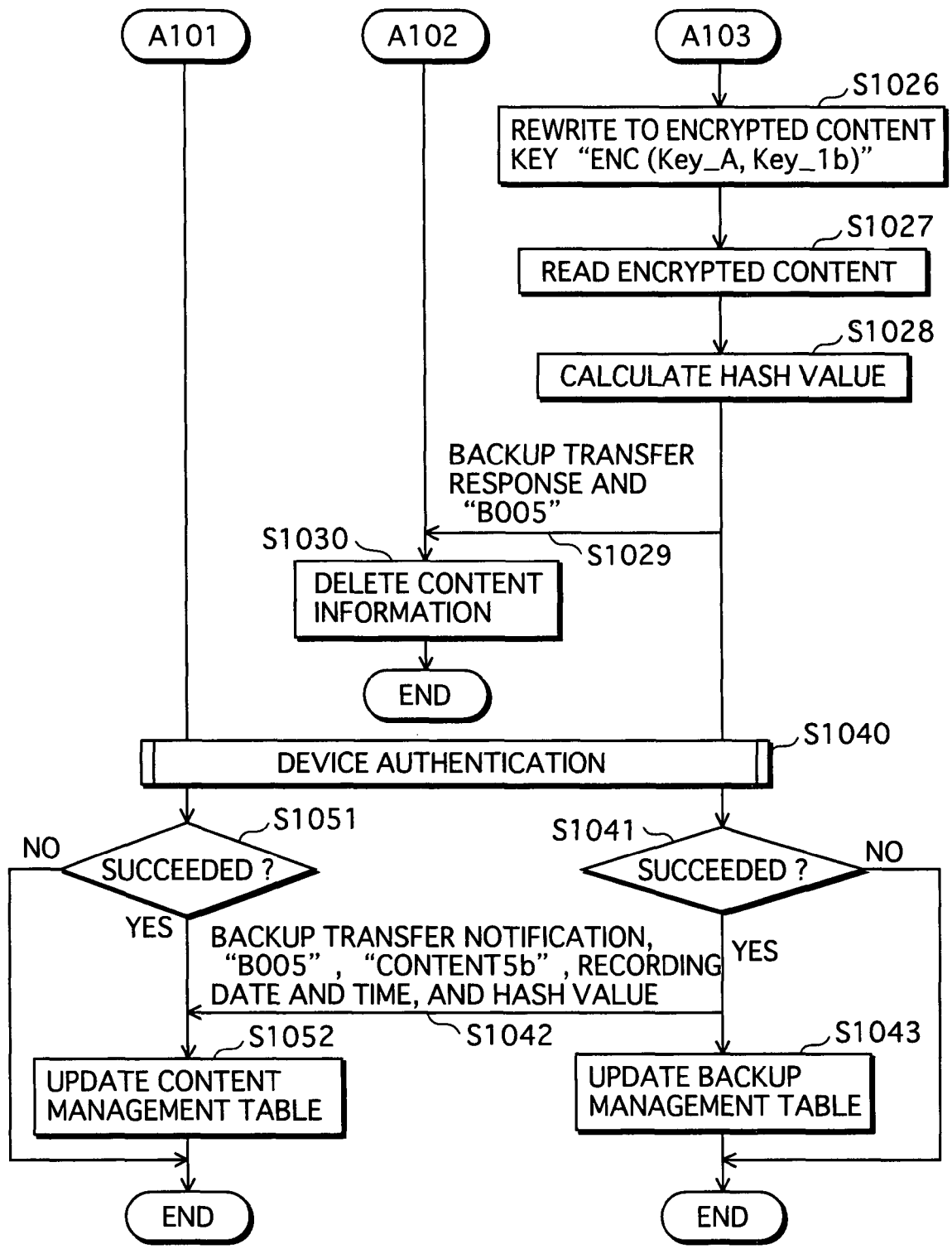
FIG. 37 is a flow chart showing the operations of the move processing where only backup is performed.

For example, the following case is described using FIG. 36, FIG. 37, and FIG. 38. In the second embodiment, the backup device 500 stores the content file 539 whose backup source device is the HD recorder 400. If the HD recorder 400 does not store a content file that is the same as the content file 539, backup transfer is performed on the content file 539 is transferred to the HD recorder 100.

The control unit 113 of the HD recorder 100 transmits a request for a simplified backup management table to the backup device 500 via the transmission/reception unit 115 (Step s1001).

Upon receiving the request for the simplified backup management table via the transmission/reception unit 501, the control unit 507 of the backup device 500 reads the backup management table 521 stored in the secure information storage unit 511, and removes the hash values from the backup management table 521 to generate a simplified backup management table 601 as shown in FIG. 38 (Step S1002).

The simplified backup management table 601 includes pieces of simplified backup information 602, 603, 604, and 605.

The control unit 507 transmits the simplified backup management table 601 to the HD recorder 100 via the transmission/reception unit 501.

The control unit 113 of the HD recorder 100 receives the simplified backup management table 601 via the transmission/reception unit 115, and searches the simplified backup management table 601 for simplified backup information having a backup source device identifier that indicates other device.

With respect to the HD recorder 100, the simplified backup information having a backup source device identifier that indicates other device is the simplified backup information 604 having a backup source device identifier "ID_B" included in the simplified backup management table 601 shown in FIG. 38.

The HD recorder, 100 generates a backup transfer selection panel that includes all pieces of the simplified backup information each having a backup source device identifier indicates other device, and outputs the generated backup transfer selection panel to the playback control unit 112 (Step S1004).

The playback control unit 112 receives the backup transfer selection panel, and displays the received backup transfer selection panel on the monitor 120.

When the backup transfer selection panel is displayed, displays corresponding to the piece of the simplified backup information searched for are shown on the monitor 120, such as "content ID "B005", title "Content5$b$" ", in accordance with the number of pieces of the simplified backup information searched for. The user can select a content targeted for backup transfer among contents displayed on the backup transfer selection panel.

The user operates to select a content targeted for backup transfer. The control unit 113 receives operation instruction information that shows the content on which backup transfer is to be performed.

The control unit 113 transmits a backup transfer request and the content ID "B005", to the HD recorder 400 indicated by the backup transfer source device identifier "ID_B" included by the simplified backup information (Step S1006).

Device authentication is performed between the HD recorder 100 and the HD recorder 400 (Step S1007).

If the device authentication fails (Step S1008: NO), the HD recorder 100 ends the backup transfer processing. If the device authentication fails (Step S1009: NO), the HD recorder 400 ends the backup transfer processing.

If the device authentication succeeds (Step S1009: YES), the control unit 113 of the HD recorder 400 transmits the backup transfer request, the content ID "B005", a backup transfer source device identifier "ID_B", a backup transfer destination device identifier "ID_A" to the backup device 500 via the transmission/reception unit 115 (Step S1010).

Device authentication is performed between the HD recorder 400 and the backup device 500 (Step S1020).

If the device authentication fails (Step S1021: NO), the HD recorder 400 ends the backup transfer processing. If the device authentication fails (Step S1022: NO), the backup device 500 ends the backup transfer processing.

If the device authentication succeeds (Step S1022: YES), the control unit 507 of the backup device 500 reads an encrypted content key "ENC (Key_B, Key_5$b$)" from the content storage unit 510 (Step S1023).

Here, the device-specific key 132 "Key_A" stored in the specific information storage unit 101 of the HD recorder 100 is a secret key. A ciphertext generated by encrypting a plaintext using the device-specific key 132 "Key_A" can be decrypted using the device-specific key 132 "Key_A".

Moreover, the device-specific key 132 "Key_B" stored in the specific information storage unit 101 of the HD recorder 400 is a secret key. A ciphertext generated by encrypting a plaintext using the device-specific key 132 "Key_B" can be decrypted using the device-specific key 132 "Key_B".

The backup device 500 stores beforehand the device-specific keys 132 "Key_A" and "Key_B" in the secure information storage unit 511.

The control unit 507 transmits the encrypted content key "ENC (Key_B, Key_5b)" and the device-specific key 132 "Key_B" to the encryption processing unit 509, and instructs the encryption processing unit 509 to decrypt the encrypted content key "ENC (Key_B, Key_5b)". The encryption processing unit 509 decrypts the encrypted content key "ENC (Key_B, Key_5b)" using the device-specific key 132 "Key_B" (Step S1024), and transmits a content key "Key_5b" that is a result of the decryption to the control unit 507.

The control unit 507 receives the content key "Key_5b" from the encryption processing unit 509, transmits the secret key "Key_A" and the received content key "Key_5b" to the encryption processing unit 509, and instructs the encryption processing unit 509 to encrypt the content key "Key_5b".

The encryption processing unit 509 encrypts the content key "Key_5b" using the secret key "Key_A", and transmits an encrypted content key "ENC (Key_A, Key_5b)" that is a result of the encryption to the control unit 507 (Step S1025).

The control unit 507 rewrites the encrypted content key 543 "ENC (Key_B, Key_5b)" included in the content file 539 including the content ID "B005" to the encrypted content key "ENC (Key_A, Key_5b)" (Step S1026).

The control unit 507 reads the encrypted content 542 from the content file 539 (Step S1027), and calculates a hash value using the encrypted content key "ENC (Key_A, Key_5b)" and the encrypted content 542 "ENC (Key_5b, Conten_5b)" (Step S1028).

The control unit 507 transmits a backup transfer response and the content ID "B005" to the HD recorder 400 that is the backup transfer source device via the transmission/reception unit 501.

The control unit 113 of the HD recorder 400 receives the backup transfer response and the content ID "B005" via the transmission/reception unit 115, deletes the content information including the content ID "B005" from the secure storage unit 104 of the HD recorder 400 (Step S1030), and ends the backup transfer processing.

The control unit 507 of the backup device 500 instructs the authentication unit 502 to perform device authentication between the backup device 500 and the HD recorder 100 that is the backup transfer destination device.

Device authentication is performed between the backup device 500 and the HD recorder 100 (Step S1040).

If the device authentication fails (Step S1051: NO), the HD recorder 100 ends the backup transfer processing. If the device authentication fails (Step S1041: NO), the backup device 500 ends the backup transfer processing.

If the device authentication succeeds (Step S1041: YES), the control unit 507 of the backup device 500 transmits a backup transfer notification, the content ID "B005", the title "Content5b", a recording date and time, and the calculated hash value to the HD recorder 100 (Step S1042).

The backup device 500 rewrites the backup source device identifier included in the backup information 524 including the content ID "B005" in the backup management table 521 from "ID_B" to "ID_A" (Step S1043), and ends the backup transfer processing.

The HD recorder 100 receives the backup transfer notification, the content ID "B005", the title "Content5b", the recording date and time, and the calculated hash value, and generates content information including the received content ID "B005", title "Content5b", recording date and time, and calculated hash value. The HD recorder 100 sets a value of a backup flag of the generated content information as "1", adds the content information to the content management table 180 stored in the secure storage unit 104 (Step S1052), and ends the backup transfer processing.

As have been described, backup transfer can be performed without actually moving a content from a transfer source device to a transfer destination device.

(b) Each device may hold a public key of other device.

For example, the HD recorder 100 holds a public key of the HD recorder 400 beforehand. The HD recorder 100 decrypts an encrypted content key stored in the backup device 500 using a device-specific key of the HD recorder 100 to generate a content key, and re-encrypts the content key using the public key of the HD recorder 400 to generate a re-encrypted content key.

The HD recorder 100 transmits the re-encrypted content key to the backup device 500, and instructs the backup device 500 to rewrite the encrypted content key held in the backup device 500 to the re-encrypted key.

The HD recorder 100 deletes content information corresponding to the encrypted content key from the secure storage unit 104.

The HD recorder 400 decrypts the re-encrypted key stored in the backup device 500 using the device-specific key of the backup device 500 corresponding to the public key to acquire a content key.

The HD recorder 400 can decrypt an encrypted content corresponding to the content key using the content key.

(c) In the first and second embodiments, the control units of the HD recorders each combine an encrypted content and an encrypted content key, and assign the combination to the hash function to calculate a hash value. Without limiting to this, the hash value may be calculated by assigning only an encrypted content key to the hash function. Or, the hash value may be calculated by assigning only an encrypted content to the hash function. Or, the hash value may be calculated by assigning only a content key to the hash function.

(d) The key generation unit 108 may use other methods for generating content keys.

(e) The recording medium from/to which information is read/written by the input/output unit 111 is not limited to the DVD. Without limiting to this, other recording media, such as memory cards, CDs, BDs, and videotapes may be employed.

(f) The following may be employed. Each of contents has a backup permission flag attached thereto, which shows whether backing up of the content is permitted. If receiving operation instruction information that shows backing up of a content, the control unit 113 reads a backup permission flag attached to the content. Only if the backup permission flag shows that backing up of the content is permitted, the control unit 113 backs up the content.

(g) The second information storage unit 103 in the first embodiment and the content storage unit 510 in the second embodiment have been described to be structured with an HDD. Without limiting to this, these units each may be structured with a writable optical disk drive and an optical disk. Moreover, the optical disk drive may be a disk changeable optical disk drive.

(h) The second information storage unit 103 in the first embodiment and the content storage unit 510 in the second embodiment have been described to be included in the HD recorder 100 and the backup device 500, respectively. Without limiting to this, the second information storage unit 103 and the content storage unit 510 respectively may be externally connected with the HD recorder 100 and the backup device 500 via a digital interface.

(i) In (3) Control of Move Processing described in the first embodiment, the control unit 113 generates the connection request panel 221. Without limiting to this, a "force execution button" may be further arranged in the connection request panel 221. In this case, the control unit 113 outputs the connection request panel 221 having the "force execution button" arranged therein to the playback control unit 112, and instructs the playback control unit 112 to display the connection request panel 221.

In accordance with the instruction by the control unit 113, the playback control unit 112 displays the connection request panel 221 having the "force execution button" arranged therein, on the monitor 120.

If the second information storage unit 103 cannot be connected due to a good reason such as breakage, the user operates the buttons and the remote controller to select and press the force execution button.

By the user's operation, the control unit 113 receives operation instruction information that shows force execution from the input unit 110, and performs move processing on a content except for processing relating to the second information storage unit 103 even if judged that the second information storage unit 103 is not connected.

In this case, although the content remains in the second information storage unit 103, content information corresponding to the content that has been moved is deleted, and therefore the content cannot be played back. The content is substantially invalidated, and therefore the content is prevented from being maliciously used.

(j) In the first and second embodiments, the network communication between the devices has been described using an example of connection of the network in accordance with the DTCP. The DTCP does not necessarily need to be used, and other copyright protection systems may be used for the network connection and so on.

Moreover, the backup device 500 has been described to securely stores, in the secure information storage unit 511, a hash value generated based on a content. Without limiting to this, the backup device 500 may not have a secure function for storing the hash value, and only a backup source device of the content corresponding to the hash value may store the hash value.

(k) In the first and second embodiments, simultaneously with writing a received content to the first information storage unit 102, the content operation unit 1004 monitors whether an available capacity of the first information storage unit 102 is sufficient. If the available capacity is insufficient, the content operation unit 1004 deletes a content file including a priority level having a "2" from the first information storage unit 102 so as to make the available capacity. However, as long as the available capacity is made, the present invention is not limited to this structure.

For example, the following may be employed. Before writing a content file, the content operation unit 1004 estimates a size of the content file to be written, and judges whether an available capacity of the first information storage unit 102 will become insufficient if writing the content file. If judged to become insufficient, the content operation unit 1004 deletes a content file including a priority level having a value of "2" from the first information storage unit 102.

(l) In (3) Control of Move Processing in the first embodiment, if the authentication by the authentication unit 114 fails, the content operation unit 1004 ends the move processing. Without limiting to this, whether the move processing is permitted to be performed may be judged using other methods.

For example, the following may be employed. Move control information showing whether move processing is permitted to be performed is added to each piece of content information. Before the authentication unit 114 performs authentication processing, the content operation unit 1004 reads move control information from a piece of content information corresponding to a content file that is a target for judgment on permission of move processing, and judges whether the read move control information shows that move processing is permitted to be performed. If judged to indicate that move processing is permitted to be performed, the content operation unit 1004 continues the subsequent processing. If not judged to indicate that move processing is permitted to be performed, the content operation unit 1004 ends the processing.

(m) In the move processing, the transmission/reception unit 115 is instructed to transmit contents that have been decoded by the decoding unit 107. The present invention is not limited to this.

For example, in the move processing, encrypted content keys are decrypted, and then are transmitted. However, encrypted contents may be transmitted without being decrypted.

(n) When a content is not stored in the first information storage unit 102 and a backup of the content file is not stored in the second information storage unit 103, if an abnormal situation occurs, for example, content information relating to the content file is included in the content management table 180, the HD recorder 100 may display a message such as "This content has not been backed up. Restoration is impossible". Also, the HD recorder 100 may delete the content information relating to the content file in which an error occurs in order to address the error.

Also, a backup flag that has a value of "0" at a time when content has not been selected may not be listed on the content management table 180.

(o) The hash calculation unit 1013 combines a read encrypted content and encrypted content key, and assigns the combination to the hash function. However, without limiting to this, part of data may be assigned to the hash function.

For example, the hash calculation unit 1013 may combine part of an encrypted content and an encrypted content key, and assign the combination to the hash function.

(p) Each of the above devices is specifically a computer system composed of a microprocessor, a ROM, a RAM, a hard disk unit, a display unit, a keyboard, a mouse, and the like. A computer program is stored in the RAM or the hard disk unit. Functions of each of the devices are achieved by the microprocessor operating in accordance with the computer program. Here, the computer program is composed of a plurality of command codes that show instructions to the computer, in order to achieve predetermined functions.

(q) All or part of compositional elements of each of the above devices may be composed of one system LSI (Large Scale Integration). The system LSI is a super-multifunctional LSI manufactured by integrating a plurality of compositional units on one chip, and is specifically a computer system composed of a microprocessor, a ROM, a RAM, and the like. A computer program is stored in the RAM. Functions of the system LSI are achieved by the microprocessor operating in accordance with the computer program.

(r) All or part of the compositional elements of each of the above devices may be composed of a removable IC card or a single module. The IC card or the single module is a computer system composed of a microprocessor, a ROM, a RAM, and the like. The IC card or the module may include the above-described super-multifunctional LSI. Functions of the IC card or the module are achieved by the microprocessor operating in accordance with the computer program. The IC card or the module may be tamper-resistant.

(s) The present invention may be the above methods. Also, the present invention may be a computer program that realizes the methods by a computer, or a digital signal composed of the computer program.

Furthermore, the present invention may be a computer-readable storage medium such as a flexible disk, a hard disk, a CD-ROM (Compact Disk Read Only Memory), an MO (Magneto-Optical), a DVD (Digital Versatile Disk), a DVD-ROM (Digital Versatile Disk Read Only Memory), a DVD-RAM (Digital Versatile Disk Random Access Memory), a BD (Blu-ray Disc), and a semiconductor memory, which stores the computer program or the digital signal. Furthermore, the present invention may be the computer program or the digital signal stored in the storage medium.

Furthermore, the present invention may be the computer program or the digital signal transmitted via an electric communication network, a wireless or wired communication network, a network such as Internet, data broadcasting, and the like.

Furthermore, the present invention may be a computer system that includes a microprocessor and a memory, the memory storing the computer program, and the microprocessor operating in accordance with the computer program.

Furthermore, the program or the digital signal may be executed by other independent computer system, by transferring the program or the digital signal to the recording medium, or by transferring the program or the digital signal via a network or the like.

(t) The system LSI may be manufactured by separately integrating the plurality of compositional units into one chip, or by integrating the plurality of compositional units into one chip including all or part of the functions.

Here, the LSI may be called an IC, a system LSI, a super LSI, and an ultra LSI, depending on integration degree.

Also, a method of forming integrated circuits is not limited to LSIs, and may be realized using a dedicated circuit or a general-purpose processor. Furthermore, the following may be used: an FPGA (Field Programmable Gate Array) programmable after manufacturing LSIs; and a reconfigurable processor in which connection and setting of the circuit cell inside an LSI can be reconfigured.

Furthermore, when new technology for forming integrated circuits that replaces LSIs becomes available as a result of progress in semiconductor technology or semiconductor-derived technologies, functional blocks may be integrated using such technology. One possibility lies in adaptation of biotechnology.

(u) The present invention may be any combination of the above-described embodiment and modifications.

INDUSTRIAL APPLICABILITY

The present invention can be continuously and repeatedly used in an industry that creates, distributes, broadcasts, and uses digital contents, and in an industry that manufactures and sells devices for creating contents, devices for distributing contents, and various types of electric devices for playing back and editing contents.

The invention claimed is:
1. A backup system comprising:
  a recording/playback device storing and playing back a content; and
  a backup device managing a backup of the content and storing the backup of the content,
  wherein the recording/playback device includes:
    a storage hardware unit that stores the content;
    a secure storage hardware unit that stores playback right information showing a right to play back the content only when the content is stored in the storage hardware unit;
    an acquisition hardware unit that acquires an instruction to delete the content so as to be restorable; and
    a deletion hardware unit that keeps, when the instruction to delete the content so as to be restorable is acquired, the playback right information stored in the secure storage hardware unit, that keeps the backup stored in the backup device, and that deletes the content from the recording/playback device,
  wherein the backup includes:
    an encrypted work generated by encrypting a digital work using an encryption key; and
    an encrypted key generated by encrypting the encryption key using a specific key that is specific to the recording/playback device,
  wherein the backup system further comprises a request device,
  wherein the request device stores a secret key for decrypting the encryption key encrypted using a public key, and transmits a transfer request of the backup to the recording/playback device,
  wherein the recording/playback device further includes:
    a transfer request receiving hardware unit that receives the transfer request from the request device;
    an encrypted key request hardware unit that transmits, when the transfer request is received, a transmission request of the encrypted key included in the backup to the backup device;
    an encrypted key receiving hardware unit that receives the encrypted key, as a response to the transmission request, from the backup device;
    a re-encrypted key generation hardware unit that stores beforehand the specific key and the public key, that decrypts the received encrypted key using the specific key to generate the encryption key, and that encrypts the generated encryption key using the public key to generate a re-encrypted key;
    a transmission hardware unit that transmits, to the backup device, a rewriting request including the generated re-encrypted key and for instructing to rewrite the encrypted key included in the backup as the generated re-encrypted key; and
    a playback right information deletion hardware unit that deletes the playback right information from the secure storage hardware unit, and
  wherein the backup device includes:
    an encrypted key request receiving hardware unit that receives the transmission request;
    an encrypted key transmission hardware unit that transmits, when the transmission request is received, the encrypted key included in the backup to the recording/playback device;
    a rewriting request receiving hardware unit that receives the rewriting request; and
    a rewriting hardware unit that rewrites the encrypted key included in the backup as the re-encrypted key included in the received rewriting request.
2. The backup system of claim 1, wherein the playback right information is used for judging whether the backup is permitted to be played back.

3. The backup system of claim 2,
wherein the playback right information is a hash value generated by applying a calculation using a one-way function to at least part of the content, and
wherein, when a value generated by applying the calculation to at least part of the content stored in the storage hardware unit matches the hash value, the content stored in the storage hardware unit is permitted to be played back.

4. The backup system of claim 3,
wherein the content includes:
the encryption key; and
the encrypted work generated by encrypting the digital work using the encryption key,
wherein the playback right information is a hash value generated by applying the calculation to the encryption key, and
wherein, when a value generated by applying the calculation to the encryption key included in the content stored in the storage hardware unit matches the hash value, the content stored in the storage hardware unit is permitted to be played back.

5. The backup system of claim 3,
wherein the content includes:
the encrypted work generated by encrypting the digital work using the encryption key; and
the encrypted key generated by encrypting the encryption key using the specific key that is specific to the recording/playback device,
wherein the playback right information is a hash value generated by applying the calculation to the encrypted key, and
wherein, when a value generated by applying the calculation to the encrypted key included in the content stored in the storage hardware unit matches the hash value, the content stored in the storage hardware unit is permitted to be played back.

6. The backup system of claim 3,
wherein the content includes:
the encrypted work generated by encrypting the digital work using the encryption key; and
the encrypted key generated by encrypting the encryption key using the specific key that is specific to the recording/playback device,
wherein the playback right information is a hash value generated by applying the calculation to at least part of the encrypted work, and
wherein, when a value generated by applying the calculation to at least part of the encrypted work included in the content stored in the storage hardware unit matches the hash value, the content stored in the storage hardware unit is permitted to be played back.

7. The backup system of claim 3,
wherein the content includes:
the encrypted work generated by encrypting the digital work using the encryption key; and
the encrypted key generated by encrypting the encryption key using the specific key that is specific to the recording/playback device,
wherein the playback right information is a hash value generated by applying the calculation to a combination of at least part of the encrypted work and the encrypted key, and
wherein, when a value generated by applying the calculation to the combination of at least part of the encrypted work and the encrypted key included in the content stored in the storage hardware unit matches the hash value, the content stored in the storage hardware unit is permitted to be played back.

8. The backup system of claim 2,
wherein the playback right information is a hash value generated by applying a calculation using a one-way function to the content, and
wherein, when a value generated by applying the calculation to the content stored in the storage hardware unit matches the hash value, the content stored in the storage hardware unit is permitted to be played back.

9. The backup system of claim 1,
wherein the acquisition hardware unit further acquires a restoration instruction to restore the content, and
wherein the recording/playback device further comprises a restoration hardware unit that reads, when the restoration instruction is acquired, the backup from the backup device, and that writes the read backup to the storage hardware unit.

10. The backup system of claim 1,
wherein the acquisition hardware unit further acquires a deletion instruction to delete the content, and
wherein the recording/playback device further comprises a complete deletion hardware unit that deletes, when the deletion instruction is acquired, the backup from the backup device and that deletes the playback right information from the secure storage hardware unit.

11. The backup system of claim 1,
wherein the acquisition hardware unit further acquires a move instruction to move the content to another device,
wherein the transmission hardware unit reads, when the move instruction is acquired, the backup from the backup device, and transmits the read backup to the other device, and
wherein the recording/playback device further comprises:
a complete deletion hardware unit that deletes the backup from the backup device, and deletes the playback right information from the secure storage hardware unit.

12. A backup system comprising:
a recording/playback device storing and playing back a content; and
a backup device managing a backup of the content and storing the backup of the content,
wherein the recording/playback device includes:
a storage hardware unit that stores the content;
a secure storage hardware unit that stores playback right information showing a right to play back the content only when the content is stored in the storage hardware unit;
an acquisition hardware unit that acquires an instruction to delete the content so as to be restorable; and
a deletion hardware unit that keeps, when the instruction to delete the content so as to be restorable is acquired, the playback right information stored in the secure storage hardware unit, that keeps the backup stored in the backup device, and that deletes the content from the recording/playback device,
wherein the content and the backup respectively include:
an encrypted work generated by encrypting a digital work using an encryption key; and
an encrypted key generated by encrypting the encryption key using a specific key that is specific to the recording/playback device,
wherein the backup system further comprises a request device,
wherein the request device includes:

a request key storage hardware unit that stores a request key that is specific to the request device;

a transfer request transmission hardware unit that transmits a transfer request of the backup to the recording/playback device;

an encryption key receiving hardware unit that securely receives the encryption key, as a response to the transfer request, from the recording/playback device; and a key transmission hardware unit that reads, when the encryption key is received, the request key, that encrypts the encryption key using the read request key to generate a re-encrypted key, and that transmits the generated re-encrypted key to the backup device, wherein the recording/playback device further includes:

a specific key storage hardware unit that stores the specific key;

a transfer request receiving hardware unit that receives the transfer request from the request device;

an encrypted key request hardware unit that transmits, when the transfer request is received, a transmission request of the encrypted key included in the backup to the backup device;

an encrypted key receiving hardware unit that receives the encrypted key, as a response to the transmission request, from the backup device;

an encryption key transmission hardware unit that reads, when the encrypted key is received, the specific key, that decrypts the received encrypted key using the specific key to generate the encryption key, and that transmits the generated encryption key to the request device; and a playback right information deletion hardware unit that deletes the playback right information from the secure storage hardware unit, and wherein the backup device includes:

an encrypted key request receiving hardware unit that receives the transmission request;

an encrypted key transmission hardware unit that transmits, when the transmission request is received, the encrypted key included in the backup to the recording/playback device, a re-encrypted key receiving hardware unit that receives the re-encrypted key from the request device; and a rewriting hardware unit that rewrites the encrypted key included in the backup as the re-encrypted key received from the request device.

* * * * *